US012242632B2

(12) United States Patent
Blakey

(10) Patent No.: US 12,242,632 B2
(45) Date of Patent: Mar. 4, 2025

(54) TIMELINE BUILDING SYSTEM

(71) Applicant: Albert G. Blakey, York, PA (US)

(72) Inventor: Albert G. Blakey, York, PA (US)

(*) Notice: Subject to any disclaimer, the term of this patent is extended or adjusted under 35 U.S.C. 154(b) by 103 days.

(21) Appl. No.: 18/241,550

(22) Filed: Sep. 1, 2023

(65) Prior Publication Data

US 2023/0409726 A1 Dec. 21, 2023

Related U.S. Application Data

(63) Continuation-in-part of application No. 18/322,361, filed on May 23, 2023.

(60) Provisional application No. 63/344,883, filed on May 23, 2022.

(51) Int. Cl.
*G06F 21/62* (2013.01)

(52) U.S. Cl.
CPC ................ *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 2012/0079360 A1* | 3/2012 | Canora | ................ | G11B 27/034 715/202 |
| 2013/0343726 A1* | 12/2013 | Shackleton | ........... | G06F 16/735 386/282 |
| 2014/0089816 A1* | 3/2014 | DiPersia | ................ | G06Q 50/01 715/753 |
| 2018/0300299 A1* | 10/2018 | Rasheed | ............... | G06Q 10/101 |
| 2019/0182258 A1* | 6/2019 | Yoon | ..................... | H04L 51/212 |
| 2020/0274884 A1* | 8/2020 | Kummer | ............... | G06V 40/172 |
| 2020/0289932 A1* | 9/2020 | Benedetto | ............... | A63F 13/35 |
| 2021/0200892 A1* | 7/2021 | Nagao | .................... | H04L 9/3297 |
| 2022/0086109 A1* | 3/2022 | Ramirez | ................. | G06F 11/00 |
| 2022/0295133 A1* | 9/2022 | Detrick | ............ | H04N 21/26258 |

* cited by examiner

*Primary Examiner* — Meng Li
(74) *Attorney, Agent, or Firm* — Barley Snyder

(57) ABSTRACT

A timeline builder system includes a content management configuration. The timeline builder system further includes a content preparation module. The content management configuration and the content preparation module are housed as applications within a plurality of application servers. A back-end user creates a visual, audio and textual content for a front-end user.

22 Claims, 42 Drawing Sheets

Table of Modules

| | | | | | |
|---|---|---|---|---|---|
| | | | | | |
| | | | | | |
| Content Preparation Module | | 10 | | Entities Shared Across Modules | |
| | Story Template Module | 12 | | 02 | An exemplary set of records within any module |
| | Media Log Module | 14 | | 04 | An exemplary record within any module |
| | Event Publication Summary Module | 16 | | 06 | |
| | | | | 08 | Story Template Module row number |
| Event Creation Module | | 40 | | 10 | Event Title |
| | Event Core Module | 42 | | 12 | Display Title (aka Short Headline) |
| | Access Module | 44 | | 14 | Sort Date |
| | Topic Module | 46 | | 16 | Display Date |
| | Tag Module | 48 | | | |
| | Story Module | 50 | | 20 | Main Media File Type |
| | Media Library Module | 52 | | 22 | Main Media File Name |
| | Web Services Module | 54 | | 24 | Event Copy (aka Content) |
| | Life Lessons Module | 56 | | 26 | Other Media File Type(s) |
| | Fixed Element Module | 58 | | 28 | Other Media File Display Title |
| | | | | 30 | Other Media File Names(s) |
| Narrative Display Module | | 60 | | 32 | Status (within subject module) |
| | Content Filter Module | 62 | | 34 | Tab(s) (for like items within exemplary spreadsheets) |
| | Timeline Module | 61 | | 50 | Story |
| | Event Display Module | 66 | | 46 | Topic |
| | Fixed Element Module | 68 | | 48 | Tag |

⇩ FROM FIG. 4A ⇩

| | | | | | |
|---|---|---|---|---|---|
| | Life Lessons Module | 70 | | | |
| | Collections Module | 72 | | | |
| | | | | | |
| Mobile module | | 80 | | | |
| | | | | | |
| | | Module Specific Entities | | | |
| | Content Filter Module | | | 62 100 | Broad / Narrow search filtering |
| | | | | | |
| | Event Display Module | | | 66 102 | Main Media image frame |
| | | | | 66 104 | Main Media caption frame |
| | | | | 66 106 | Other Media titles frame |
| | | | | 66 108 | Other Media titles |
| | | | | 66 110 | Other Media icons |
| | | | | 66 112 | Other Media modals |
| | | | | 66 114 | Other Media audio control |
| | | | | | |
| | Fixed Element Module | | | 68 116 | Archive title |
| | | | | 68 118 | Menu icon |
| | | | | | |
| | Life Lessons Module | | | 70 120 | Life Lessons module display screen |
| | | | | 70 122 | Life Lessons indiv items |
| | | | | 70 124 | Life Lessons media player |
| | | | | 70 126 | Life Lessons text description |
| | | | | 70 128 | Life Lessons event summaries |

⇩ FROM FIG. 4B ⇩

| | Collections Module | | | | 72 | 130 | Collection Manager |
|---|---|---|---|---|---|---|---|
| | | | | | 72 | 132 | Collection Manager control buttons |
| | | | | | 72 | 134 | Button: add new |
| | | | | | 72 | 136 | Button: save changes |
| | | | | | 72 | 138 | Button: edit details |
| | | | | | 72 | 140 | Button: view collection |
| | | | | | 72 | 142 | Button: share collection |
| | | | | | 72 | 144 | Drop-down: current collection |
| | | | | | 72 | 146 | Story sets |
| | | | | | 72 | 148 | Events (available) |
| | | | | | 72 | 150 | Collection events |
| | | | | | 72 | 152 | List of events selected for collection |
| | | | | | 72 | 154 | Individual events selected for collection |
| | | | | | 72 | 156 | Add remove buttons |
| | | | | | 72 | 158 | Add button |
| | | | | | 72 | 160 | Remove button |
| | | | | | 72 | 162 | Add new collection modal |
| | | | | | 72 | 164 | List of users for instance |
| | | | | | 72 | 166 | Each user in list |
| | | | | | 72 | 168 | Users selected from list to share collection |
| | | | | | 72 | 170 | Cancel button |
| | | | | | 72 | 172 | Save button |
| | | | | | 72 | 174 | Edit details modal |

⇩ FROM FIG. 4B ⇩

| | | | | | | | |
|---|---|---|---|---|---|---|---|
| | Media Log Module | | | | 14 | 180 | Original file name from source |
| | | | | | 14 | 182 | Associated Event / Gallery |
| | | | | | 14 | 184 | Year |
| | | | | | | | |
| | Event Publication Summary Module | | | | 16 | 186 | Vertical separation column |
| | | | | | 16 | 188 | Group of columns for Events in Production |
| | | | | | 16 | 190 | Group of columns for Events in Archive |
| | | | | | 16 | 192 | Total events in production per individual tab 16-34 |
| | | | | | 16 | 194 | Total events in production for all tabs 16-34 |
| | | | | | 16 | 196 | Total events in archive per individual tab 16-34 |
| | | | | | 16 | 198 | Total events in archive for all tabs 16-34 |
| | | | | | | | |
| | Event Creation Module | | | | 40 | 00 | Core Event Creation screen |

FIG. 4D

| Notes: | Each box with letters and numbers below is an exemplary event record, 42-04, created within the event core module, 42 |
|---|---|
| | Each depicted event record, 42-04, includes a unique sort date, 42-14 |
| Key: | A,B,C, etc, = content filter designation 62-04, for each exemplary event record 42-04, in database 4 |
| | -1, -2, etc. = chronological sequence within any content filter: A, B, etc. |
| | = based on unique sort date, 42-14 |
| | 01, 02, etc. = chronological sequence within entire database |
| | = based on unique sort date, 42-14 |

| Records (each) 42-04 | | | Database 4 | | | Timeline (set) 64-02 |
|---|---|---|---|---|---|---|
| A-1 04 | B-1 01 | C-1 03 | D-1 02 | E-1 08 | | C-1 03 |
| A-2 07 | B-2 09 | C-2 06 | D-2 05 | E-2 10 | | A-1 04 |
| A-3 15 | B-3 17 | C-3 13 | D-3 12 | E-3 11 | | C-2 06 |
| A-4 19 | B-4 20 | C-4 16 | D-4 14 | E-4 21 | | A-2 07 |
| A-5 23 | B-5 22 | | D-5 18 | | | E-1 08 |
| | B-6 24 | | | | | E-2 10 |
| | | | | | | E-3 11 |
| | | | | | | C-3 13 |
| | | | | | | A-3 15 |
| | | | | | | C-4 16 |
| | | | | | | A-4 19 |
| | | | | | | E-4 21 |
| | | | | | | A-5 23 |

| Filters (each) 62-04 | Filter A | Filter B | Filter C | Filter D | Filter E | Timeline Renders => |
|---|---|---|---|---|---|---|
| | ⬅ Selected | | ⬅ Selected | | ⬅ Selected | |

FIG. 7

Notes: Each box with letters and numbers below is an exemplary event record, 42-04, created within the event core module, 42

Key: A, B, C, etc., = content filter designation 62-04, for each exemplary event
Each depicted event record, 42-04, includes a unique sort date, 42-14
record 42-04, in database 4
-1, -2, etc. = chronological sequence within any content filter: A, B, etc.
based on unique sort date, 42-14
01, 02, etc. = chronological sequence within entire database
based on unique sort date, 42-14

| Records (each) 42-04 | | Database 4 | | | Timeline (set) 64-02 |
|---|---|---|---|---|---|
| A-1  04 | B-1  01 | C-1  03 | D-1  02 | E-1  08 | A-1  04 |
| A-2  07 | B-2  09 | C-2  06 | D-2  05 | E-2  10 | A-2  07 |
| A-3  15 | B-3  17 | C-3  13 | D-3  12 | E-3  11 | E-1  08 |
| A-4  19 | B-4  20 | C-4  16 | D-4  14 | E-4  21 | E-2  10 |
| A-5  23 | B-5  22 | | D-5  18 | | E-3  11 |
| | B-6  24 | | | | A-3  15 |
| | | | | | A-4  19 |
| | | | | | E-4  21 |
| | | | | | A-5  23 |

| Filters (each) 62-04 | Filter A | Filter B | Filter C | Filter D | Filter E |
|---|---|---|---|---|---|
| | ⬅ Selected | Un-Selected | ⬅ Un-Selected | Selected | ⬅ Selected |

Timeline Renders ⇒

66-112
(Typical of Exemplary Superimposition of Media Modals for File Types Including Images, Image Galleries, Documents, HTML and Video Files)

12-08

| | A | B | C | D |
|---|---|---|---|---|
| 1 | Title | John Doe is born | 12-10A | |
| 2 | Short Headline | John Born | 12-12A | |
| 3 | Sort Date | 3/2/1987 | 12-14A | |
| 4 | Display Date | Mar. 2, 1987 | 12-16A | |
| 5 | Access Level | Family Only | 12-18A | |
| 6 | Main Media | Image | 12-20A | |
| 7 | File Number | 0040.01.007.001.jpg | 12-22A | |
| 8 | Content | Details about John's birth Lorum Ipsum... | 12-24A | |
| 9 | | 12-26 [Document] [Baptism Certificate] 12-28<br>12-30 0040.01.001.001.pdf<br>12-26 [Gallery] [First days at home] 12-28<br>0040.01.007.003.jpg<br>12-30 0040.01.007.004.jpg<br>Other media 0040.01.007.007.jpg | 12-26A-1<br>12-28A-1<br>12-30A-1<br>12-26A-2<br>12-28A-2<br>12-30A-2<br>12-30A-3<br>12-30A-4 | |
| 10 | Story | TBD | 12-50A | |
| 11 | Topics | Doe family; John Doe | 12-46 A1 & A2 | |
| 12 | Tags | Births and Deaths | 12-48A | |
| 13 | Status | Draft Entry 051223 | 12-32A | |
| 14 | | | | |

12-04A Story Template Entry

↓ Flows To ↓

66-04A Event Record 12-02

|   | A<br>14-22 OR 14-30 | B<br>14-20 OR 14-26 | C<br>14-180 | D<br>14-104 |
|---|---|---|---|---|
| 1 | File Number | File Type | Original File Name from Source | Caption |
| 2 | 0040.01.001.001 | Document | John's Baptism.pdf | John Doe baptism certificate, St. Mary's Church, April 15,1987 |
| 3 | 0040.01.007.001 | Photo | John 01.jpg | John Doe as a newborn |
| 4 | 0040.01.007.002 | Photo | John 02.jpg | John with cousin Sally |
| 5 | 0040.01.007.003 | Photo | John 03.jpg | John with Grandparents June and Peter Doe |
| 6 | 0040.01.007.004 | Photo | John 04.jpg | John with mom and dad |
| 7 | 0040.01.007.005 | Photo | John 05.jpg | John with Uncle Herb and Aunt Maggie |
| 8 | 0040.01.007.006 | Photo | John 06.jpg | John in his swing |
| 9 | 0040.01.007.007 | Photo | John 07.jpg | John in his car seat on the way home from the hospital |
| 10 | 0040.02.001.001 | Document | Diploma.pdf | John Doe college diploma, Western Michigan University, May 15, 2009 |
| 11 | 0040.02.007.001 | Photo | IMG2378.jpg | John receiving his diploma |
| 12 | 0040.02.007.002 | Photo | IMG2379.jpg | John with mom and dad at graduation from WMU |
| 13 | 0040.02.007.003 | Photo | IMG2380.jpg | Graduates processing into the ceremony |
| 14 | 0040.02.007.004 | Photo | IMG2381.jpg | Graduates processing into the ceremony |
| 15 | 0040.02.007.005 | Photo | IMG2382.jpg | John with Grandparents June and Peter Doe at graduation from WMU |
| 16 | 0040.02.007.006 | Photo | IMG2383.jpg | Graduates throwing caps |
| 17 | 0040.02.007.007 | Photo | IMG2384.jpg | John with his girlfriend, Jane, at graduation from WMU |
| 18 | 0040.02.007.008 | Photo | IMG2385.jpg | Graduates on the field |
| 19 | 0040.02.007.009 | Photo | IMG2386.jpg | John with his best friends at graduation from WMU. L to R: Robert Smith, Tom Washington, John Doe, Bill Johnson. |

FIG. 28A

| E | F | G | |
|---|---|---|---|
| Associated Event / Gallery | Year | Uploaded | |
| John Doe is born | 1987 | yes | 14-04A |
| John Doe is born | 1987 | yes | 14-04B |
|  | 1987 | yes | 14-04C |
| John Doe is born / First days at home | 1987 | yes | 14-04D |
| John Doe is born / First days at home | 1987 | yes | 14-04E |
|  | 1987 | yes | 14-04F |
|  | 1987 | yes | 14-04G |
| John Doe is born / First days at home | 1987 | yes | 14-04H |
| John Doe graduates from WMU | 2009 | yes | 14-04I |
| John Doe graduates from WMU | 2009 | yes | 14-04J |
| John Doe graduates from WMU / Graduation celebrations | 2009 | yes | 14-04K |
|  | 2009 | yes | 14-04L |
|  | 2009 | yes | 14-04M |
| John Doe graduates from WMU / Graduation celebrations | 2009 | yes | 14-04N |
|  | 2009 | yes | 14-04O |
| John Doe graduates from WMU / Graduation celebrations | 2009 | yes | 14-04P |
|  | 2009 | yes | 14-04Q |
| John Doe graduates from WMU / Graduation celebrations | 2009 | yes | 14-04R |

FIG. 28B

|   | A | B | C |
|---|---|---|---|
| 1 | Image Category Key | | |
| 2 | Item | Category Number | |
| 3 | Documents Birth certificates, diplomas, etc, usually a PDF but can be converted later if not Includes: Obituaries, Death Records, articles, etc. | 001 | |
| 4 | Overflow Documents | 002 | |
| 5 | Overflow Documents | 003 | |
| 6 | Business and Associates People doing work, project photos, Employees, non family member friends; anyone not related that shows up in the story | 004 | |
| 7 | Overflow Business | 005 | |
| 8 | Overflow Business | 006 | |
| 9 | Family Photos | 007 | |
| 10 | Overflow Family | 008 | |
| 11 | Overflow Family | 009 | |
| 12 | Overflow Family | 010 | |
| 13 | | 011 | |
| 14 | | 012 | |
| 15 | | | |
| 16 | | | |
| 17 | Source | Source Number | |
| 18 | Jane Doe | 01 | |
| 19 | Mary Jones Doe | 02 | |
| 20 | | 03 | |
| 21 | | 04 | |

S3

14-34A Media Log ▾ | 14-34B Key ▾ (14-34)

FIG. 29

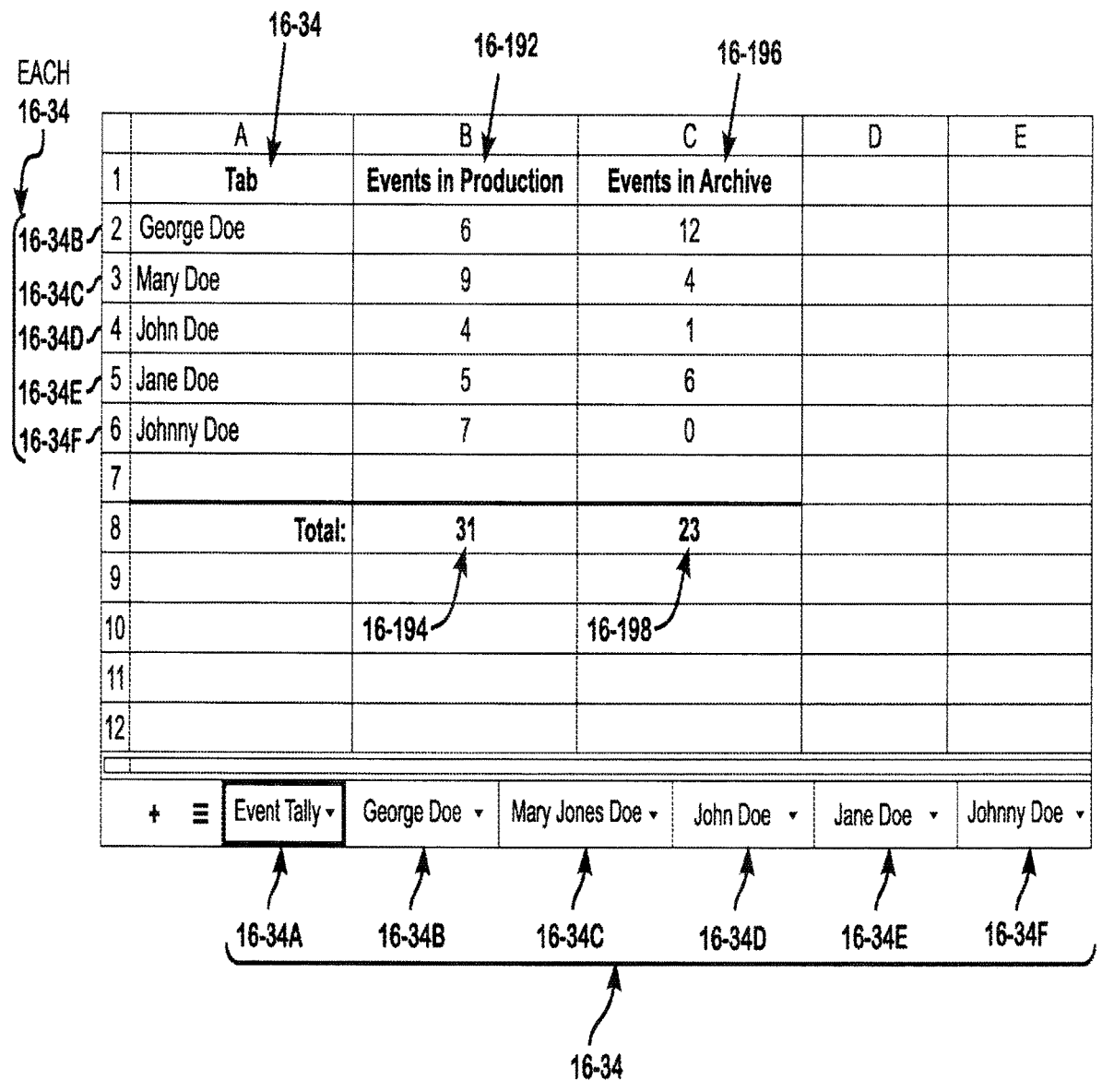

| | A | B | C | D | E |
|---|---|---|---|---|---|
| 1 | Tab | Events in Production | Events in Archive | | |
| 2 | George Doe | 6 | 12 | | |
| 3 | Mary Doe | 9 | 4 | | |
| 4 | John Doe | 4 | 1 | | |
| 5 | Jane Doe | 5 | 6 | | |
| 6 | Johnny Doe | 7 | 0 | | |
| 7 | | | | | |
| 8 | Total: | 31 | 23 | | |
| 9 | | | | | |
| 10 | | | | | |
| 11 | | | | | |
| 12 | | | | | |

Event Tally ▾ | George Doe ▾ | Mary Jones Doe ▾ | John Doe ▾ | Jane Doe ▾ | Johnny Doe ▾

FIG. 31

⇩ FROM FIG. 33A ⇩

| | | | Display Date | | Topics | |
|---|---|---|---|---|---|---|
| | A — Audio | | | | Browse Topics | ~46 |
| | | 42-18 — | Access Level | (dropdown list) | Add Topic | |
| 42-20 42-26 | B — Documents | | | | | 42-00 |
| | | 42-20 — | Main Media File Type | (dropdown list) | | |
| | C — Video | | | | | |
| | | 42-22 — | Main Media File Name | (access media library) | | |
| 50 — Stories | | | | | | |
| | | 42-24 — | Content Copy | | | |
| | | | | | | |
| | | | Add Other Media | | | |
| | | 42-26 — | Other Media 1 File Type | (dropdown list) | | |
| | | 42-30 — | Other Media 1 File Name | (access media library) | | |
| | | 42-26 — | Other Media 2 File Type | (dropdown list) | | |
| | | 42-30 — | Other Media 2 File Name | (access media library) | | |
| | | ⋮ | Etc. | | | |

FIG. 33B

TIMELINE BUILDING SYSTEM

CROSS-REFERENCE TO RELATED APPLICATION

The application claims the benefit of the patent application Ser. No. 18/322,361 which claims the filing date of Provisional Patent Application No. 63/344,883, filed on May 23, 2022.

FIELD OF THE INVENTION

The invention relates to a timeline building system and, more particularly, to a fully integrated interactive timeline building system.

BACKGROUND

The invention is a unique concept, and custom configuration, applied to content management systems ("CMS") used to manage databases and the online experiences available to database users. It is a timeline-driven digital archive system that is well suited to any type of narrative work (a) where time is an important element, (b) there are multiple storylines that relate to each other, and (c) where usage of various forms of media can enrich the power of narrative by enhancing the story consuming experiences of audience members. The invention is applicable both to works of non-fiction and fiction.

The uniqueness of the invention pertains to a set of reciprocating capabilities for back-end users (creators of content) and front-end users (consumers of content). Back-end users can develop multiple, interrelated storylines, organized across time and by different themes—while front-end users can choose how they wish to consume storylines by selecting the sequences of events, and the depth of detail, that strike their interests at a given moment. The invention provides creators a flexible system for publishing their work while knowing that their target audiences will enjoy broad freedom in how individual content consumers choose to experience a creator's work.

The growing popularity of television delivered through streaming services, e-readers such as Kindles, and audio podcasts on various platforms, collectively indicate a market appetite for user-directed consumption of internet-based content over a range of devices. However, while each of these forms of work may be organized into chapters or episodes, a user's experience is typically linear, following a creator prescribed path from beginning to end.

A unique concept of the invention provides for the disaggregation of events from a monolithic narrative, while preserving the coherence of each event to other events, by means of multiple indexes that can be applied to each individual event. These indexes include placement in time as well as assignment to a plurality of creator defined thematic categories. By virtue of this unique organizing principle, front-end users (consumers of content) have the means to assemble sets of events that interest them by using parameters established by back-end users (creators of content).

The invention's method for consumer driven narrative assembly is a key to its uniqueness. An exemplary front-end user first considers a list of content themes or categories and selects one or more categories of interest. The invention then generates a timeline that renders a summary listing for each event matching a chosen category (or categories) in a chronological sequence of dates and descriptive titles for each event. The underlying taxonomy of content categories, event descriptions and dates is determined by back-end users of the invention as they curate content for front-end user consumption, all of which is archived in a database within an exemplary instance of the invention.

An exemplary front-end user might assemble a set of events across multiple categories, and by viewing the events summarized in an exemplary timeline, consider how the included events run concurrently versus sequentially. This user might then expand their chosen tableau by selecting more categories or might un-select some categories in order to focus their view on a more narrowly defined event set.

At any moment, a front-end user may shift from appreciating sequences of selected events across a timeline to exploring any particular event in greater depth. The invention accommodates a front-end user's interest in further detail by providing, within each event, a plurality of curated content elements potentially available for selection, such as text, image, audio and video file types.

For comparison, an exemplary reader of a conventionally published work (whether printed on paper or displayed on an electronic device) who is curious to know how information found in one part of the work relates to information available in other parts of the work, typically has only a Table of Contents and perhaps an Index to consult (if either is included as part of an exemplary work in the first place). The utility of these well-known features is limited in both cases. A Table of Contents typically appears at the front and lists the sequential placement of large blocks of content that follow. An Index typically appears at the end and lists the prior page locations where specific words or subjects are mentioned. It is then left to exemplary readers to jump back and forth between page locations to satisfy their curiosity about the related information they are seeking.

The invention enables front-end users to create their own unique experiences in consuming content by allowing them to self-navigate through a creator's offerings as their temporal experience of curiosity emerges. Subsequent selections are based on their level of interest in selections they have previously made, giving an exemplary front-end user significant freedom to explore an exemplary back-end user's work product.

For back-end (content creating) users, their knowledge of the enhanced consumer experiences made possible by the invention now provides them with a greatly expanded palette of possibilities for conceiving, developing and publishing their work.

When considering creative choices such as depths of detail used to describe anything (for example: an event, a setting or a scene, the build-up of preceding events, the attributes or motives of principal versus secondary characters, foreshadowing subsequent events, etc.) a content creating back-end user can choose to consolidate or distribute information within or among specific event records using the invention, knowing that a content consuming front-end user can dive deeper, if intrigued, or move along more swiftly, if they prefer.

Moreover, whether developing non-fiction or fictional narratives, a content creator can work with time as a creative element, knowing that a content consuming front-end user will be able to look broadly across concurrent events or stay tightly focused on a particular narrative thread. Lastly, a content producer can include a plurality of media file types to enrich a front-end user's experience, each placed precisely in context, and easily accessed by any front-end user who is interested.

Therefore, there is currently a need for a system to provide the unique capabilities that enable an overall well rounded and broad exploration of curated content for a user. As the foregoing illustrates, the invention provides the timeline building system.

SUMMARY

A timeline building system includes a processor. The timeline builder system includes a computing device. The timeline builder system includes a content management configuration. The timeline builder system further includes a content preparation module. The content management configuration and the content preparation module are housed as applications within a plurality of application servers. The content preparation module includes a story template module and a media log module. The content preparation module further includes an event publication summary module. A back-end user creates a visual, audio and textual content for a front-end user. The front-end user is prevented from accessing a back-end content creation functionality of the back-end user, the visual audio and textual content is displayed on the computing device.

BRIEF DESCRIPTION OF DRAWINGS

In the following, the present invention is described in more detail with references to the drawings in which:

FIG. 4A is a diagram of a summary of exemplary module numbers;

FIG. 4B is another diagram of a summary of exemplary module numbers;

FIG. 4C is another diagram of a summary of exemplary module numbers;

FIG. 4D is another diagram of a summary of exemplary module numbers;

FIG. 7 is another schematic diagram of a case example of the functioning timeline builder system according to the invention;

FIG. 8 is another schematic diagram of a case example of the functioning timeline builder system according to the invention;

FIG. 10 is another schematic view of a front-end user environment of a timeline builder system according to the invention as viewed through a general user interface on window based computer;

FIG. 27A is a schematic view of an exemplary database for a back-end user environment of a timeline builder system according to the invention;

FIG. 28A is another schematic view of an exemplary database for a back-end user environment of a timeline builder system according to the invention;

FIG. 28B is another schematic view of an exemplary database for a back-end user environment of a timeline builder system according to the invention;

FIG. 29 is another schematic view of an exemplary database for a back-end user environment of a timeline builder system according to the invention;

FIG. 31 is a schematic diagram of another exemplary database for a back-end user environment of a timeline builder system according to the invention;

FIG. 33B is a schematic diagram of an exemplary event entry screen of the timeline builder system according to the invention;

DETAILED DESCRIPTION OF THE EMBODIMENTS

Figure 1:
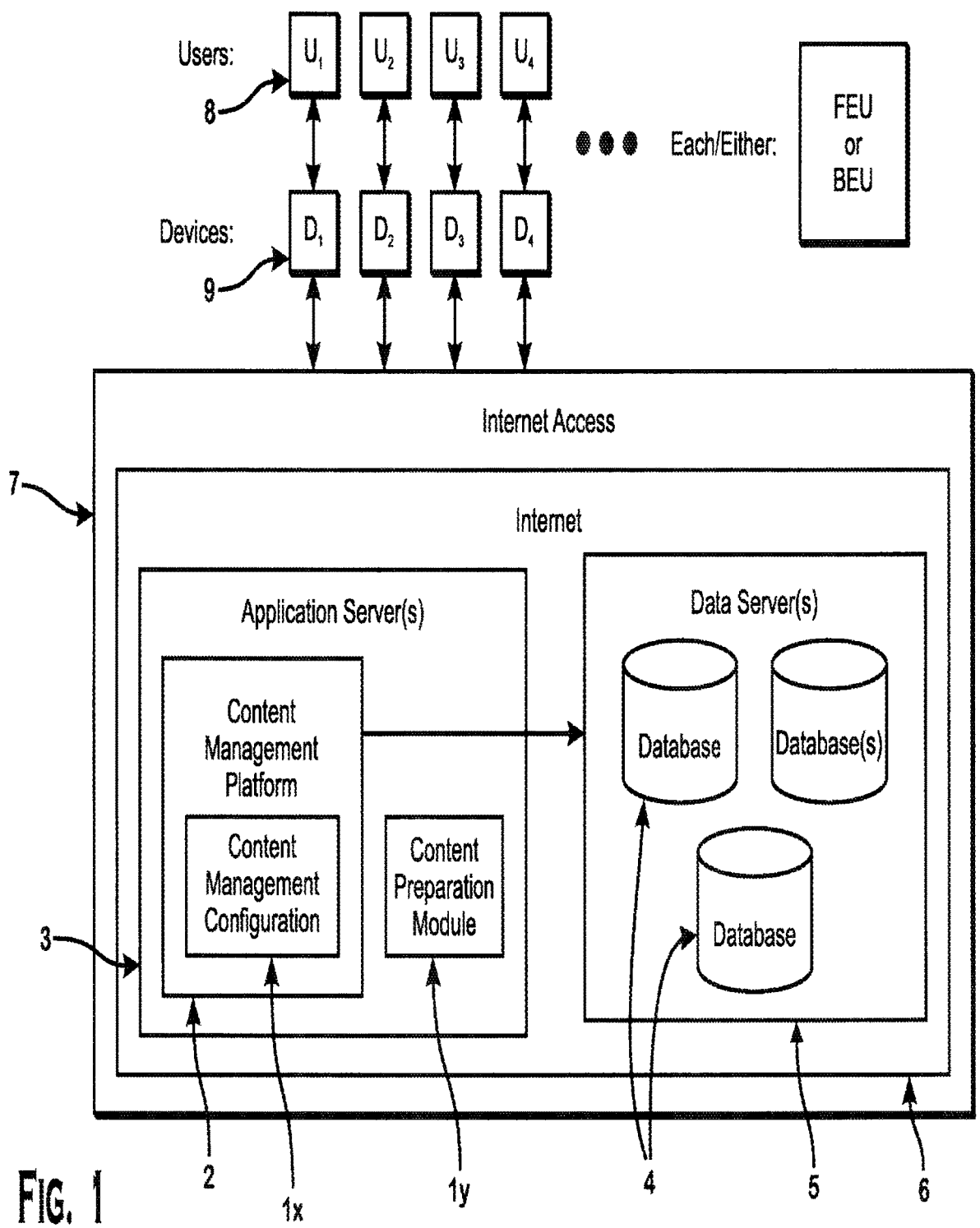
FIG. 1 is a schematic diagram of a timeline builder system according to the invention.

In an embodiment, the teachings herein describe a system that allows for the creation of a timeline-driven digital archive system according to an embodiment of the invention ("timeline builder system"). As shown in FIG. 1, a timeline builder system according to the invention generally includes a content management configuration 1X and content preparation module 1Y.

In the exemplary embodiment, the timeline builder system generally includes an application site. One of ordinary skill in the art would understand the applicant's design is not the exclusive embodiment. In the exemplary embodiment, the application site is designed to work on internet Explorer 10+, and the most up-to-date versions of Chrome, Safari and Firefox across all major operating systems and updated device platforms for example Android and IOS. One of ordinary skill in the art would understand the applicant's design is not the exclusive embodiment. In the exemplary embodiment, the application site further includes a main screen module. One of ordinary skill in the art would understand the applicant's design is not the exclusive embodiment.

Hardware infrastructure for an embodiment of the timeline builder system 1 will be described. In an exemplary embodiment, the timeline builder system 1 is built on a network router (for instance, a wireless router) and connected to a database server, while also utilizing known hardware components, including a web server, a firewall, a network, and the computing device.

Figure 36:
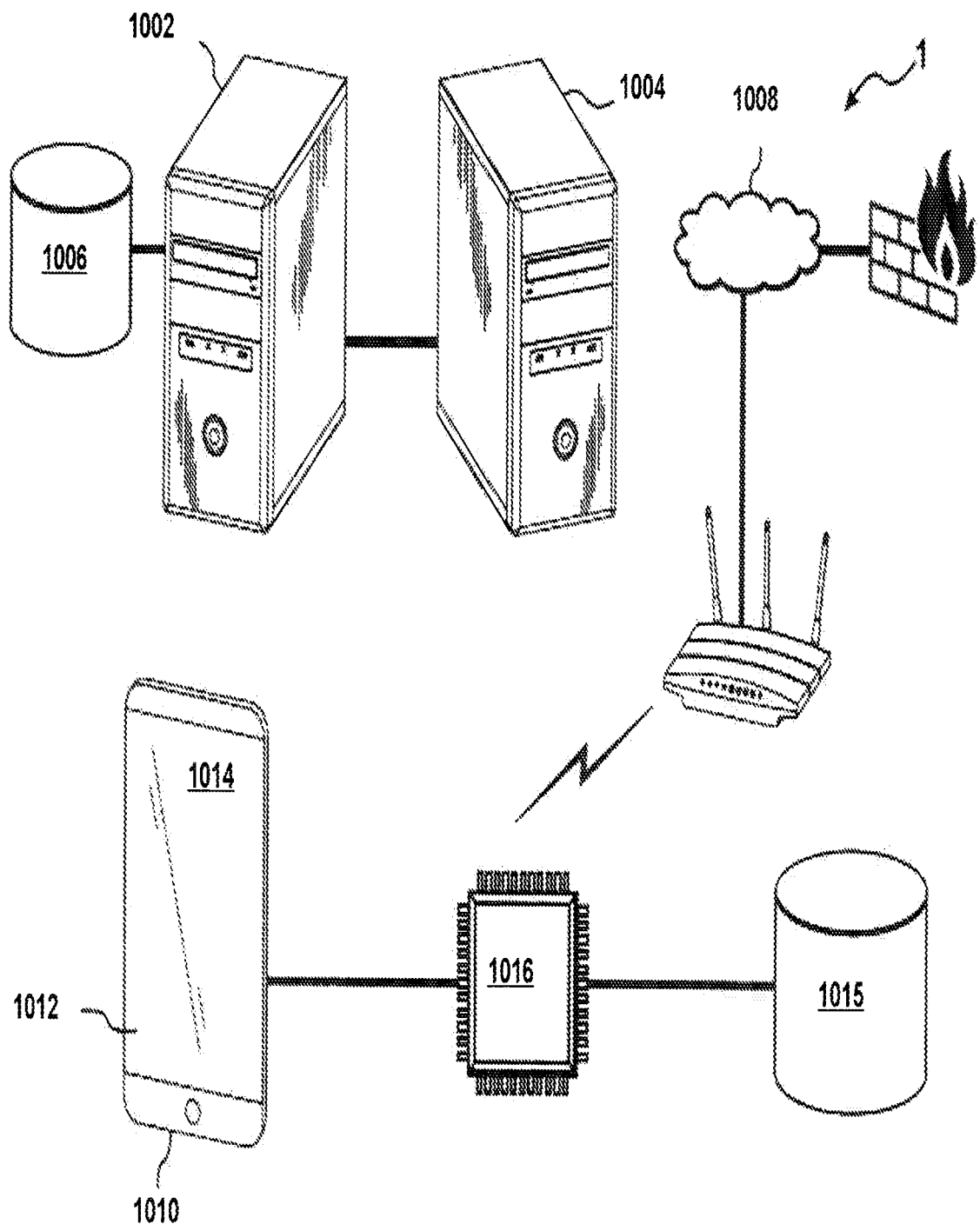
FIG. 36 is a schematic diagram of hardware infrastructure for the timeline builder system according to the invention.

Referring first to FIG. 36, which is a broad overview of the hardware infrastructure for an embodiment of the timeline builder system 1 will be described. To perform the aforementioned and other functions, the timeline builder system 1 generally includes a plurality of integrated system servers 1002, 1004 with one or more databases 1006 (i.e., internal information repository), a network interface 1008 accessible through various known communication protocols, such as TCP/IP, cellular protocols including GSM, Wi-Fi, Wi-Max, or other wireless communications technologies or combination of wired or wireless channels, network security devices (where necessary), and a computing device 1010 having a processing unit 1016 and memory 1015.

The timeline builder system 1 allows a user to access a plurality of system files that includes data, such as information and images, through the computing device 1010 and a network traffic information on the database server 1002 (i.e. SQLServer or PostgreSQL (also known as Postgres) or newer) that connects to a web server 1004. The web server 1004 functions as a way for network interface 1008 to communicate to the database server 1002 through known application-programming interface (API) between the computing device 1010 and the database server 1002. A firewall may be used for security purposes such as, but is not limited to, blocking unauthorized access to the web server 1004 and permitting unauthorized communication thereto. The timeline builder system 1 is designed to run through the computing device 1010 through a timeline builder module that can be downloaded over personal area networks (PANs), local area networks (LANs), campus area networks (CANs), wide area networks (WANs), metropolitan area networks (MANs) and any new networking system developed in the future. One skilled in the art should appreciate that the timeline builder system 1 can be maintained solely through the computing device 1010, as the timeline builder system modules can be pre-loaded to the computing device 1010. The computing device 1010 as depicted having a processor 1016 for performing the necessary calculations and performing the actions for the timeline builder system module having a plurality of service modules within the timeline builder module, and also having memory 1015, configured for storing and accessing the timeline builder system files, including a plurality of front-end user FEU functions and back-end user BEU functions which may be employed in the timeline builder system simulation. In the shown embodiment, the user may connect to the network interface 1008 using the computing device 1010 through the router for instance. One skilled in the art would appreciate that other hardware and protocol designs are possible as long as such modifications would not divert from the spirit of the invention.

In an exemplary embodiment, as shown in FIG. 36, the computing device 1010 generally includes the general user interface 1014, the memory device 1015, and the processor 1016. In the shown embodiment, the computing device is a tablet computer or mobile phone with a touchscreen display 1012. The touchscreen display 1012 uses finger or stylus gestures to navigate the general user interface (GUI) 1014. However, one skilled in the art should appreciate that other implements could be used; including a computer mouse, a keyboard, or joystick. In fact, one skilled in the art should appreciate that the computing device 1010 is a physical computer and could be, but not limited to, a desktop computer, a laptop computer, or a cell phone, and utilize a downloaded app or web browser. The memory device 1015 is a storage device having computer components and recording media used to retain digital data. The processor 1016 is a central processing unit (CPU) that manipulates data stored in the memory device 1015 by performing computations. In an alternative embodiment, the timeline builder system files, including the front-end user FEU functions and the back-end user BEU functions, and programming language necessary for performing the simulation may be loaded into the memory device 1015 of the computing device 1010, and performable by the processor 1016, utilizing user inputs through the general user interface 1014. In such an embodiment, there may be no need for communication through the network interface 1008 to communicate with external devices (e.g. servers 2, 4) through a network router.

To aid one skilled in the art, a condensed version of FIG. 36 is shown in FIG. 1 which further depicts the timeline builder system 1. As shown in FIG. 1, the timeline builder system 1 is depicted in two parts: by way of a content management configuration 1X and a content preparation module 1Y. The content management configuration 1X according to the invention is deployed as a configuration within an exemplary content management platform 2. The content preparation module 1Y according to the invention is an exemplary set of templates and tools for use by content creators to identify and organize content elements such as copy, dates and digital files into coherent groupings for subsequent entry into the content management configuration 1X.

The content management platform 2 can be either commercially available to the public or proprietary for the designated use of its owners. Both the content management configuration 1X and the content preparation module 1Y can be housed as applications within a plurality of application servers, 3. In performing their exemplary functions, the application servers, 3, would interface with one or more databases, 4, which would be housed in one or more database servers each of which, 3, 4, and 5, could be commercially available or proprietary. Each component thru 5, would be connected to the others via the Internet 6, and would be accessible to a plurality of system users through a plurality of means of Internet access 7. Such users, 8, would utilize a plurality of devices 9 to affect their access to the Internet and thereby utilize each of the components described above to exploit the capabilities of the invention, 1X and 1Y.

In an exemplary embodiment, the plurality of potential users, could be either solely front-end (only content consuming) users FEU, or back-end (content creating) users, BEU. In the present shown embodiment, back-end users, BEU, have the ability to consume content at any time, however solely front-end users FEU have only the ability to consume content created by others, and thus have no access to the invention's back-end content creation functionality.

Figure 2:
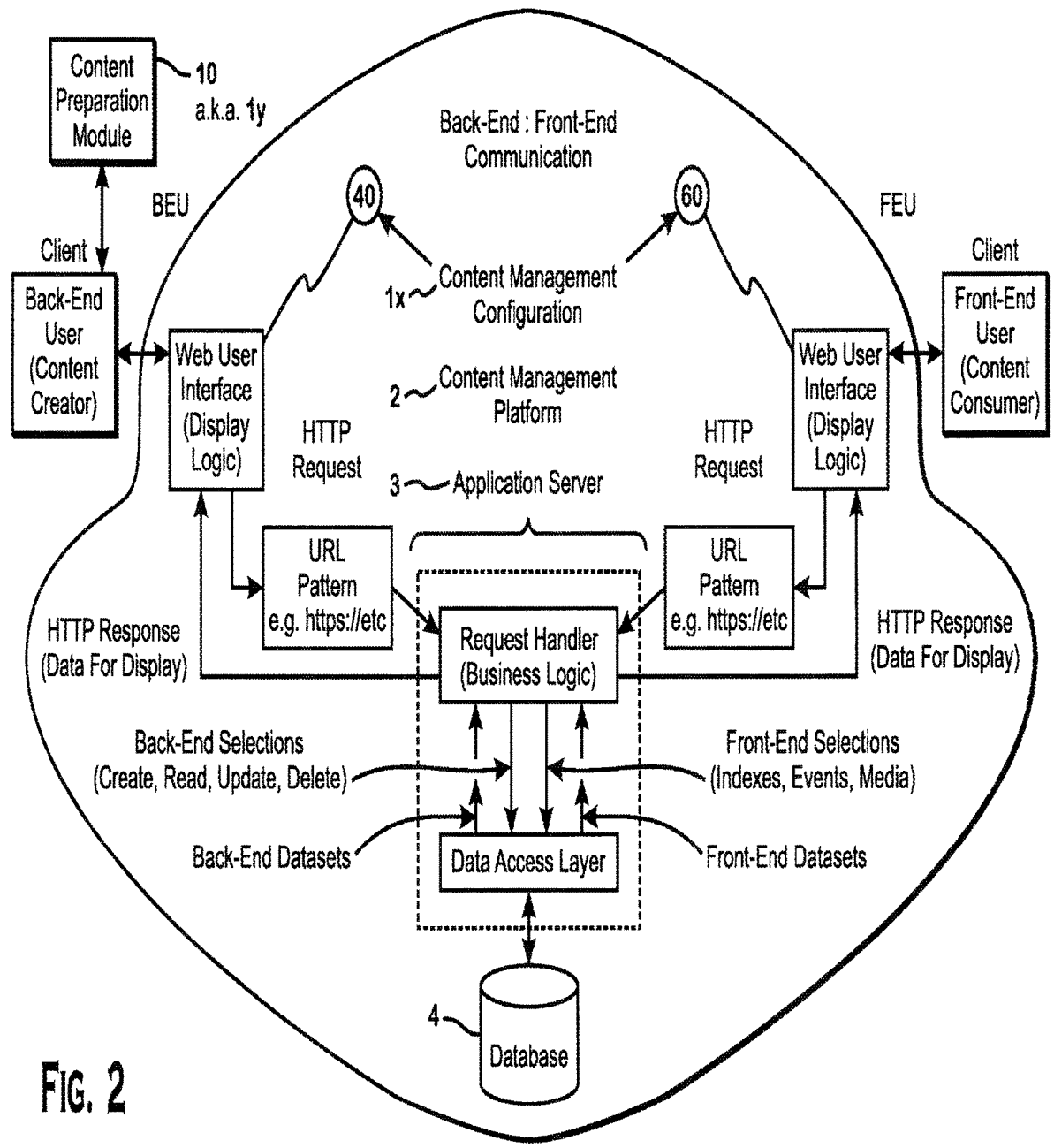
FIG. 2 is another schematic diagram of the timeline builder system according to the invention.

As shown in FIG. 2, an exemplary back-end user BEU uses the display logic of the web user interface of the content management configuration, specifically an event creation module, (as part of 1X) to send HTTP requests to a content management platform 2, for actions performed by the application server, 3. Exemplary requests include back-end actions such as create, read, update, delete which are relayed through the data access layer to and from an exemplary database, 4, which then returns back-end datasets for display within the back-end user BEU interface as the exemplary back-end user BEU creates and loads content into the database.

With reference to FIG. 2, a front-end user FEU, uses the display logic of the web user interface of the content management configuration 1X and more specifically the front-end user interface, specifically a narrative display module 60 to send HTTP requests to the content management platform, 2, for actions performed by the application server, 3. Exemplary requests include front-end actions such as accessing indexes of content and selecting various items of content, which are relayed through the data access layer to and from an exemplary database 4, which then returns front-end datasets for display within the front-end user interface as the exemplary front-end user consumes content in the database by means of the invention.

In the shown embodiment, the content preparation module 10, aka 1Y is available only to a back-end user BEU.

Figure 3:
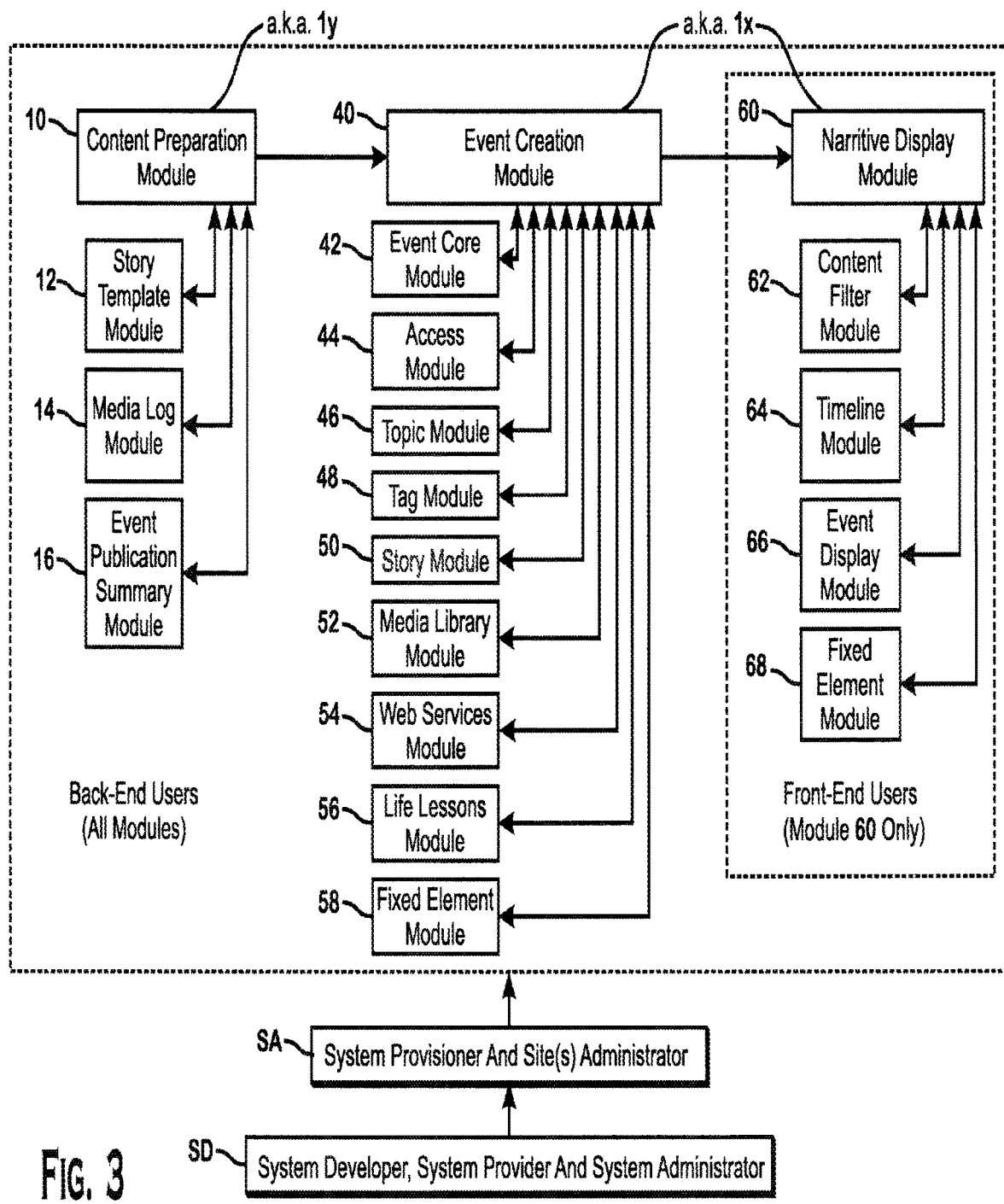
FIG. 3 is another schematic diagram of the timeline builder system according to the invention.

According to the invention, as further shown in FIG. 3, the content preparation module aka 1Y, generally includes a story template module 12, which provides a framework for exemplary creators of content to gather, organize, develop, proofread and approve coherent bundles of content prior to loading into an event creation module 40. The content preparation module 10 further includes a media log module 14 that provides a framework for exemplary creators of content to identify, label and manage digital media files within a unique numbering system that corresponds to entries in the story template module 12.

The content preparation module 10 further includes an event publication summary module 16. The event publication summary module 16 provides a framework for managing work in process, work completed and workflow as content is developed both before and after loading into the event creation module 40.

With reference to FIG. 3, an overview of the timeline builder system is shown, whereby the content preparation module 10, the event creation module 40, and the narrative display module 60 interact. In the disclosure and referenced figures that follow to describe the current embodiment of the invention, the following numbering scheme will be employed. Each exemplary module of the invention will be designated and labeled with a two digit number that precedes a hyphen, "-". Each exemplary data element or component of an exemplary module will be designated and labeled with a two digit number that follows a hyphen. "-". This convention is deployed to provide clarity regarding data elements or components that are identical across the exemplary modules described. As a specific example, a "display date" that appears as 12-16 in story template module 12, is the same "display date" data element that appears as 16-16 in event publication summary module 16, which further appears as display date 42-16 in event creation core module 42, which further appears as display date 64-16 in timeline module 64, which further appears as display date 66-16 in event display module 66. An exemplary set of records of any module shall be designated as xx-02 for an exemplary module xx. An exemplary individual record of any module shall be designated as xx-04 for an exemplary module xx. Not all data elements or module components appear within each exemplary module of the invention. Further, certain exemplary data elements or components appear only within a single module. A summary of exemplary module numbers, exemplary data element/component entities shared across modules, and exemplary module specific entities is found in FIG. 4A-4D.

As further shown in FIG. 3, the event creation module 40 according to the invention is available only to back-end users BEU. In an exemplary embodiment of the invention, the event creation module 40 generally includes a core event module 42. The core event module 42 is the primary vehicle for the assembly of data within the event creation module, 40, and is where back-end users enter: event titles (full) xx-10, display titles (brief) xx-12, sort dates (unique) xx-12, display dates (varied formats) xx-16, event copy aka content xx-24, media file types xx-20 and xx-26, and links to media files xx-22 and xx-28. One skilled in the art would understand the applicant's design is not the exclusive embodiment.

In an exemplary embodiment of the invention, the event creation module 40 further includes an access module 44 that allows back-end users BEU to set permission levels per event, that control access to content by categories of front-end user FEU.

In an exemplary embodiment of the invention, the event creation module 40 further includes a topic module 46 that allows back-end users to create hierarchical taxonomies of categories of content that provide a foundation for front-end user FEU to navigate, select and explore content within an exemplary site.

In an exemplary embodiment of the invention, the event creation module 40 further includes a tag module 48 that allows back-end users BEU to create non-hierarchical taxonomies of categories that provide a foundation for front-end user FEU to navigate, select and explore content within an exemplary site.

In an exemplary embodiment of the invention, the event creation module 40 further includes a story module 50. The story module 50, allows back-end users to create custom sets of content independent of any index designations made within the topic modules 46 and tag modules 48 otherwise assigned within the modules.

In an exemplary embodiment of the invention, the event creation module 40 further includes a media library module 52. The media library module 52 is the repository for digital content files within an exemplary archive such as images, sets of multiple images, documents, and audio files.

As shown, the event creation module 40 further includes a plurality of web services modules 54. The plurality of web services modules 54 provide back-end users with enhanced capabilities to render content within an exemplary archive such as PDF readers, video players, embedded URLs, etc.

In an exemplary embodiment of the invention, the event creation module 40 further includes a life lessons module 56. The life lessons module 56 allows back-end users to create custom sets of media file content that are accessed by front-end users independent of any content filter modules 62 and timeline modules 64 otherwise assigned within the modules.

In an exemplary embodiment of the invention, the event creation module 40 further includes a fixed element module 58. The fixed element module 58 is positioned across a top of a display area and provides persistent site and user identification information. It also provides functionality that enables back-end users BEU to switch between the back-end and front-end functions of an individual exemplary site, as well as to move from one exemplary site to another exemplary site as the BEU with appropriate access and permissions.

With further reference to FIG. 3, the narrative display module 60 according to the invention is the only module available to front-end users FEU. The narrative display module 60 includes a content filter module 62 which the FEU chooses categories of content to display in a timeline. The narrative display module 60 further includes a timeline module 64 which displays on a display screen event summaries in chronological order for the content categories selected by the FEU in the content filter module 62. The narrative display module 60 further includes an event display module 66 which displays content for any event summary selected from the timeline by the FEU within the timeline module 64. The narrative display module 60 further includes a fixed element module 68 which provides persistent identification and navigation tools to the FEU. One of ordinary skill in the art would understand that the applicant's design is not the exclusive embodiment.

Figure 5:
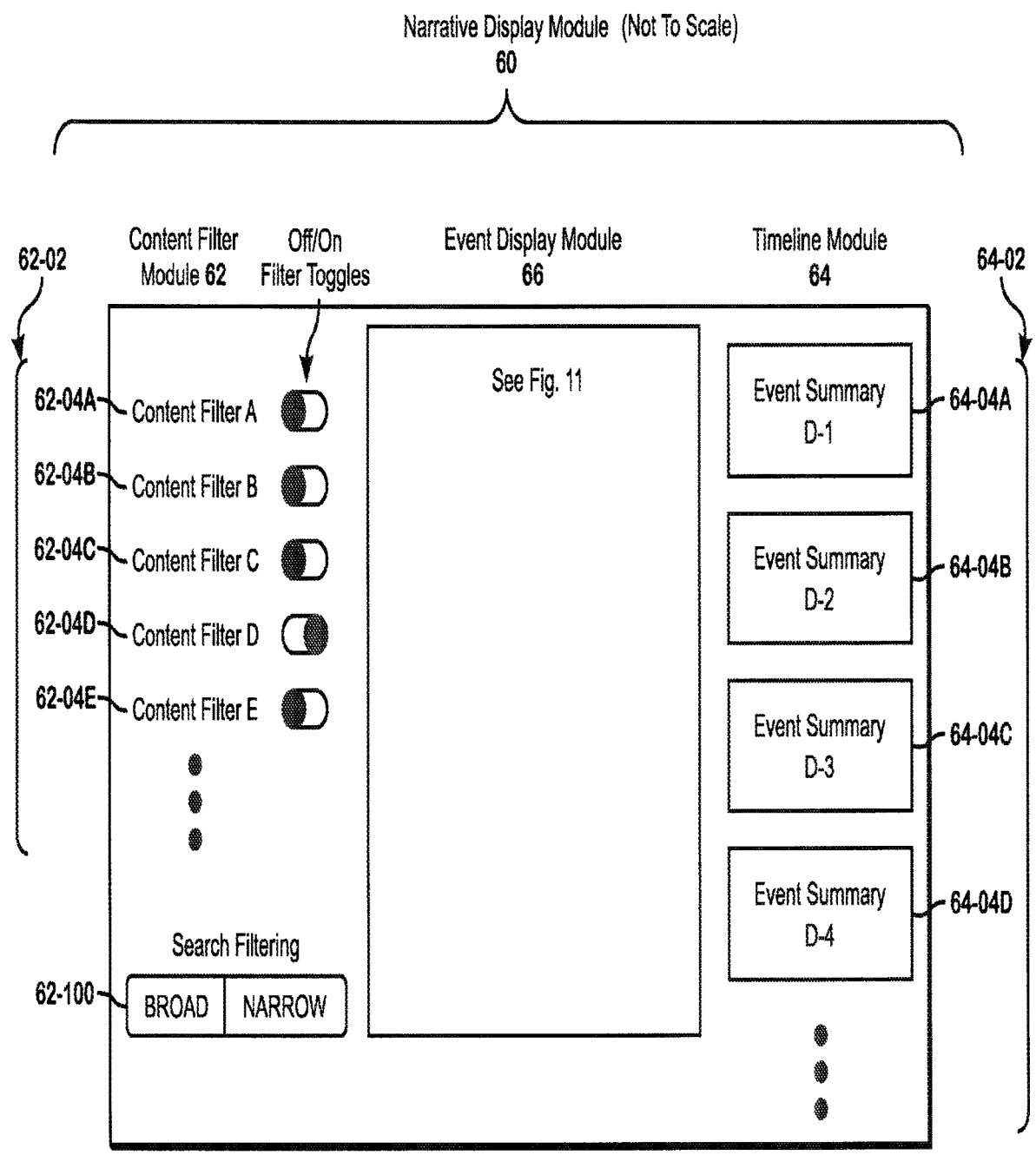
FIG. 5 is a schematic diagram of the narrative display module of the invention.

With reference to FIG. 5, the narrative display module 60 is shown in schematic form for the purposes of describing interactivity within the module and the underlying algorithm that enables the interactivity. Descriptions of narrative display module features and functions begin with FIG. 9.

Returning to FIG. 5, the narrative display module 60 is shown including the content filter module 62, the timeline module 64 and the event display module 66. The content filter module 62 is the means by which the FEU selects content from a plurality of content categories. A set of content filters 62-02 is presented in an exemplary instance, as determined by a back-end user BEU. Each individual content filter 62-04 A-E, within the set of content filters 62-02, includes a name and a toggle switch that can be clicked to an "on" or "off" position. The FEU may select and deselect a plurality of individual content filter 62-04 toggle switches, according to their interest in the categories listed in the set of content filters 62-02. One of ordinary skill in the art would understand the applicant's design is not the exclusive embodiment.

In the exemplary instance shown in FIG. 5, the content filter toggle switches are in the "off" position for individual content filters 62-04A, 62-04B, 62-04C, and 62-04E, while the toggle switch for content filter 62-04D is in the "on" position. Accordingly, the set of event summaries 64-02, displayed in the timeline module 64, is composed of individual event summaries, each 64-04, that correspond to the exemplary content filter 62-04D shown as selected with its toggle switch "on" within the content filter module 62. The set of event summaries 64-02 contains individual event summaries 64-04A, 64-04B, 64-04C and 64-04D, where the exemplary display sequence D-1 for 64-04A through D-4 for 64-04D represents the chronological order of the event summaries relative to each other according to their unique sort dates 64-14 within the set 64-02 of event summaries associated with content filter 62-04D.

Also shown in FIG. 5 is a schematic representation of the event display module 66 within the narrative display module 60. In an exemplary instance, the FEU choses an event record of the event record module 66-04 to display in the event display module 66 by clicking on an individual event summary 64-04, displayed within the set of event summaries 64-02 shown in the timeline module 64. Subsequent clicking by the FEU on different individual event summaries, each 64-04, in the timeline module 64, causes each corresponding event record of the event record module 66-04 to display in the event display module 66. Subsequent clicking "on" and "off" by the FEU with the toggle switches of different individual content filters, each 62-04, in the content filter module 62, causes each corresponding event summary 64-04 to display as part of an updated set 64-02 in the timeline module 64 for further review and selection by the FEU of event summaries, each 64-04, for display of each corresponding event record of the event record module 66-04 within the event display module 66. One of ordinary skill in the art would understand the applicant's design is not the exclusive embodiment.

A plurality of individual content filters 62-04 may be clicked into the "on" position if desired by an FEU. In the present embodiment, the default setting for the content filter module 62 is to report from the database 4 each record that has an appropriate designation for any selected content filters 62-04. If desired by an FEU, search results may be filtered using the broad/narrow toggle function 62-100 located near the bottom of the content filter module 62. When multiple content filters 62-04 toggles are selected to be "on" and when the search filtering toggle is selected to be "narrow", then the only records reported from the database will be records that are designated for every one of the selected content filters. In such a case, if no records contain all of the selected content filter designations, and the "narrow" search filter function is used, then no records will be reported from the database, and accordingly, no event summaries 64-04 will be reported from the database 4 for display in the timeline module 64. One of ordinary skill in the art would understand the applicant's design is not the exclusive embodiment.

Figure 6:
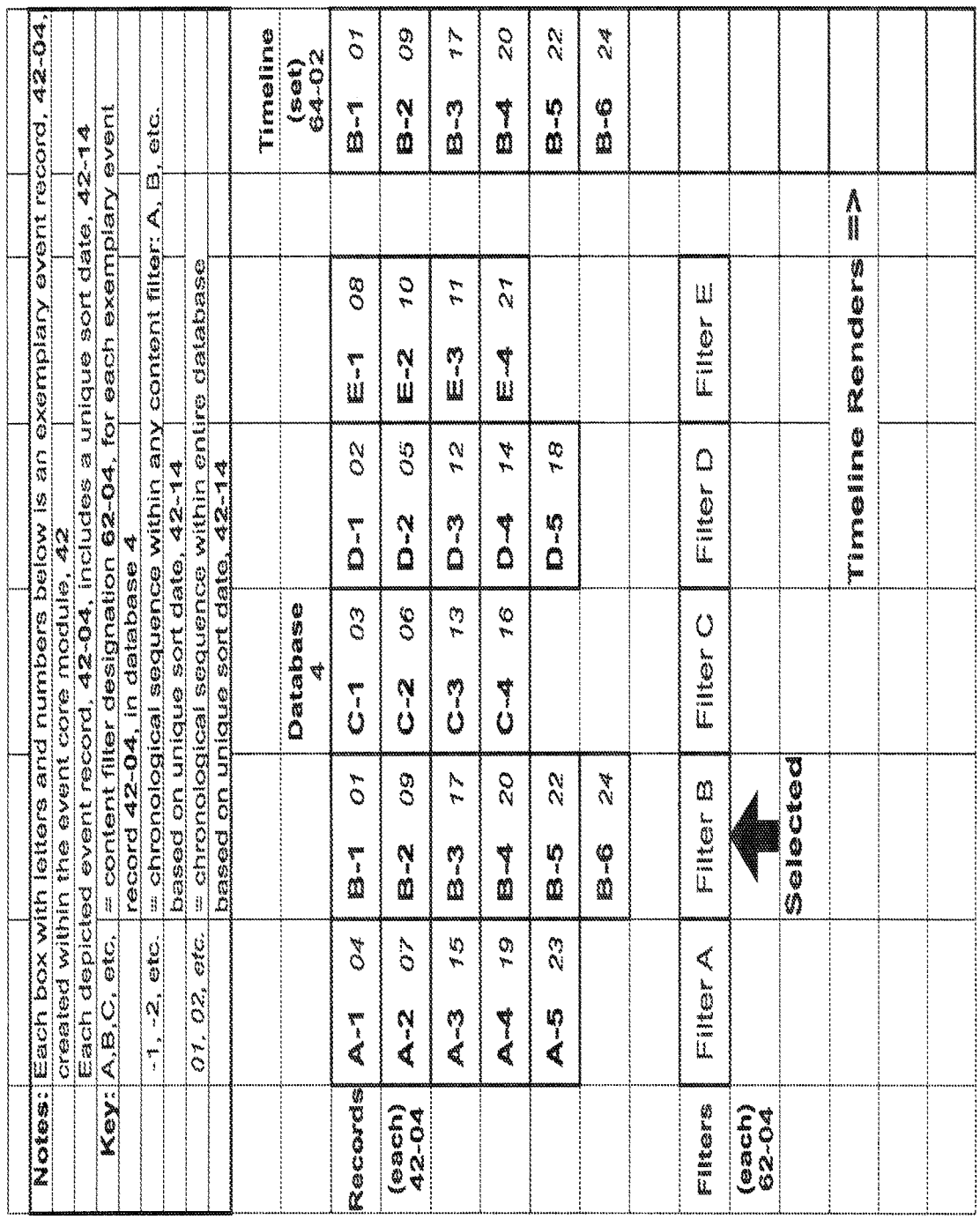
FIG. 6 is a schematic diagram of a case example of a functioning timeline builder system according to the invention.

The underlying algorithm with reference to the interactivity of the content filter module 62 and the timeline module 64 described above in FIG. 5 is shown in FIGS. 6, 7 and 8. The algorithm enables selections of content made available to front-end users FEU by back-end users BEU, utilizing the event creation module 40 to deploy the content management functionality of the invention. The underlying algorithm will be portrayed in three examples.

As shown identically in a plurality of keys for FIGS. 6, 7, and 8: each box with letters and numbers represents an exemplary event record 42-04 created within the core event module 42, with associated content in an exemplary instance of the database. Additionally, each depicted event record 42-04 includes a unique sort date 42-14, as designated by the back-end user BEU within the core event module 42.

The plurality of keys further include Capital Letters. Capital letters such as A, B, C, etc. represent exemplary content filter designations 62-04, for event records in the database, as determined by the back-end user BEU, specifically the taxonomies described above using a plurality of designations within the topic module, 46, the tag module, 48, and/or the story module, 50.

The plurality of keys further includes Dash Numbers. Dash numbers such as -1, -2, etc. represent the chronological sequence of the event records of the exemplary content filters 62-04 A-E (see FIG. 5), yielding relative chronological sequences such as A-1, A-2 and B-1, B-2, etc., based on their underlying unique sort dates 42-14 (A-E) as entered by an exemplary back-end user BEU.

The plurality of keys further include Italic Numbers. Italic numbers such as 01, 02, 03, etc. represent the chronological sequence of all event records in an exemplary database, regardless of content filter 62-02 A-E, based on their underlying unique sort dates 42-14 as entered by an exemplary back-end user BEU.

Case Example One

As shown in FIG. 6, the area in the figure under the heading "Database, 4" shows an exemplary set of database records, with designations conforming to the key and notes above, "A-1" thru "E-4". Below the database depiction is a set of boxes representing the plurality of content filters 62-04 A-E, of the content filter module 62. An arrow and bold text indicate that for the purposes of the example in FIG. 6, "Filter B" has been selected by the front-end user FEU within the content filter module 62. As a consequence, the column on the right, under the heading "Timeline", shows an exemplary rendering of a timeline 64-02, which is a set of event summaries, each 64-04, within the timeline module 64, that reflects the selection of content "Filter B", within the content filter module 62. Specifically, all six exemplary records, each 64-04, that are designated under content "Filter B", within the database 4 are shown in chronological order in the exemplary timeline set 64-02 of the timeline module 64.

Case Example Two

As shown in FIG. 7, the notes, key and exemplary database depiction are identical to FIG. 6. Illustrating a second scenario, arrows and bold text beneath the content filters 62-04 A-E, of the content filter module 62 indicate that for the purposes of the example in FIG. 7, "Filter A", "Filter C" and "Filter E" have been selected by an exemplary front-end user FEU within the content filter module 62 of the invention. As a consequence, the column on the right, under the heading "Timeline", shows an exemplary rendering of a timeline 64-02, which is a set of event summaries, each 64-04, within the timeline module 64 that reflects the selection of the three filters 62-04A, 62-04C and 62-04E. Specifically all thirteen exemplary records each 64-04, that are designated under "Filter A", "Filter C" and "Filter E" are displayed in chronological order—noting that the chronological sequence displayed in the exemplary timeline 64-02 is governed by relative placement in time across the entire archive database, as indicated by the unique sort dates 42-14, represented by numbers in italics: 03, 04, 06, etc.

Case Example Three

As shown in FIG. 8, the notes, key and exemplary database depiction are identical to FIG. 6 and FIG. 7. Illustrating a third scenario, arrows and bold text beneath the content filters 62-04 A-E indicate that for the purposes of the example in FIG. 8, "Filter C" has been un-selected, whereas "Filter A" and "Filter E" remain selected by an exemplary front-end user FEU within the content filter module 62.

As a consequence, the column on the right, under the heading "Timeline", shows an exemplary rendering of a timeline 64-02, which is a set of event summaries, each 64-04, within the timeline module 64 that reflects the selection of the two filters 62-04A and 62-04E, and the removal of the third filter 62-04C. Specifically all nine exemplary records each 64-04, that are designated under "Filter A" and "Filter E" are displayed in chronological order—noting that the chronological sequence displayed in the exemplary timeline 64-02 is governed by relative placement in time across the entire archive database, as indicated by the unique sort dates 42-14, represented by numbers in italics: 03, 04, 06, etc. One of ordinary skill in the art would understand the applicant's design is not the exclusive embodiment.

With reference to FIGS. 9-19, a front-end user environment for a timeline builder system is shown as viewed through a general user interface on a window based computer.

Figure 9:
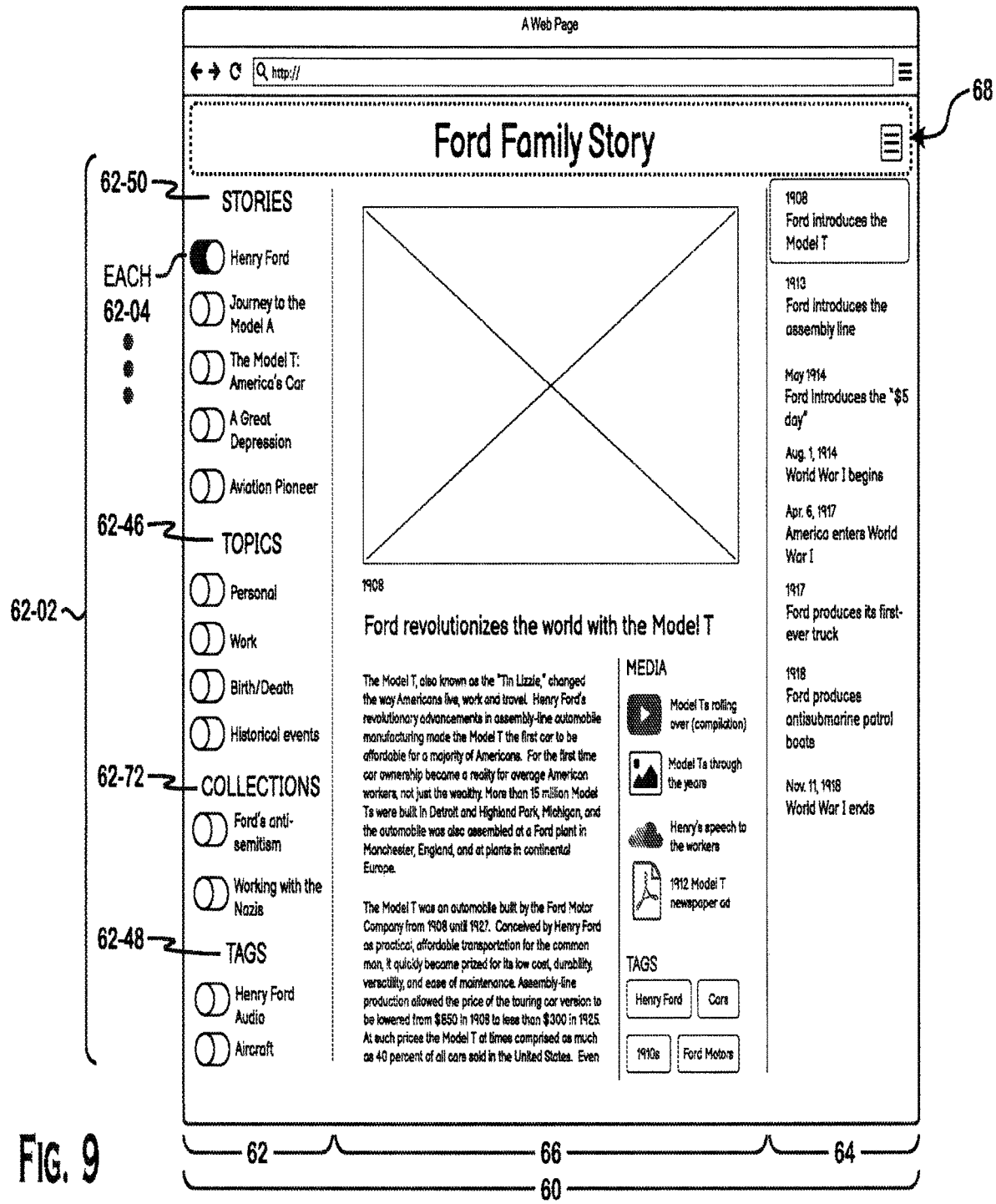
FIG. 9 is a schematic view of a front-end user environment of a timeline builder system according to the invention as viewed through a general user interface on a window based computer.

As shown in FIG. 9, the content management configuration 1X includes the narrative display module 60. In the exemplary embodiment the narrative display module 60 is generally composed of the following major panels: a content filter module 62, a timeline module 64, an event display module 66 and a fixed element module 68.

In the exemplary embodiment, the narrative display module 60 allows the front-end user FEU to select and deselect the events displayed in the timeline module 64. One of ordinary skill in the art would understand the applicant's design is not the exclusive embodiment.

In an exemplary embodiment of the invention, the content filter module 62 allows a front-end user FEU to view and make selections among content categories established by a back-end user BEU, specifically within the topic module 46, the tag module 48 and the story module In the exemplary embodiment, the content filter module 62 will include a button in a desktop view that allows the content filter module 62 to be collapsed, so that more space is given to the event display module 66. One of ordinary skill in the art would understand the applicant's design is not the exclusive embodiment. In the exemplary embodiment, when the button is selected again, the content filter module 62 will be visible.

In an exemplary embodiment of the invention, the content filter module 62 provides a plurality of content categories: Stories 62-50, Topics 62-46, Collections 62-72, and Tags 62-48 presented as a set 62-02 within the content filter module 62 as shown in FIG. 9. Within the plurality of content categories 62-50, 62-46, 62-72, and 62-48 are individual content filters, each 62-04, which are shown in a vertical list and that may be selected or deselected by the front end user FEU by means of an "off/on" toggle switch (see FIG. 5). The content filter module 62 is displayed in a vertical panel on the left side of the front-end user FEU's screen. It occupies about 15% to 20% of the horizontal screen area. One skilled in the art would understand the applicant's design is not the exclusive embodiment. The content filter module 62 may be scrolled up and down by the front-end user FEU. The front-end user FEU may choose one, or more than one individual content category 62-04, according to their interests at any moment during a front-end user FEU session, by clicking its associated toggle switch into the "on" position.

As shown in FIG. 9, the content filter module 62 includes a plurality of topics 62-46. The plurality of topics 62-46 are depicted as a list of elements, each 62-04. One skilled in the art would understand the applicants design is not the exclusive embodiment. Every event record of the event record module 66-04 that may be displayed in the event display module 66 is associated with a topic from the plurality of topics 62-46. In one embodiment, the plurality of topics 62-46 may be organized in parent-child relationships, thereby allowing exemplary back-end users to create hierarchical content structures.

As shown in FIG. 9, the content filter module 62 further includes a plurality of tags 62-48. The plurality of tags 62-48 are depicted as list elements, each 62-04, which represents an optional type of content filter, providing the back-end users BEU with an opportunity for a secondary axis of content organization for the event records of the event record module 66-04 that may be displayed in the event display module 66. Each tag of the plurality of tags 62-48 are single dimensional and may not in the present embodiment be used to create hierarchical content structures. One skilled in the art would understand the applicant's design is not the exclusive embodiment.

As shown in FIG. 9, the content filter module 62 further includes a plurality of stories 62-50. The plurality of stories 62-50 are depicted as list elements, each 62-04, in the present embodiment of the content filter module 62. The plurality of stories 62-50 represent an optional means of grouping event records of the event record module 66-04 that may be displayed in the event display module 66 whereby the back-end user BEU may designate a set 62-02 of event records each 66-04 to present as grouping with its own content filter 62-04 for selection within the content filter module 62, that is independent of other designations that may be made within the topic module 62-46 or the tag module 62-48.

As shown in FIG. 9, the content filter module 62 further includes a plurality of collections 62-72. The plurality of collections 62-72 are depicted as list elements, each content filter 62-04, in the present embodiment of the content filter module 62. The collections module 72 represents an optional means of grouping event records of the event record module 66-04 that may be displayed in the event display module 66 whereby the front-end user FEU may designate a set 72-02 of event records, each 66-04, to present as grouping with its own content filter 62-04, for selection within the category of collections 62-72 within the content filter module 62. Further, a collection set 72-02 of the event records module 66-04 of the plurality of collections 62-72 may be shared by an exemplary front-end user FEU with other front-end users FEU or may be kept private by the exemplary front-end user who created the collection set 72-02. One of ordinary skill in the art would understand the applicant's design is not the exclusive embodiment.

Figure 10:
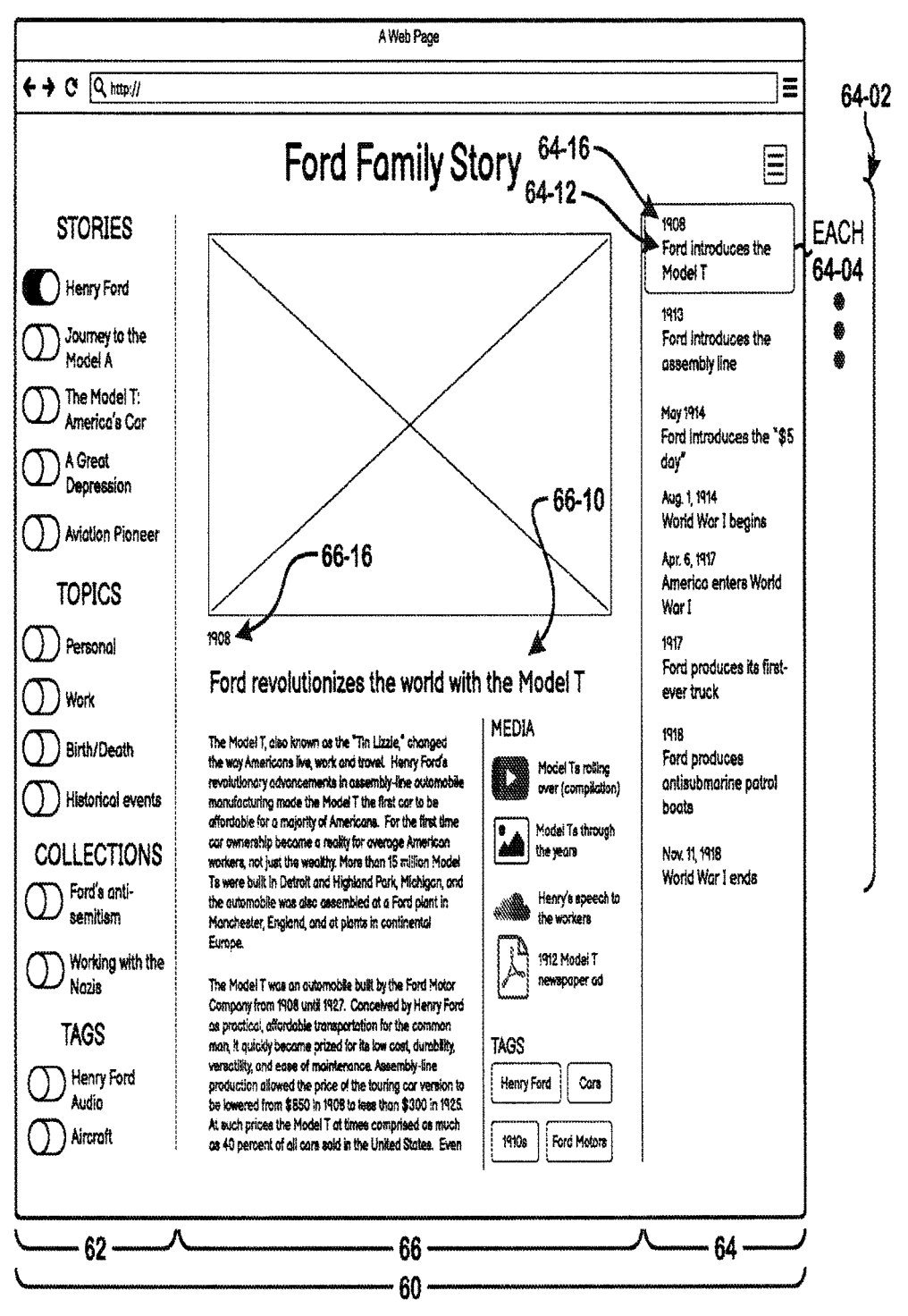

As shown in FIG. 10, in an exemplary embodiment of the invention, the narrative display module 60 includes the timeline module 64 which permits all content items that fit the categories selected within the content filter module 62 to be displayed as a set 62-02 of event summaries, each 62-04, in chronological order for examination by an exemplary front-end user FEU. The timeline module 64 is displayed in a vertical panel on the right side of the front-end user FEU's screen. It occupies about 15% to 20% of the horizontal screen area. One skilled in the art would understand the applicant's design is not the exclusive embodiment.

As further shown in FIG. 10, the timeline module 64 includes a plurality of event summaries, each 64-04. The plurality of event summaries 64-04 includes a plurality of dates and titles that are consistent with each event record. The plurality of event summaries 64-04 each further includes a display title 64-12 and a display date 64-16. The display titles 64-12 and display dates 64-16 are shown to the front-end user FEU within each event summary 64-04 of the set of event summaries 64-02 to aid in the front-end user FEU understanding of the flow and sequence of their respective events of the event record module 66-04 across time. Further, the display titles 64-12 and display dates 64-16 provide guidance to front-end user FEU who may seek further information and may choose to consume additional content. One of ordinary skill in the art would understand the applicant's design is not the exclusive embodiment.

Figure 11:
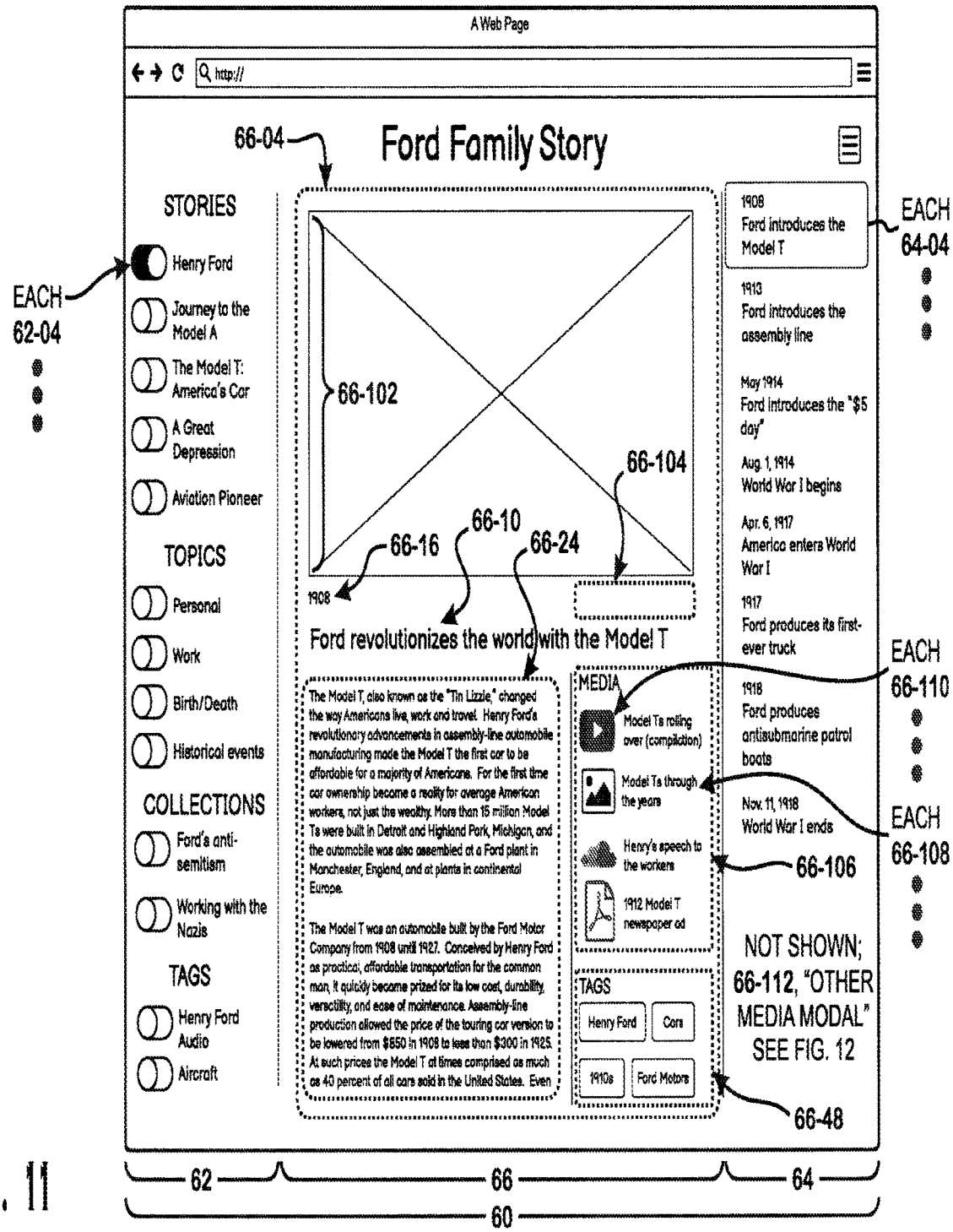
FIG. 11 is another schematic view of a front-end user environment of a timeline builder system according to the invention as viewed through a general user interface on window based computer.

As shown in FIG. 11, in an exemplary embodiment the narrative display module 60 further includes the event display module 66 which permits the front-end user FEU to explore and consume content related to their event selections within the timeline module 64. The event display module 66 displays each event record of the event record module 66-04 if and when selected by an FEU from the timeline module 64. The event record module 66-04 includes a media file within an event record module image frame 66-102. The media displayed in the event record module image frame 66-102 which may be a single image, a series of images ("Gallery"), or a video, and is designated by a unique media file name.

The event record module 66-04 further includes a caption frame 66-104 to display image captions for single or multiple images, immediately below the event record module image frame 66-102 as shown in FIG. 11. The image caption displayed is part of the media file associated with a unique media file name.

As shown in FIG. 11, the event record module 66-04 further includes a display date 66-16 opposing the caption frame 66-104. The display date 66-16 conveys a timeframe for the corresponding event in the event record module 66-04. Further, the display date 66-16 reports the same record from the database 4, as is shown as the display date 64-16 in an exemplary event summary 64-04 within the timeline module 64. The back-end user BEU creating an event can choose from a plurality of formats for determining a display date, 64-16 and 66-16, including a date range, a month, a span of months, a season, a year, a span of years, etc. in addition to using a specific date.

As shown in FIG. 11, the event record module 66-04 further includes an event title 66-10 positioned below the display date 66-16. In the present embodiment, the event title 66-10 is the largest sized text element within the event display module 66-04. One skilled in the art would understand the applicant's design is not the exclusive embodiment.

In contrast, the display title 64-12 in FIG. 10, shown in an exemplary event summary 64-04 in the timeline module 64, is a different database record than an event title 66-10, in the event display module 66 as shown in FIG. 11. The display title 64-12, a.k.a short headline, is typically shorter than the event title 66-10, which allows for a more succinct title 64-12 to be used for event summary presentation within the timeline module, 64, and allows for a longer and more descriptive event title 66-10 to be used for a full event record presentation within the event display module 66.

As shown in FIG. 11, the event record module 66-04 further includes an event copy frame 66-24 positioned below the event title 66-10. The event copy frame 66-24, is the primary text-based means of describing an event. The event copy frame 66-24 typically provides an explanatory narrative encompassing all other elements of an exemplary displayed event of the event record module 66-04.

As shown in FIG. 11, the event record module 66-04 further includes an other media title frame 66-106 positioned to the right of the event copy frame 66-24. The other media title frame 66-106 provides links to other media files, which are indicated by icons 66-110 and brief text descriptions 66-108. Each media file title 66-108 corresponds to a unique media file name within the database 4 as designated by a back-end user BEU during the event creation process.

Figure 12:
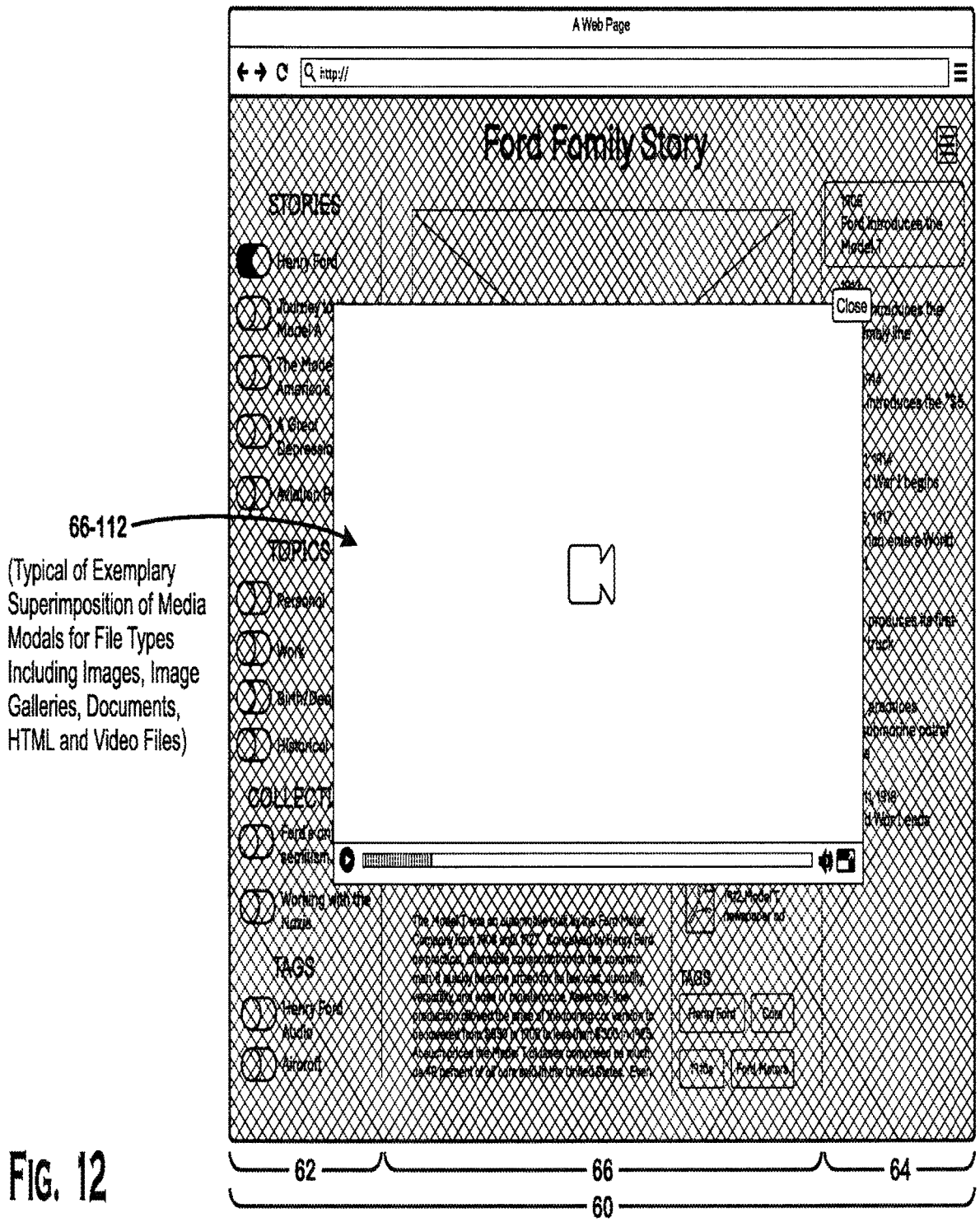
FIG. 12 is another schematic view of a front-end user environment of a timeline builder system according to the invention as viewed through a general user interface on window based computer.
Figure 13:
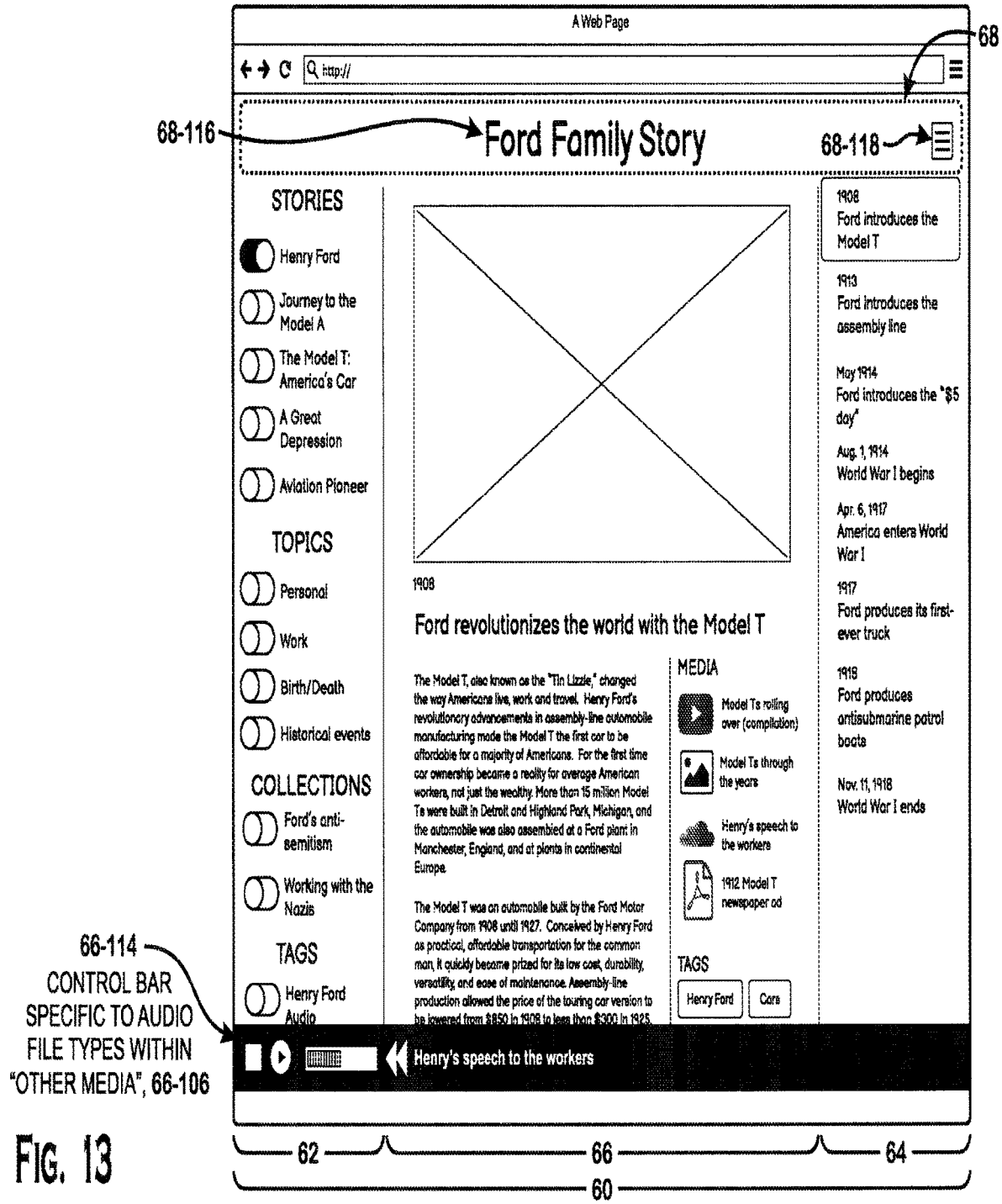
FIG. 13 is another schematic view of a front-end user environment of a timeline builder system according to the invention as viewed through a general user interface on window based computer.

As shown in FIG. 11, the event record module 66-04 further includes a plurality of media selections 66-108 within the other media title frame 66-106. The plurality of media selections 66-108 are positioned to the right of the event copy frame 66-24 for exemplary back-end users to provide as supplemental presentations to enrich an exemplary front-end user FEU's experience of a displayed event which contain other media modals 66-112. As shown in FIG. 12, the event record module 66-04 further includes other media modals 66-112 in which exemplary visual media files such as images, documents and video may be displayed. As shown in FIG. 13, audio media files are presented with an audio control bar 66-114 which allows an FEU to listen to audio while continuing to explore other content elements of the event record module 66-04. One of ordinary skill in the art would understand the applicant's design is not the exclusive embodiment.

Referring to FIG. 11, the event record module 66-04 further includes event record tags modules 66-48. The event record tags modules 66-48 are positioned below the event copy frame 66-24 which if clicked allow the front-end user FEU to select other event records for viewing that are likewise associated with the same event records tag module 66-48 as the currently displayed event record module 66-04. One skilled in the art would understand that the applicant's design is not the exclusive embodiment.

In the exemplary embodiment, the fixed element module 68 appears across the top of the display area and provides persistent site and user identification information as shown in FIG. 13

The fixed element module 68 includes a digital archive title 68-116. The digital archive title 68-116 is positioned above the event record module 66-04. The fixed element module 68 further includes a menu icon 68-118 positioned to the right of the digital archive title 68-118. One skilled in the art would understand that the applicant's design is not the exclusive embodiment.

Figure 14:
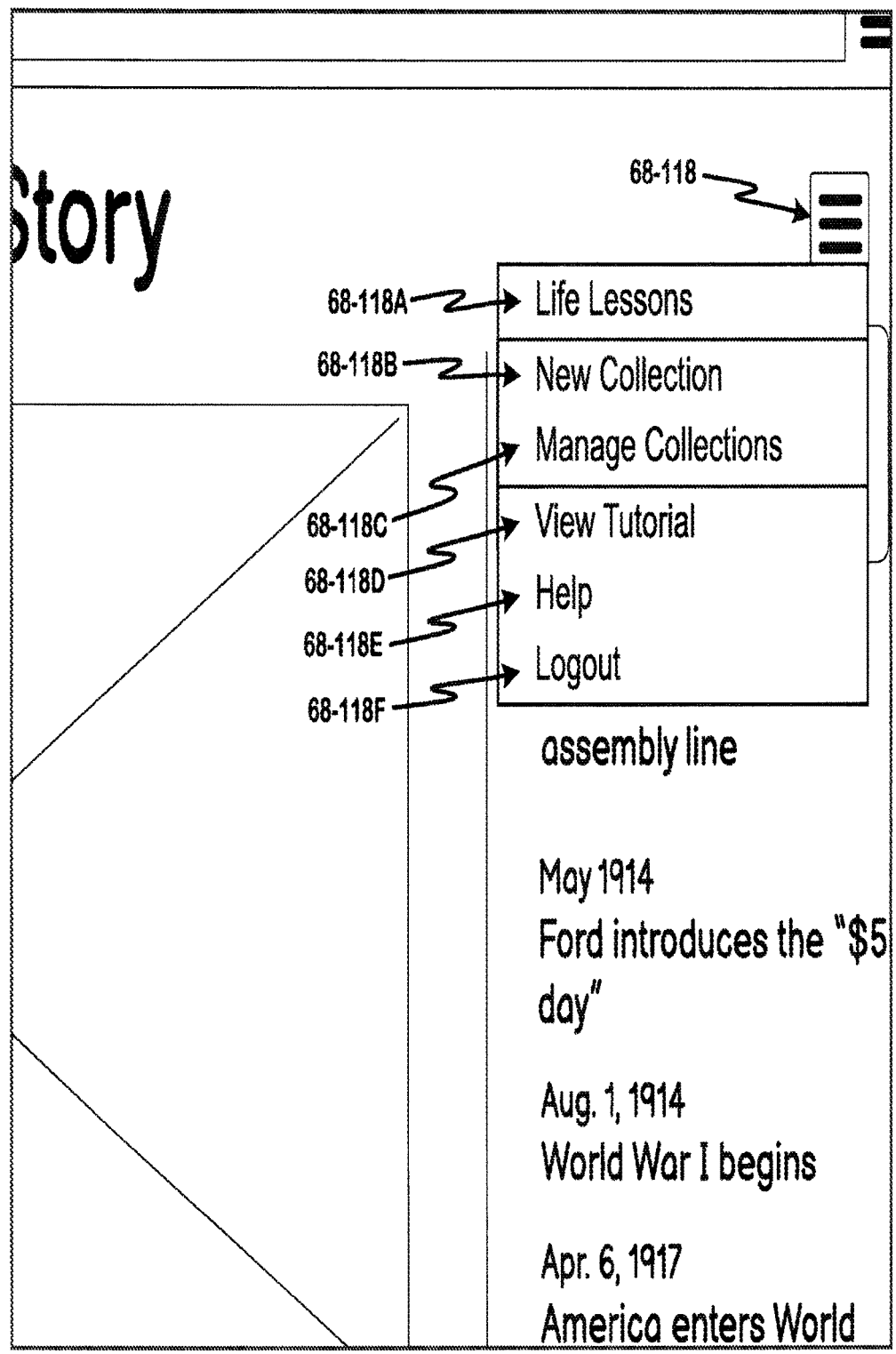
FIG. 14 is another schematic view of a front-end user environment of a timeline builder system according to the invention as viewed through a general user interface on window based computer.

As shown in FIG. 14, the menu icon 68-118 includes a plurality of menu options 68-118A-F. The plurality of menu options 68-118A-F includes a life lessons module option 68-118A, a new collections module option 68-118B, and a manage collections module option 68-118C.

The plurality of menu options 68-118A-F further includes a view tutorial module option 68-118D; a help module option 68-118E and a logout module option 68-118F. One skilled in the art would understand the applicant's design is not the exclusive embodiment.

The front end user FEU:

As shown in FIG. 5 and with reference to FIGS. 6-8, the four exemplary event summaries 64-04A-D displayed within the timeline module 64, represent the complete set of event summaries 64-02 associated with the content filter 62-04D, displayed within the content filter module 62. Each displayed event summary 64-04A-D is presented in a distinct space within the event timeline module set of event summaries 64-02, and listed in chronological order, with earlier display dates 64-16, at the top proceeding vertically downward toward later display dates 64-16, at the bottom. There is no limit to the number of event summaries 64-04 that can be selected for display within an event timeline module set of event summaries 64-02, other than the total number of events that have been curated by the back-end user BEU and entered into an exemplary database 4. The set of event summaries 64-02 may be scrolled up and down, as needed within the timeline module 64, by a front-end user FEU.

The front-end user FEU seeking further information related to an exemplary event summary 64-04, selects that event summary by clicking on it within the timeline module, 64. In response to this selection, as shown in FIG. 11, the related event record module 66-04 with all of its associated content 66-102, 66-104, 66-10, 66-16, 66-24, 66-106, 66-108, 66-110, 66-112, 66-114, 66-48 is reported from the exemplary database 4 for presentation in the event display module 66. The selected event summary 64-04, is highlighted within the timeline module 64 as a placeholder and aid to front-end user FEU navigation.

While consuming content from the displayed event of the event record module 66-04 within the event display module 66 an exemplary front-end user FEU may also continue to scroll through and consider selections from the displayed set 62-02 within the content filter module 62 and the displayed set 64-02 within the timeline module 64. If a front-end user FEU selects a new event summary 64-04 to examine by clicking on it within the timeline module 64, the newly selected event record module 66-04 with all of its associated content 66-102, 66-104, 66-10, 66-16, 66-24, 66-106, 66-108, 66-110, 66-112, 66-114, 66-48 will be reported from the exemplary database 4 for presentation in the event display module 66. Moreover, should the front-end user FEU select or deselect other content filters 62-04 within the displayed set 62-02 of the content filter module 62 by clicking on the associated content filter toggle switches, the associated event summaries 64-04 will be added to or removed from the displayed set of event summaries 64-02 within the timeline module 64 as appropriate to the underlying algorithms (see FIGS. 6, 7 and 8). One of ordinary skill in the art would understand the applicant's design is not the exclusive embodiment.

The life lessons module 70, allows for the presentation of audio or video content that is not accessed by the front-end user FEU through the content filter module 62 and the timeline module 64. The use of the life lessons module 70 might include content that is not specific to a particular content category within content filter module 62 and/or that is not specific to a particular time or timeframe within timeline module 64. Further instances might include content that is relevant to a plurality of content categories within the content filter module 62 and/or that is relevant to a plurality of times or timeframes within timeline module 64.

Referring to FIG. 14, in exemplary embodiment, the front-end user FEU accesses the life lessons module 70, by clicking on the menu icon module 68-118, of the fixed element module 68 and then clicking on the life lessons option 68-118A. The front-end user FEU is then presented with a life lessons display module 70-120 that is similar in appearance to the presentation of the narrative display module 60, yet is different in the left and center columns.

The fixed element module 68, is substantially unchanged in appearance and functions, with a key exception being that menu option 68-118A displays "Home" and is the means by which the front-end user FEU exits the life lessons display module 70-120 and returns to the narrative display module 60 with the previously described presentations of the content filter module, 62, the timeline module 64, and the event display module 66. One of ordinary skill in the art would understand the applicant's design is not the exclusive embodiment.

Figure 15:
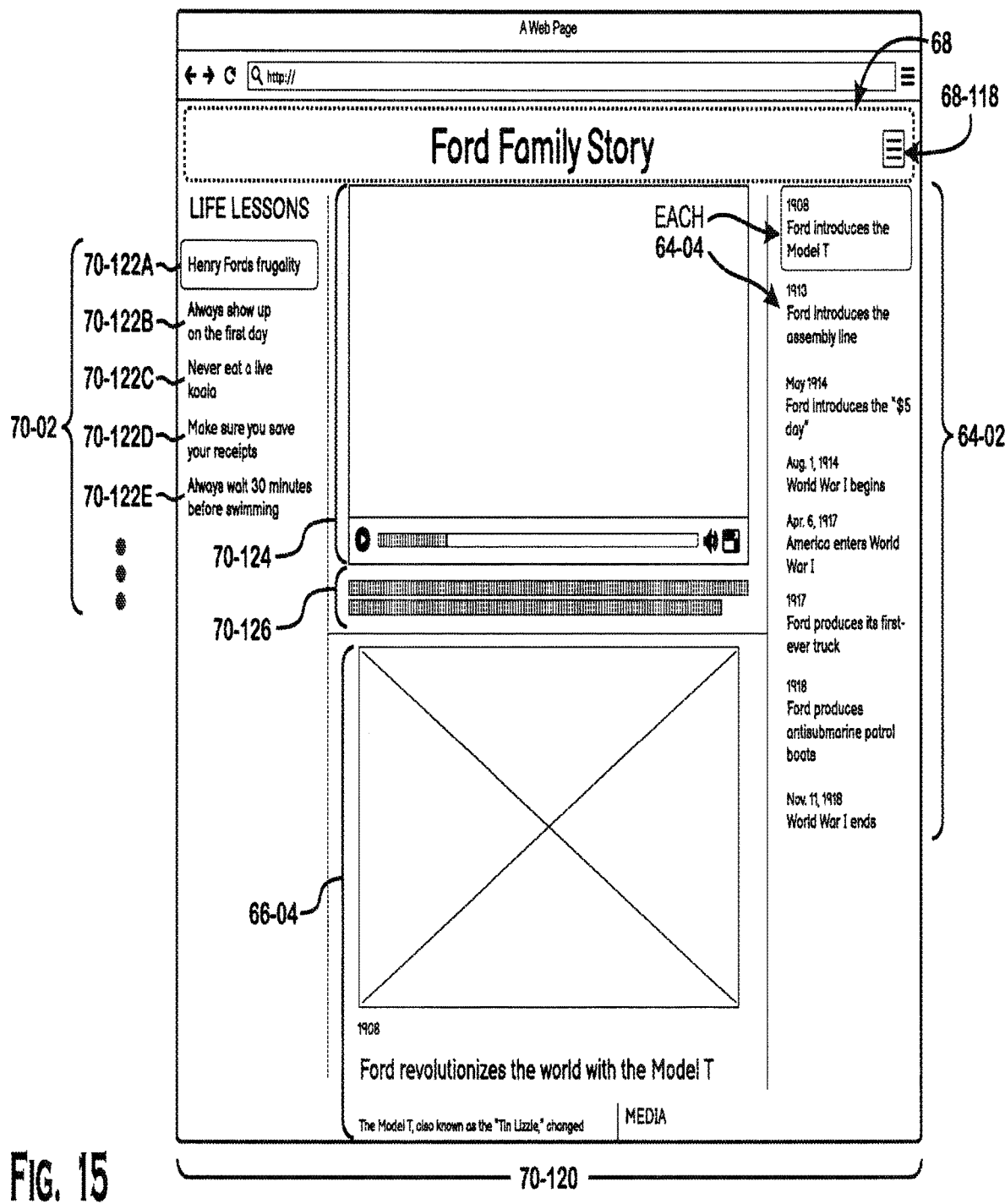
FIG. 15 is another schematic view of a front-end user environment of a timeline builder system according to the invention as viewed through a general user interface on window based computer.

As shown in FIG. 15, in the present embodiment of the life lessons display module 70-120, the left column presents an exemplary list of life lesson content 70-02 showing individual life lessons titles, each 70-122, available for the front-end user FEU to select for consumption. In the exemplary embodiment of FIG. 15, five life lesson titles, each life lesson content 70-122, are shown as 70-122A through 70-122E.

At the top of the center column is a media player frame 70-124, where exemplary video or audio content is displayed, along with the appropriate buttons for the front-end user FEU control of media file playback. Below the life lesson media player frame 70-124 is a life lesson description text frame 70-126. In the right column is the timeline module 64 which for the purposes of the life lessons display module 70-120 presents a set exemplary event summaries 64-02, each 64-04, for any exemplary event records module 66-04, that have been linked, by the back-end user BEU, to the specific life lessons content, selected by the front-end user FEU for consumption within the life lessons display module 70-120.

In the center column, below the life lesson description text frame 70-126 is an exemplary version of the event display module 66, which presents the exemplary event content of the event records module 66-04 for any individual event summary 64-04 selected by the front-end user FEU from the set of event summaries 64-02 of the timeline module 64 displayed in the right column as shown.

If no event records of the event records module 66-04 have been linked by the back-end user BEU to an individual life lessons title 70-122A, the timeline module 64 will be blank, having returned no individual event summaries 64-04 from the database 4 associated with the life lesson title 70-122A of the life lesson display module 70-120 selected by the front-end user FEU. The event display module 66 at the bottom of the center panel will also be blank.

In cases when individual event records of the event record module 66-04 of the event records module 66 have been linked to individual life lessons titles in the life lessons display module 70-120, the front-end user FEU will be able to consume all content associated with the event records module 66-04 within the presentation of the event display module 66 in the bottom center panel of the life lessons display module 70-120. One skilled in the art would understand the applicant's design is not the exclusive embodiment.

Referring again to FIG. 14 in the exemplary embodiment, the front-end user FEU accesses the collections module 72 by clicking on the menu icon 68-118 of the fixed element module 68 and then clicking on the new collections module menu option 68-118B if they wish to go directly to creating a new collection, or by clicking on the manage collections module menu option 68-118C, if they wish to use the collection manager functions of the collections module 72.

In the exemplary embodiment, collections of a collections module 72 differ from all other sets of individual event records of the event record module 66-04 in that collections are created by the front-end user FEU. All other designation and grouping of event records is performed by authorized back-end users BEU. Collections may also be shared among other front-end users FEU as chosen by exemplary front-end user FEU. Once created and/or shared, the front-end user FEU accesses their collections by using the content filter module 62.

As shown in FIG. 16, and referring again to FIG. 9, an exemplary instance of the collections module 72, appears as a distinct category 62-72 within the content filter module 62 under which appears a set of collection titles 62-02, with individual collection titles 62-04, shown as 62-04A and 62-04B, listed under the collections category 62-72 of the content filter module 62. Each collection title 62-04 represents a set 72-02 of event records of the event record module 66-04 that have been designated by a front-end user FEU to save, and optionally share as a set 72-02. If an individual collection title 62-04A, 62-04B is selected by an FEU, the individual event summaries 64-04 for the events of the set 72-02 associated with the selected collection category 62-04A, 62-04B are displayed in the set of event summaries 64-02, in the timeline module 64, for the front-end user FEU to examine and consume. If a collection title 62-04A, 62-04B is selected, all other event summaries 64-04, related to other content filters 62-04 are removed from the event summary set 64-02 displayed within the timeline module 64. If a different content filter or filters 62-04 is subsequently selected, the event summaries 64-04 of the previous selected collection 62-04A, 62-04B are removed from the set of event summaries 64-02 displayed in the timeline module 64. One of ordinary skill in the art would understand the applicant's design is not the exclusive embodiment.

Figure 16:
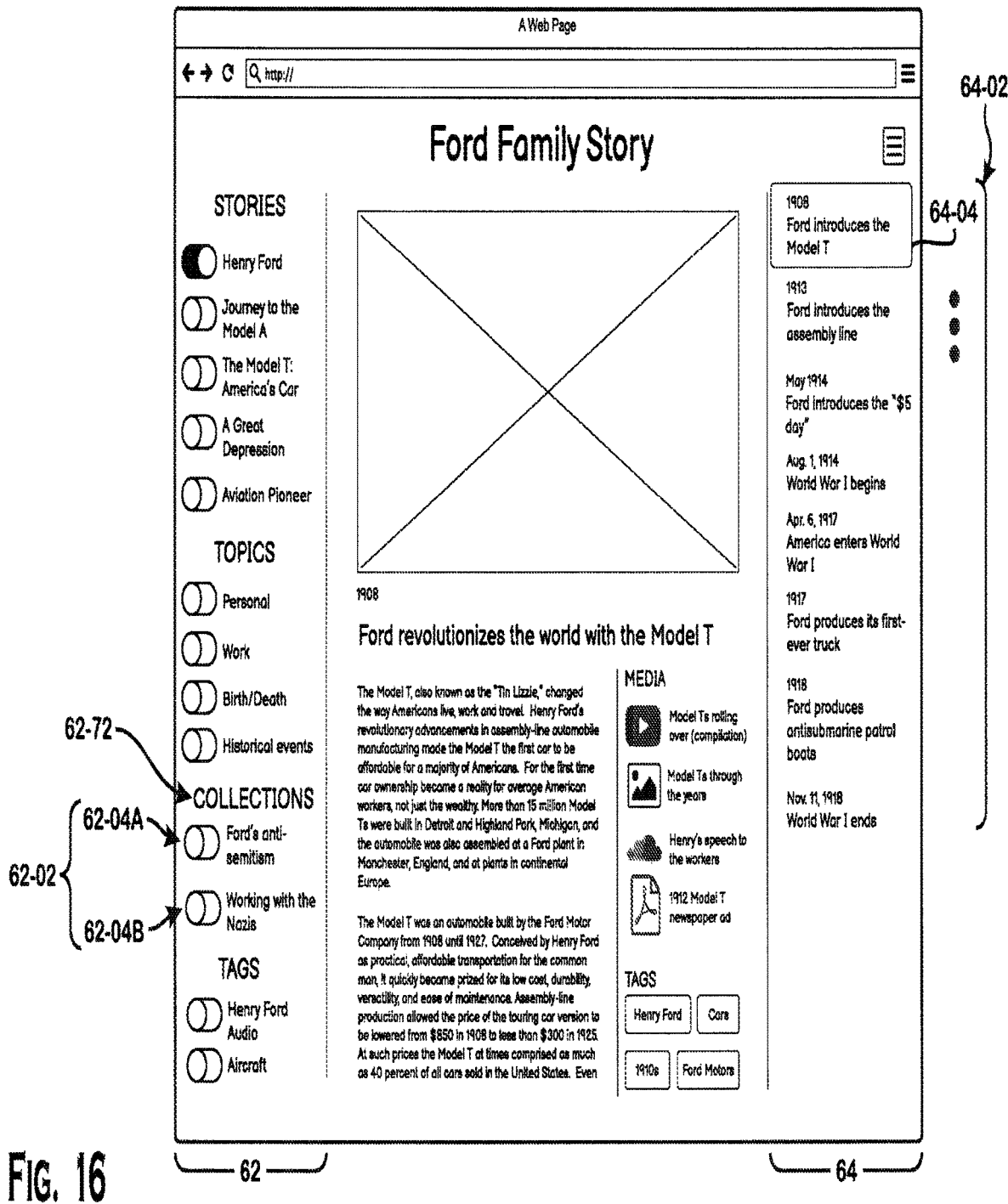
FIG. 16 is another schematic view of a front-end user environment of a timeline builder system according to the invention as viewed through a general user interface on window based computer.
Figure 17:
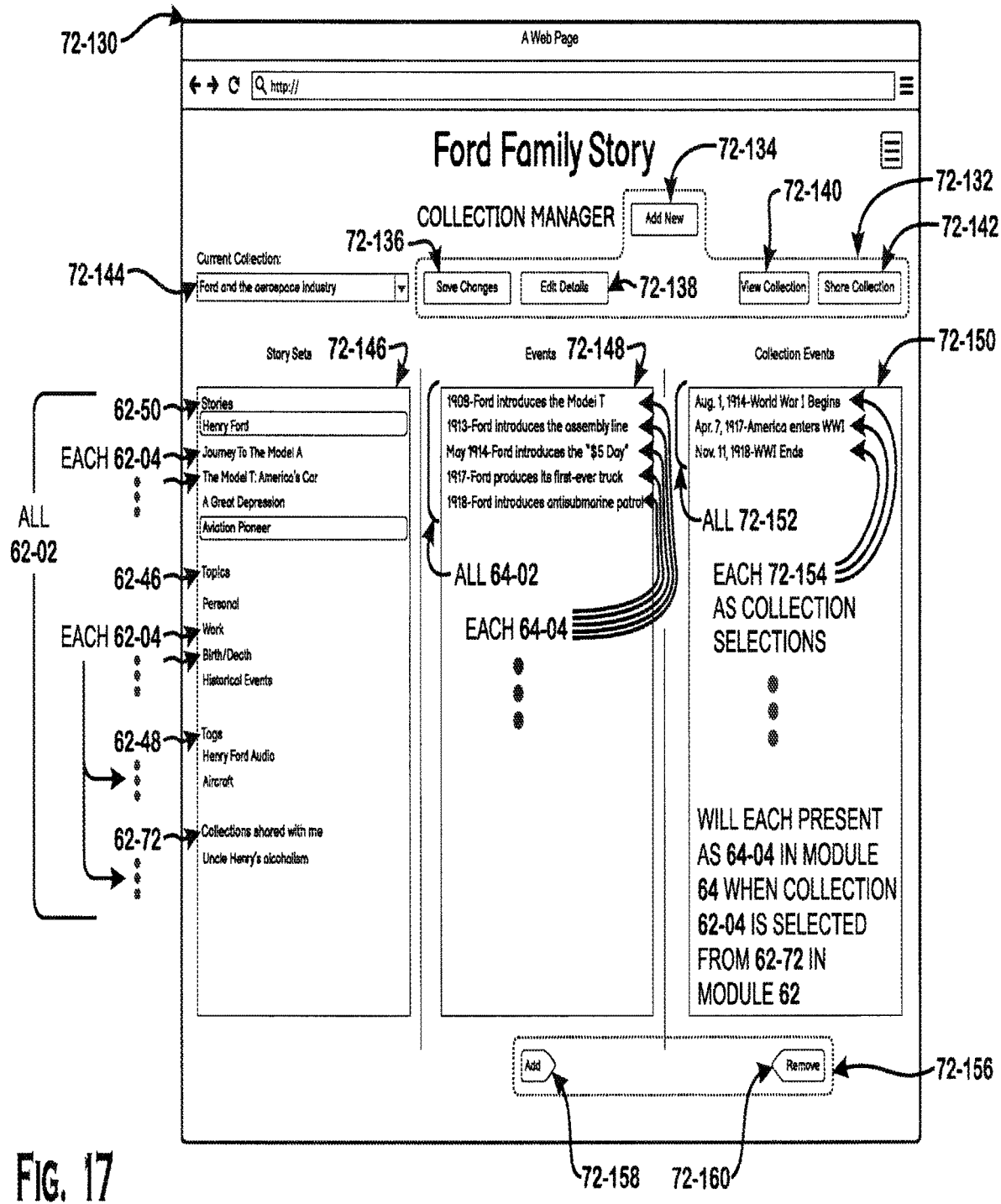
FIG. 17 is another schematic view of a front-end user environment of a timeline builder system according to the invention as viewed through a general user interface on window based computer.

Referring now to FIG. 17, upon clicking the menu option 68-118C of the menu 68-118 of the fixed element module 68 for the manage collections option of the collections module 72, the front-end user FEU is presented with a collection manager module control screen 72-130 that includes near the top a set of control buttons 72-132. The set of collection manager control buttons 72-132 of the collections module 72 includes functions for add new collection module 72-134, save changes module 72-136, edit details module 72-138, view collection module 72-140, and share collection module 72-142. To the left of the set of control buttons 72-132 is the collection selector 72-144. The collection selector 72-144 displays a drop-down list 62-02 containing the names of individual collections 62-04A, 62-04B as shown in FIG. 16, each representing a set 72-02 of event records of the event record module 66-04 that have been created by, or shared with, an exemplary front-end user FEU, and that will be displayed within the collections category 62-72 of the content filter module 62 of the narrative display module 60.

Below the collection selector 72-144 and the set of control buttons 72-132 are three vertical columns in the present embodiment. The left column is a frame 72-146 which contains a version of the content filter module 62 that shows individual content categories grouped within the content category modules for stories 62-50, topics 62-46, tags 62-48 and collections 62-72, all comprising the set of categories 62-02 displayed within the content filter module 62. One skilled in the art would recognize that the applicant's design is not the exclusive embodiment.

As further shown in FIG. 17, the center column of the collection manager module control screen 72-130 is a frame 72-148 which contains a version of the timeline module 64 that shows a list 64-02 of event summaries each 64-04 shown chronologically by display dates 64-16 and display titles 64-12 for event record module 66-04 that are available for inclusion in an exemplary collection set 72-02 and that are associated with content categories 62-04 selected by FEU in frame 72-146 of the collections module 72.

As further shown in FIG. 17, the right column of the collection manager module control screen 72-130 is a frame 72-150 which contains a list 72-152 of event display dates 64-16 and display titles 64-12 for events that have been provisionally selected by an exemplary front-end user FEU for inclusion in an exemplary collection set 72-02 for example by clicking and adding them from frame 72-148 of selectable events of the collections module control screen 72-130.

Below the columns for the display of selectable events 72-148 and the display of provisional collection events 72-150 are control buttons 72-156 that the front-end user FEU employs to Add, using button 72-158, exemplary titles among the available event summaries listed in the display of selectable events 72-148 to the provisional list of collection events 72-150 or to Remove, using button 72-160, exemplary event titles from the exemplary provisional list of collection of events 72-150. At any time, the FEU may click the save changes button 72-136 to preserve the group of events listed in 72-150 as a collection set 72-02. At any future time, the FEU may deploy the collection manager 72-130 to edit selections for a collection set 72-02. One of ordinary skill in the art would understand the applicant's design is not the exclusive embodiment.

In the exemplary embodiment, the functionality for creating/adding a new collection may be accessed by the front-end user FEU either by using the menu icon 68-118 of the fixed element module 68 and selecting new collection menu option 68-118B in the menu as shown in FIG. 14 or by selecting the add new collection module button 72-134 from the set of control buttons 72-132 at the top of the collection manager module control screen 72-130 of the collections module 72, as shown in FIG. 17. One skilled in the art would recognize that the applicant's design is not the exclusive embodiment.

Figure 18:
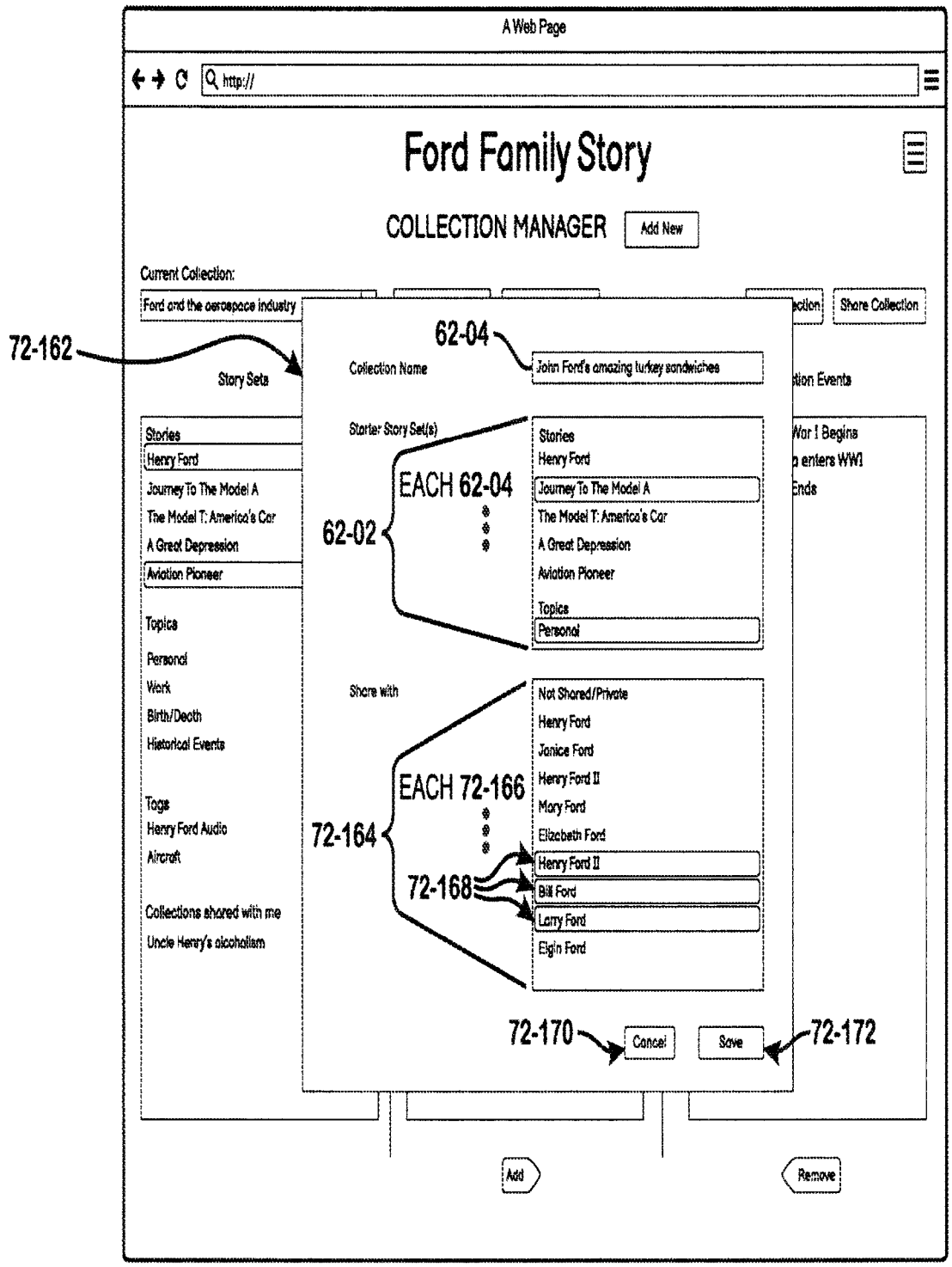
FIG. 18 is another schematic view of a front-end user environment of a timeline builder system according to the invention as viewed through a general user interface on window based computer.

As shown in FIG. 18, in order to create a new collection, the front-end user FEU is presented with the new collection modal 72-162, which is used to create a name for a collection 62-04, select initial content filters from a list displaying the current set of content filter 62-02, each 62-04, from which events may be chosen using the collection manager control screen 72-130 for inclusion following the content filter selections made within the new collection modal 72-162.

As shown in FIG. 18, the new collection modal 72-162 also displays a list 72-164 of exemplary users, each 72-166, from which an FEU may select other users, each 72-168 with whom to share the new collection created within the new collection modal 72-162. If an FEU makes no selections of other users 72-168, with whom to share the name for the collection 62-04, the exemplary collection remains private for use only by the FEU creating it. At any time, the FEU may cancel their selections 72-168 using the cancel button 72-170, or save their selections of content filters 62-04 and other users 72-168 using the save button 72-172. After saving their selections, the front-end user FEU is taken to the collection manager module control screen 72-130 to assemble their new collection set 72-152 of event records each 72-154. One skilled in the art would recognize that the applicant's design is not the exclusive embodiment.

With respect to managing existing collections within module 72-130, the front-end user FEU uses the collection selector 72-144, to choose the collection title 62-04 from an exemplary drop-down list. Any changes made to the selected collection 62-04 are saved using the save changes module 72-136.

Figure 19:
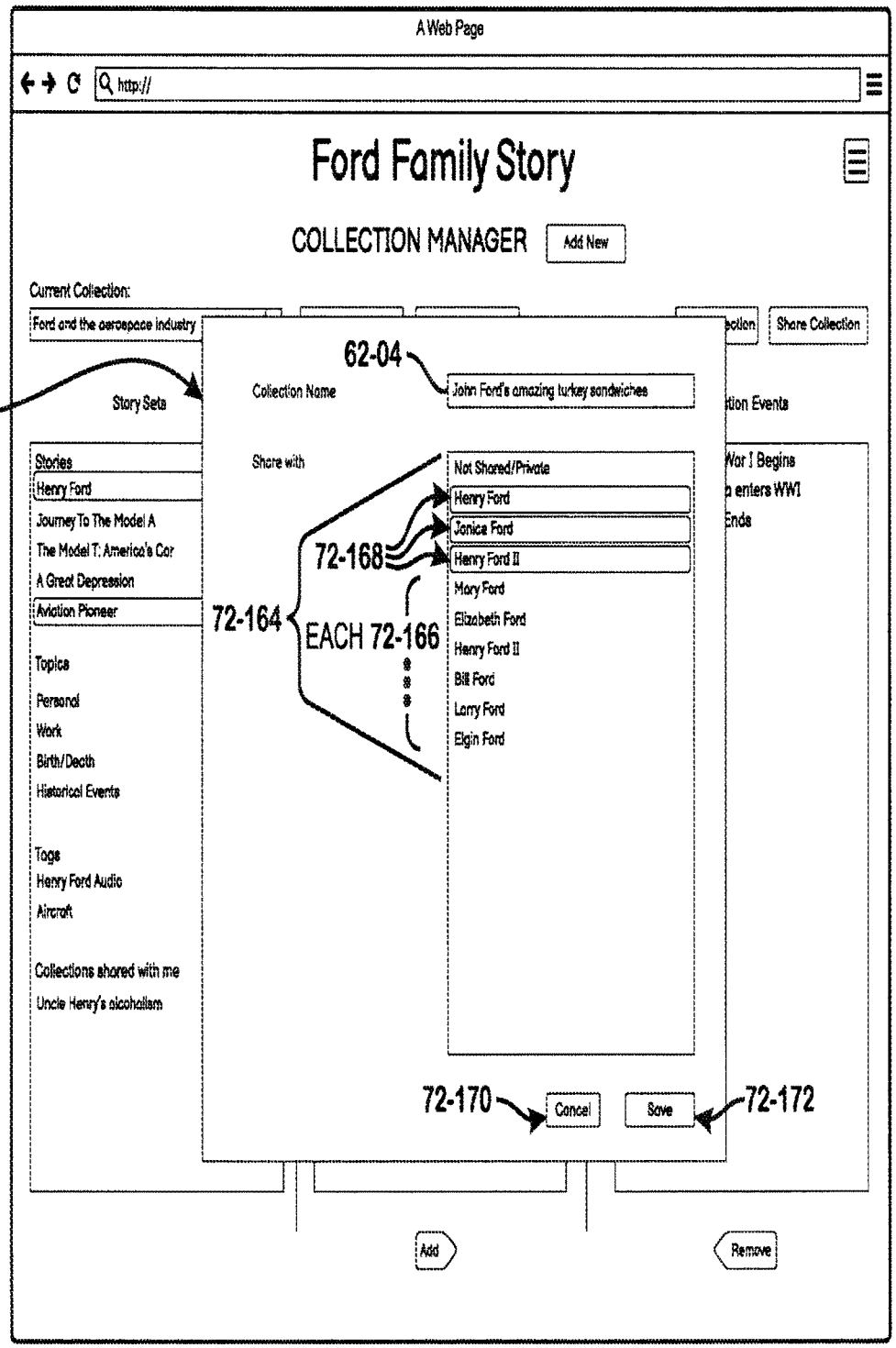
FIG. 19 is another schematic view of a front-end user environment of a timeline builder system according to the invention as viewed through a general user interface on window based computer.

With respect to sharing collections, the front-end user FEU has the option of selecting the names of other users of the exemplary instance of the invention first when creating a new collection, as described above within module 72-162, and at any time afterwards by using the edit details module 72-138 of the manage collections module 72-130 which presents the edit details modal 72-174, as shown in FIG. 19 and which is identical in functionality to the sharing functions described for module 72-162 with respect to modules 72-144, 72-164, 72-166, 72-168, 72-170 and 72-172.

In either case, after selecting the names of other users, the exemplary front-end user FEU uses the share collection module 72-142, of the collection manager module control screen 72-130 (see FIG. 17) to complete the sharing function and notify the other users by email that a collection has been shared with them. While assembling or editing a collection the front-end user FEU may choose to view the collection as a set 72-02 by choosing the view collection module 72-140, to open the collection in a separate tab of their browser. One skilled in the art would recognize that the applicant's design is not the exclusive embodiment.

With reference to FIGS. 20-26, a mobile version of the invention application, module 80, will be shown to all users whose browser window is less than 800 pixels wide. In the present embodiment, the exemplary mobile view is optimized for portrait orientation. Devices in landscape mode under a certain exemplary pixel width will present a black screen to the user with instructions to reorient their devices to a portrait view as shown in FIGS. 20-26. One skilled in the art would understand the applicant's design is not the exclusive embodiment.

Figure 20:
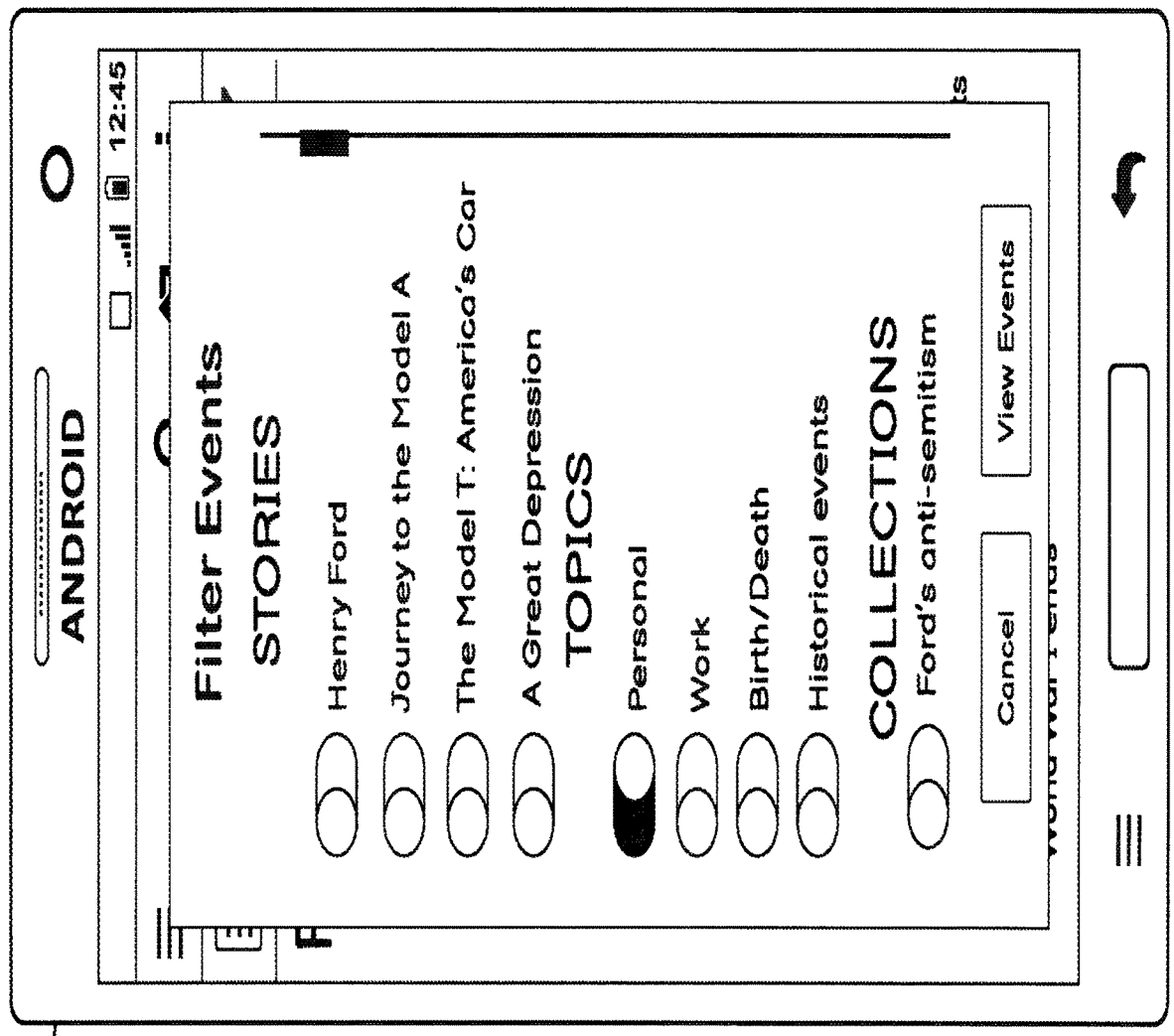
FIG. 20 is a schematic view of a front-end user environment of a timeline builder system according to the invention as viewed through a general user interface on a mobile based computing device.

Referring now to FIG. 20, an exemplary mobile version of the content filter module 80-62 is shown, including the functionality as previously described for content filter module 62 and its constituent components within the narrative display module 60.

Figure 21:
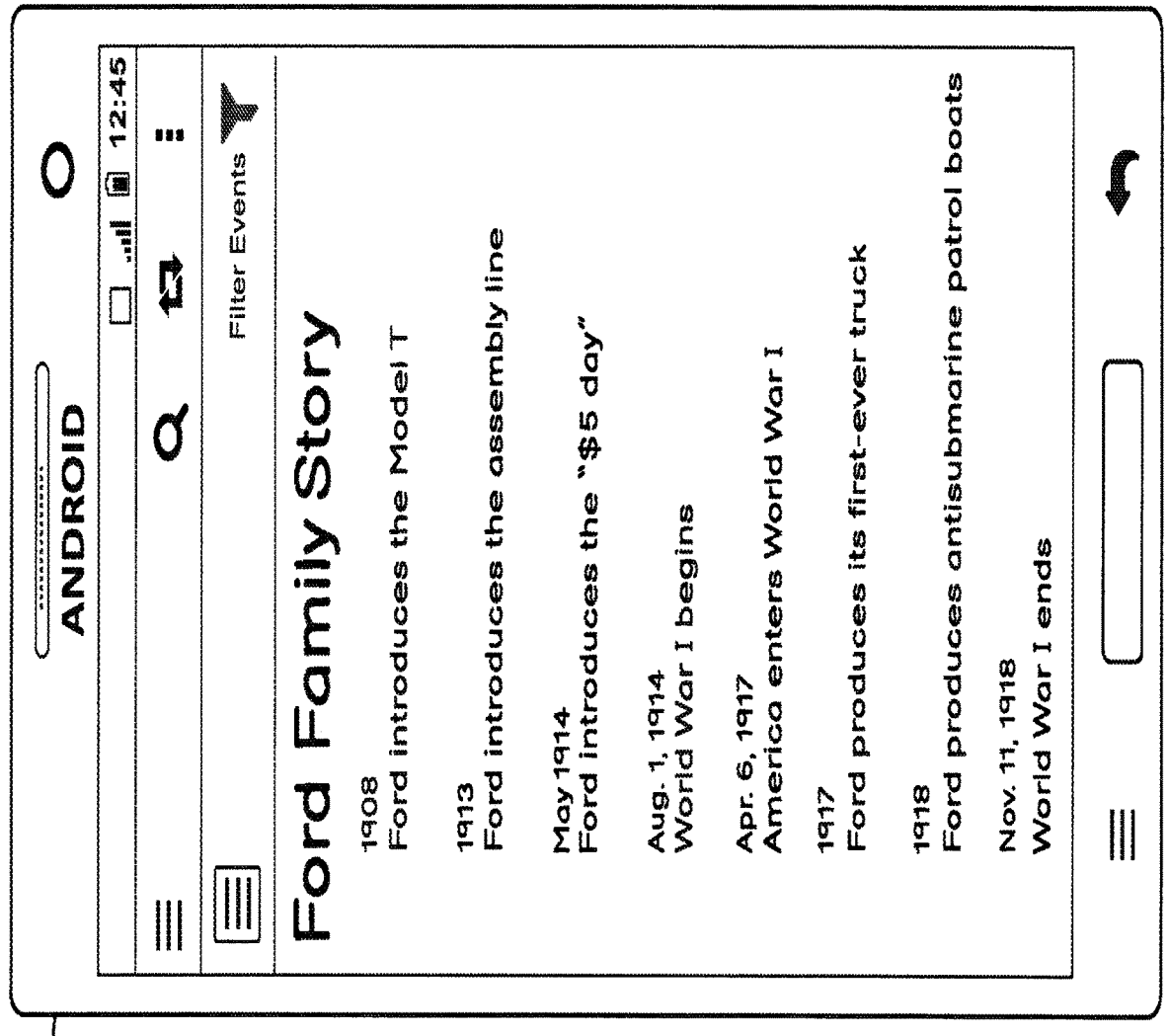
FIG. 21 is a schematic view of a front-end user environment of a timeline builder system according to the invention as viewed through a general user interface on a mobile based computing device.

Referring now to FIG. 21, an exemplary mobile version of the timeline module 80-64 is shown, including the functionality as previously described for timeline module 64 and its constituent components within the narrative display module 60.

Figure 22:
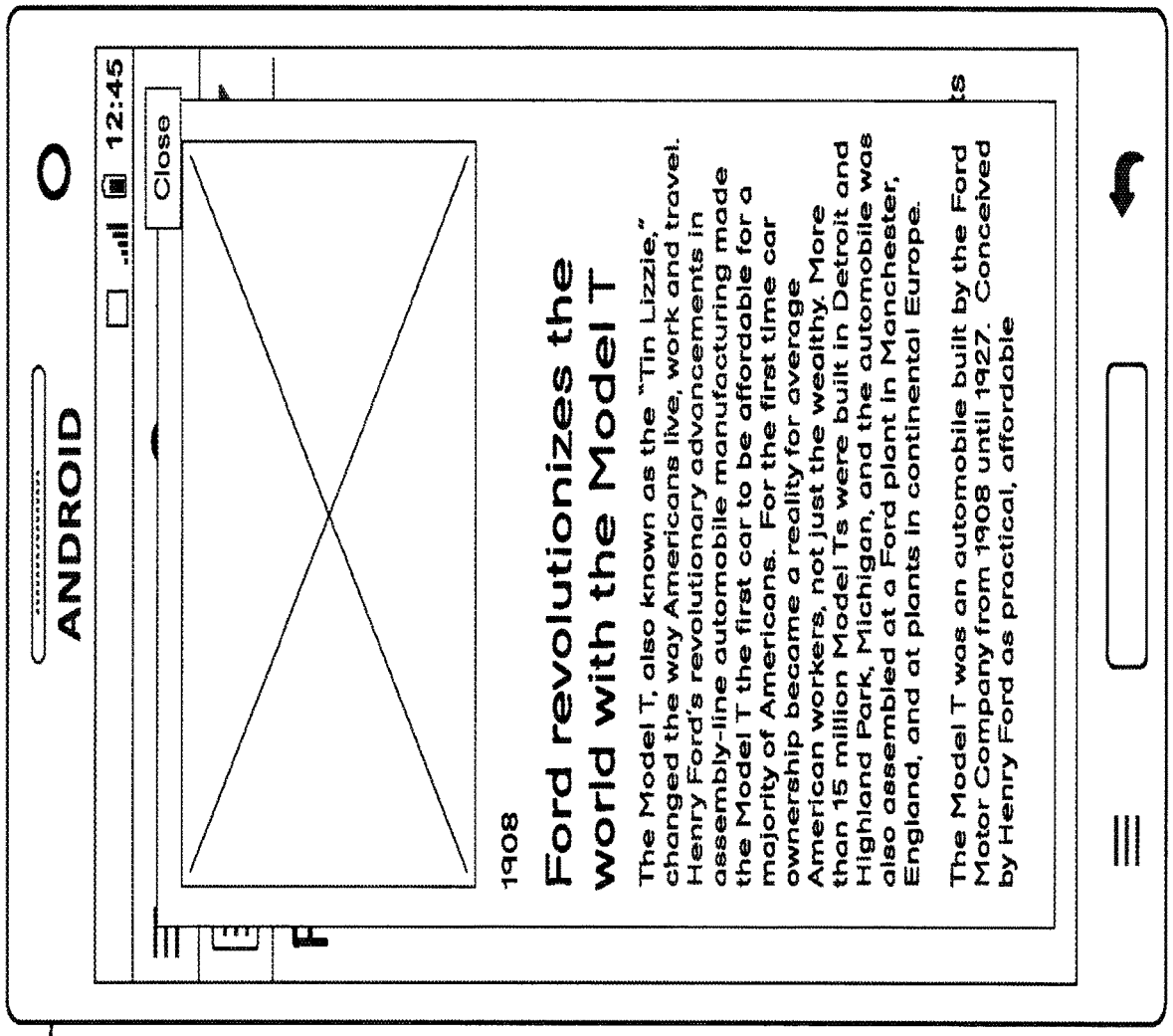
FIG. 22 is a schematic view of a front-end user environment of a timeline builder system according to the invention as viewed through a general user interface on a mobile based computing device.

Referring now to FIG. 22, an exemplary mobile version of the event display module 80-66 is shown, including the functionality as previously described for event display module 66 and its constituent components within the narrative display module 60.

Figure 23:
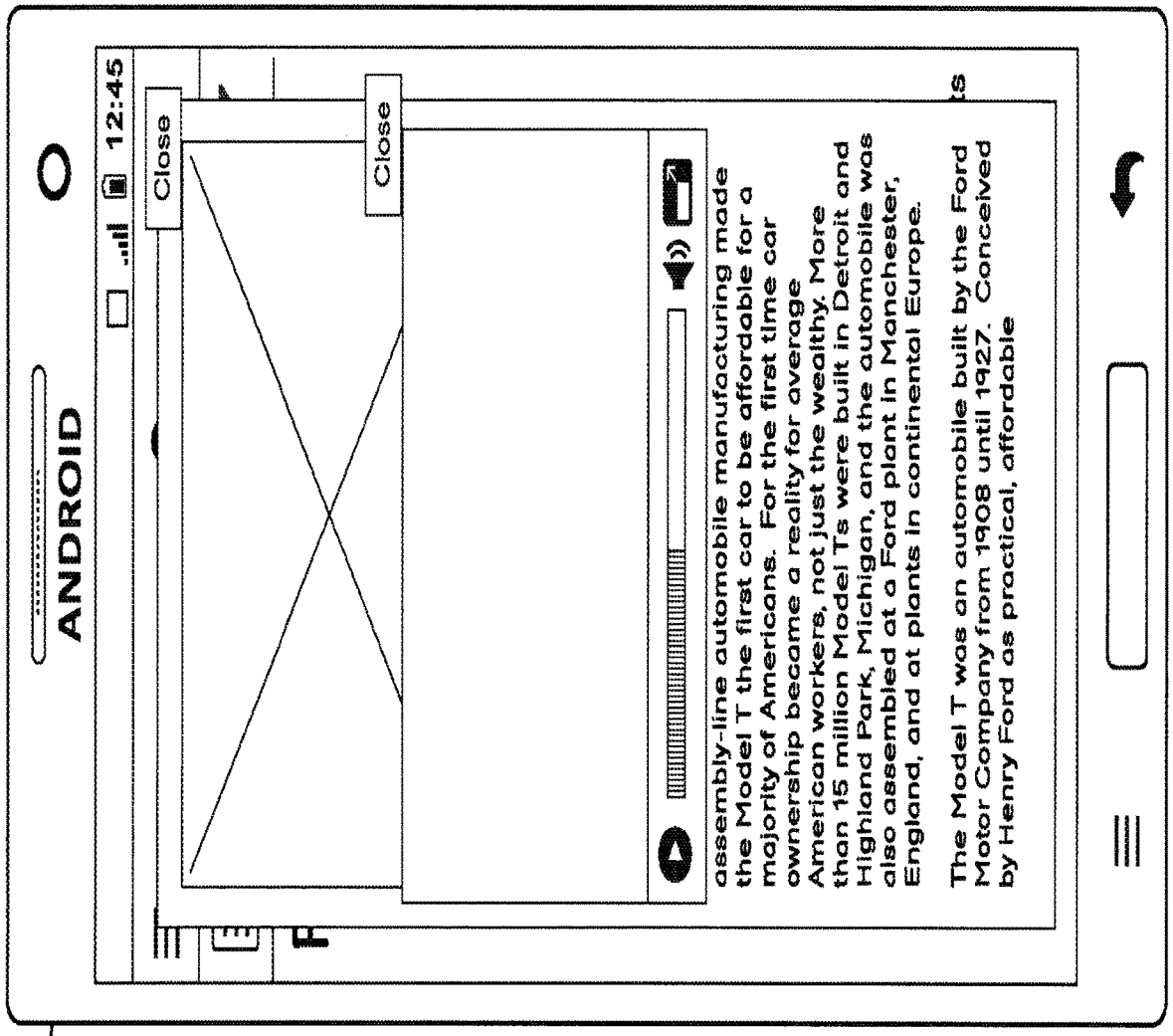
FIG. 23 is a schematic view of a front-end user environment of a timeline builder system according to the invention as viewed through a general user interface on a mobile based computing device.

Referring now to FIG. 23, an exemplary mobile version of a media file modal module 80-112 is shown, including the functionality as previously described for a media file modal module 66-112 and its constituent components within the event display module 66 of the narrative display module 60.

Figure 24:
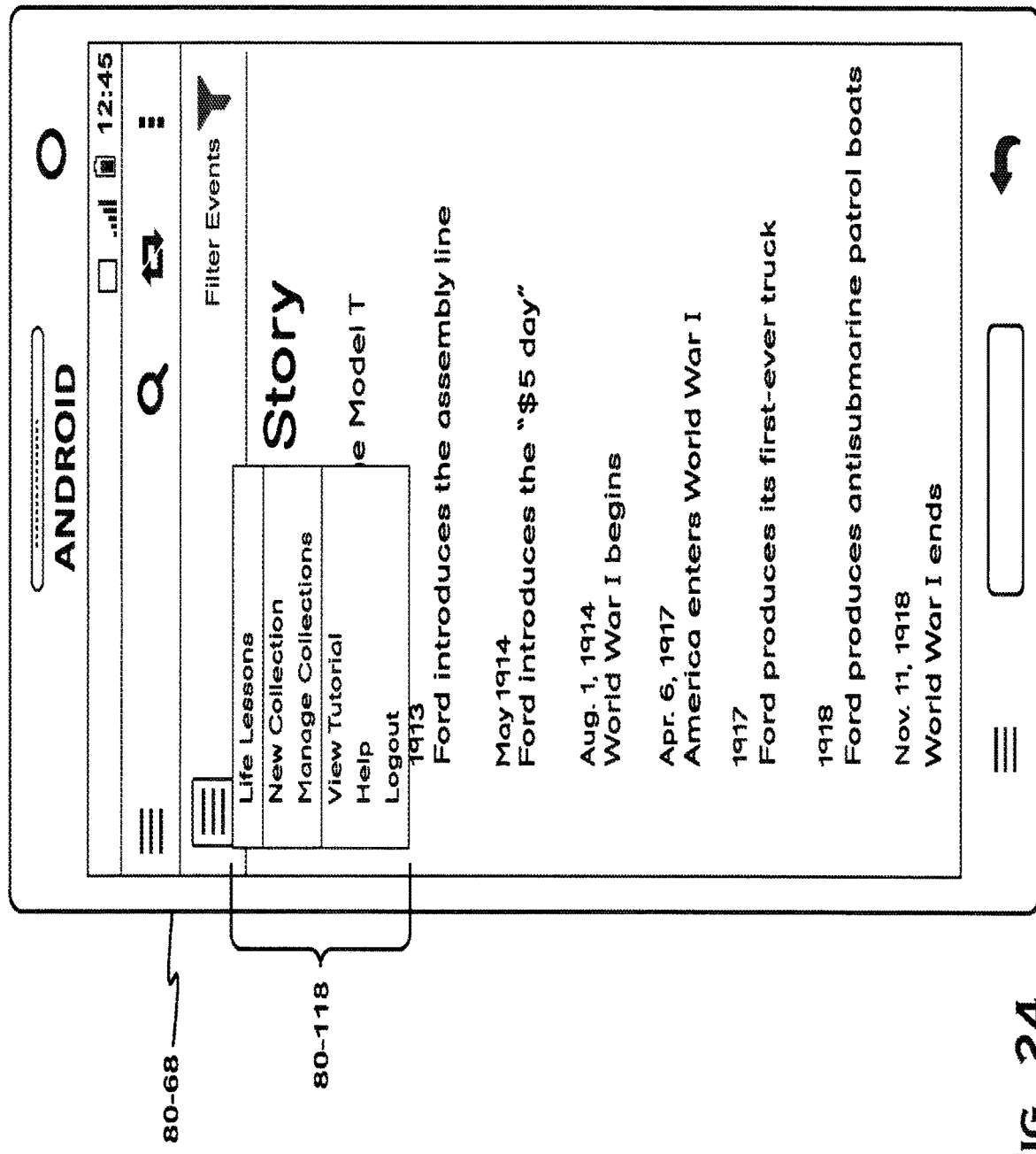
FIG. 24 is a schematic view of a front-end user environment of a timeline builder system according to the invention as viewed through a general user interface on a mobile based computing device.

Referring now to FIG. 24, exemplary mobile versions of the fixed element module 80-68 and the fixed element menu module 80-118 are shown, including the functionality as previously described for fixed element module 68 and their constituent components within the narrative display module 60.

Figure 25:
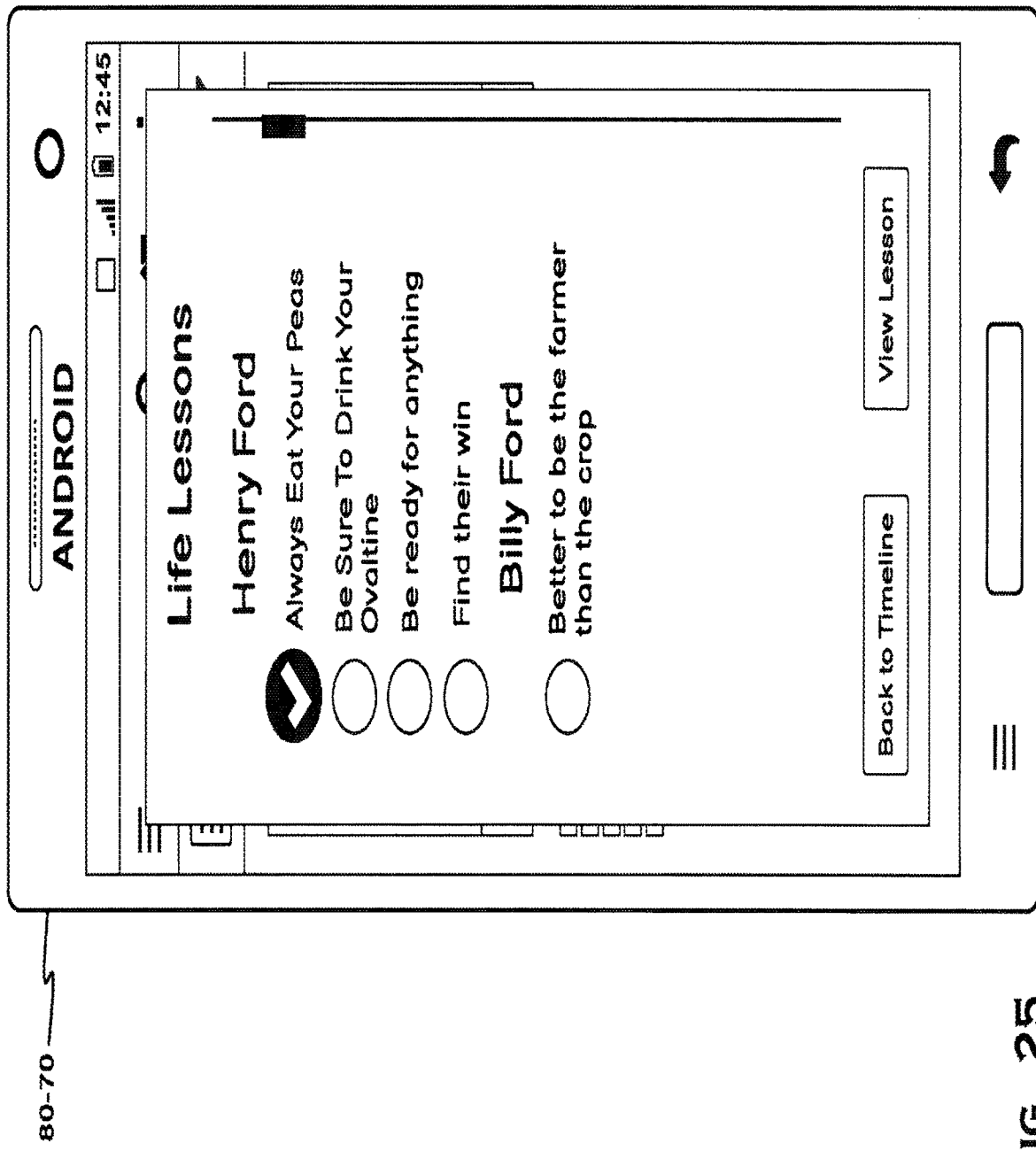
FIG. 25 is a schematic view of a front-end user environment of a timeline builder system according to the invention as viewed through a general user interface on a mobile based computing device.

Referring now to FIG. 25, an exemplary mobile version of the life lessons module 80-70 is shown, including the functionality as previously described for the life lessons module 70 and its constituent components.

Figure 26:
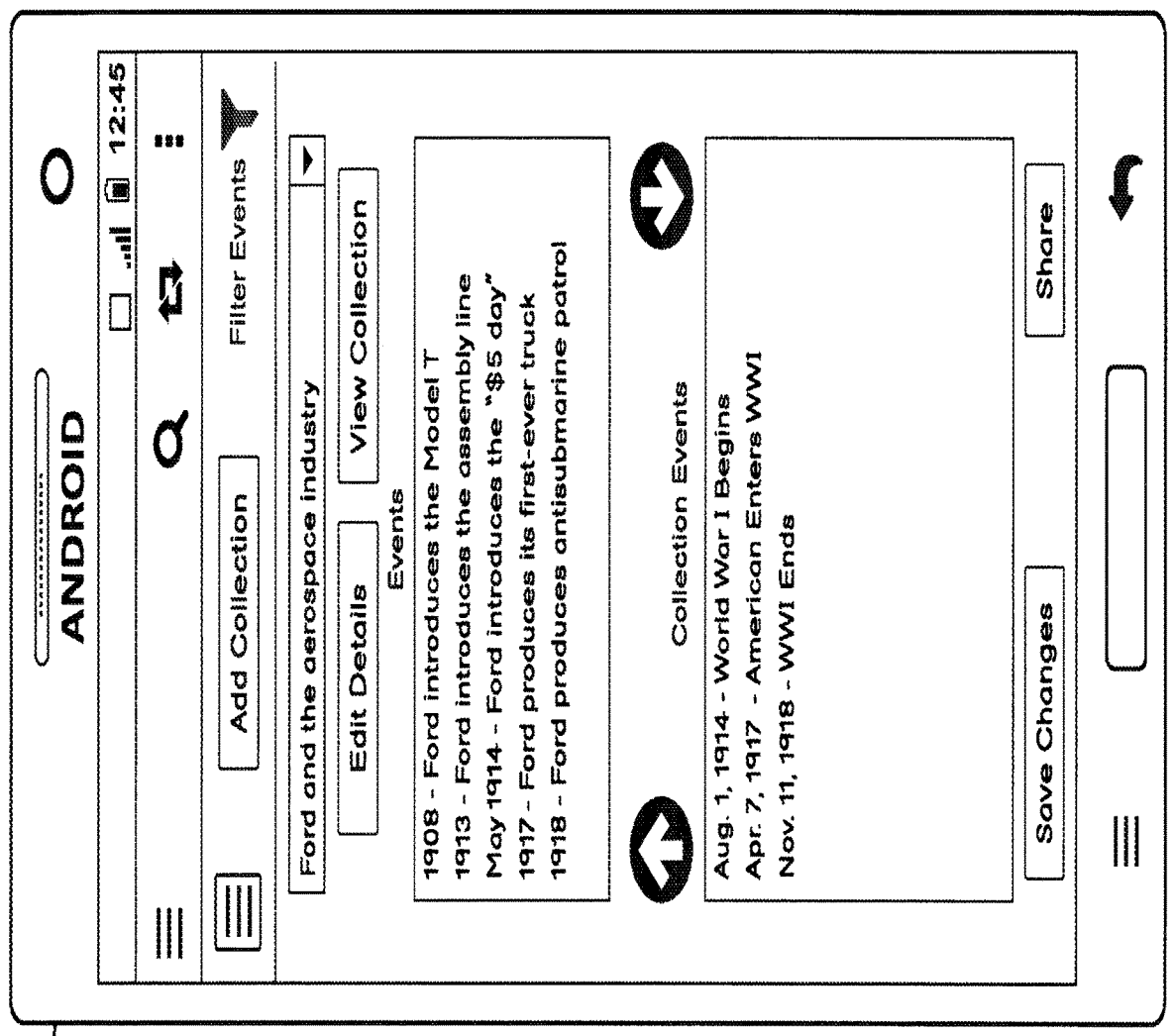
FIG. 26 is a schematic view of a front-end user environment of a timeline builder system according to the invention as viewed through a general user interface on a mobile based computing device.

Referring now to FIG. 26, an exemplary mobile version of the collections module 80-72 is shown, including the functionality as previously described for collections module 72 and its constituent components. One skilled in the art would understand the applicant's design is not the exclusive embodiment.

The back-end user BEU:

The back-end user BEU, uses the content preparation module, (designated as 1Y on FIG. 1, hereinafter referred to as 10, and further described in FIG. 3) to gather, organize and create content for entry into the content management configuration, 1X, and more specifically into the back-end user BEU interface, event creation module 40, (which is further described in FIG. 3 as the event creation module 40).

As previously described the content preparation module 10 and the event creation module embody the tools and processes by which exemplary back-end users BEU prepare and create exemplary content that they publish by means of the invention for consumption by exemplary front-end user FEU.

With reference to FIGS. 27-31, schematic diagram of exemplary databases for a back-end user environment of a timeline builder system according to the invention is shown.

As shown in FIG. 27 a spreadsheet S1, illustrating the components of the story template module 12 within the content preparation module 10, as previously shown in FIG. 3. The story template module 12 is a tool used for gathering, organizing and reviewing all of the component data elements of an event record module 66-04 and further, to organize and review exemplary sets of events for thematic coherence and quality of narrative flow, prior to uploading the component data elements into an exemplary instance of the invention.

Effective use of the story template module 12 speeds workflow, improves output quality and keeps work in progress visible to exemplary back-end user(s) BEU working individually or as a team.

Figure 27B:
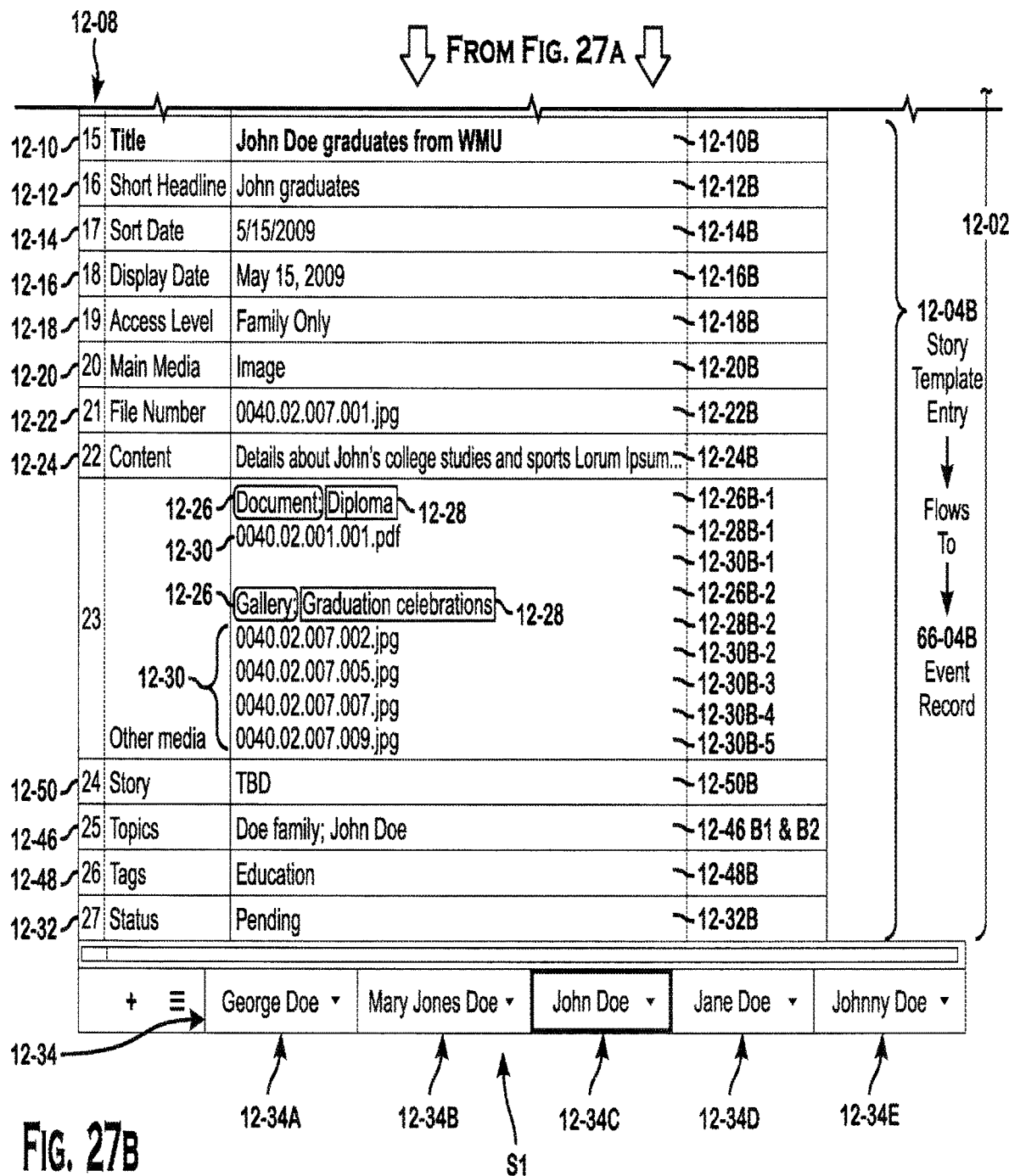
FIG. 27B is another schematic view of an exemplary database for a back-end user environment of a timeline builder system according to the invention.

As shown in FIG. 27A and FIG. 27B, an event record module 12-04 consists of a plurality of data elements, each of which is recorded within a database (a story template entry of the event record module 12-04).

The story template entry 12-04 includes an event title 12-10, a display title 12-12, a sort date 12-14, a display date 12-16, an access level 12-18, a main media file type 12-20, main media file number 12-22, content copy 12-24, a plurality of other media file type(s) 12-26, a plurality of other media display titles 12-28, a plurality of other media file number(s) 12-30, one or more optional story set(s) 12-50, a minimum of one topic and potentially a plurality of topics 12-46, an optional plurality of tag(s) 12-48, and a story template status 12-32. One skilled in the art would understand the applicant's design is not the exclusive embodiment.

For illustrative purposes of FIG. 27A and 27B, two story template event entries 12-04A and 12-04B, respectively, comprising a set of story template entries 12-02. Please note that while the exemplary data field names are numbered per the values above, the individual event component data elements in FIG. 27 are noted by the exemplary event suffixes A and B, respectively. As further noted in FIG. 27, once the data elements 12-10 through 12-50 of the exemplary story template entries 12-04A and 12-04B are entered, by means of the event creation module 40, into an exemplary instance of a database 4 of the invention, each data element becomes a component of a corresponding exemplary event record module 66-04A and 66-04B, specifically as 66-10A through 66-50A for event record module 66-04A, and 66-10B through 66-50B for event record module 66-04B. One skilled in the art would understand the applicant's design is not the exclusive embodiment.

Further with respect to the exemplary embodiment, data elements 12-10 through 12-24, plus 12-32, may only have single values, while data elements 12-26 through 12-48 may have multiple values within their exemplary data element categories.

The spreadsheet S1, further includes a plurality of tabs 12-34. The plurality of tabs 12-34 appear horizontally across the bottom of FIG. 27B, shown as 12-34A through 12-34E. Additionally, the spreadsheet S1 associated with each tab 12-34 can be used to gather, organize and review event data for different narrative storylines within an exemplary project instance. Within each tab 12-34, a plurality of story template entries, each 12-04, comprises a set of story template entries 12-02 organized within each exemplary tab 12-34. As shown in FIG. 27, tab 12-34C is shown as the active spreadsheet. One skilled in the art would understand the applicant's design is not the exclusive embodiment.

In an exemplary embodiment of the invention, the media log 14, performs a set of functions that assist the back-end users BEU and complement the story template module 12 as tools within the content preparation module 10, as previously shown in FIG. 3.

In an exemplary embodiment of the invention, the media log 14, provides a set of means and methods to make and document creative decisions during back-end user BEU content development. The media log 14 permits the gathering of content files, while keeping track of their original sources. The media log 14 further documents back-end user BEU decisions of where and how to assign each content file within the event records module 66-04. The media log 14 documents back-end user BEU decisions of captions as appropriate to each content file. Prior to uploading files to an archive database, the media log 14 documents back-end user BEU assignments of unique file numbers to each content file, within a numbering structure determined by the back-end user BEU. Once the content files are uploaded to a database instance 4, each content file can be readily linked to a specific event records module 66-04, as intended by the back-end user BEU.

The media log 14 is highly adaptable to the preferences and practices of the back-end users BEU—serving as a framework for addressing the key issues addressed above.

As shown in FIG. 28A and FIG. 28B, in an exemplary embodiment as a spreadsheet S2. One skilled in the art would understand the applicant's design is not the exclusive embodiment. The media log 14 includes a plurality of rows. Each row represents a content data file 14-04.

In FIG. 28A a set 14-02 of media log entries, each 14-04, is shown as a plurality of rows, 14-04A through 14-04R. Each row further includes a column display descriptive elements. Each column displays key descriptive elements of each content data file listed in the rows 14-04A through 14-04R.

An exemplary media log 14 includes a column containing values for a unique file number assigned 14-22 or 14-30. Unique media log file numbers 14-22 correspond to media files that will subsequently be displayed within the main media frame 66-102 of the event display module 66. Unique media log file numbers 14-30 correspond to media files that will subsequently be displayed within other media modals 66-112 of the event display module 66. It is not necessary for the back-end user BEU to determine the eventual display location of an exemplary media file within event record module 66-04 at the time of assigning a unique file number. Later assignment, prior to entry in the event creation module 40, may determine whether a unique media file number shall be entered as 14-22 versus 14-30. An exemplary media log 14 further includes a column showing a content file type 14-20 or 14-26. Media log file types 14-20 correspond to media files that will subsequently be displayed within the main media frame 66-102 of the event display module 66. Media log file types 14-26 correspond to media files that will subsequently be displayed within other media modals 66-112 of the event display module 66. In the present embodiment, media file types include images, galleries of multiple images, documents, audio, video, HTML and download file types. During entry in the event creation module 40, designation of media file type is made by selection from a drop-down list, which assures a correct file type association within the web services module 54 for the proper rendering of each media file type within each event record module 66-04 of the event display module 66.

An exemplary media log 14 further includes a column showing an original file name from source 14-180. An exemplary media log 14 further includes a column showing a caption assigned 14-104 when appropriate for the media file types 14-20 or 14-26. An exemplary media log 14 further includes a column for an associated event or gallery 14-182. An exemplary media log 14 further includes a column for a media file year 14-184. An exemplary media log 14 further includes a column for a media file upload status 14-32. One skilled in the art would understand the applicant's design is not the exclusive embodiment.

When used in conjunction with the story template module 12, the media log 14 allows back-end users BEU to maintain unified control of all media assets intended for use in an exemplary instance of the invention.

The unique file numbers assigned 14-22 (and 14-30) and content file types 14-20 (and 14-26) are helpful inputs to the story template module 12 as they are critical data items used later when uploading story template event entries 12-04A, 12-04B to an archive database 4.

The original file name from source 14-180, helps resolve editorial issues.

The listing assigned captions 14-104, ensures precise matching with unique file numbers, 14-22 (and 14-30), during file uploading. Recording the back-end user BEU decisions about deployment of each content file 14-182, and event year 14-184, tracks file utilization.

Listing upload status, 14-32, helps manage workflow.

Lastly, within the exemplary embodiment of the spreadsheet S2 there is a plurality of tabs 14-34 shown as 14-34A and 14-34B. As shown in FIG. 28A, the active tab is the media log 14-34A. One skilled in the art would understand the applicant's design is not the exclusive embodiment.

As shown in FIG. 29, in an exemplary embodiment as a spreadsheet S3, the tab 14-34B shows a key related to the unique content file number scheme shown on exemplary media log tab 14-34A. The key of tab 14-34B, aids consistent file processing by back-end users BEU, and may be modified as needed for any exemplary project. The critical outcome is for each content media file 14-04 to be assigned the unique file number 14-22 (and 14-30). The back-end users BEU have broad discretion to determine file numbering schemes to suit their purposes. The tab 14-35B serves to record and communicate an exemplary back-end user's media file management decisions. One skilled in the art would understand the applicant's design is not the exclusive embodiment.

In the exemplary embodiment, the event publication summary module 16, performs a set of functions that complement the story template module 12 and the media log 14 as tools within the content preparation module 10, as previously shown in FIG. 3.

Figure 30:
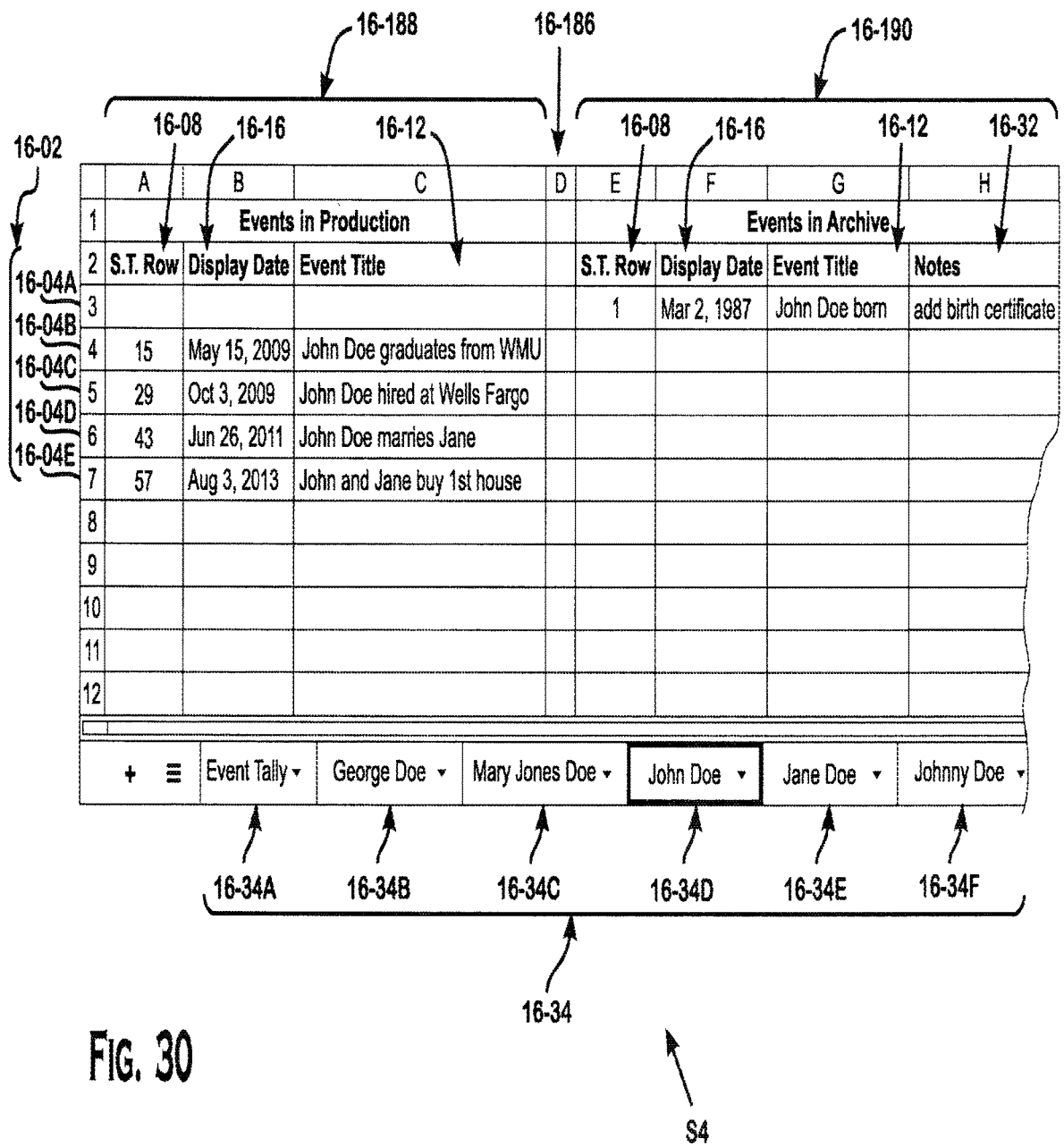
FIG. 30 is another schematic view of an exemplary database for a back-end user environment of a timeline builder system according to the invention.

As shown in FIG. 30, in an exemplary embodiment as a spreadsheet S4. One skilled in the art would understand the applicant's design is not the exclusive embodiment.

In an exemplary embodiment of the invention, the event publication summary module 16 is within the content preparation module 10. Each row represents an exemplary event 16-04, within a set of events 16-02, of the event publication summary module 16.

As shown in FIG. 30, five exemplary event line items 16-04A through 16-04E are shown. Each column displays key descriptive elements of each event line item 16-04A through 16-04E listed in the rows. A blank vertical column is shown as 16-186. The blank vertical column 16-186 separates a set of columns to the left from a set of columns to the right of the blank vertical column 16-186. To the left of the blank vertical column 16-186, is a plurality of events in production set of columns 16-188. To the right of the blank vertical column 16-186, is a plurality of events in the archive set of columns 16-190. Both the events in production set of columns 16-188 and the events in archive set of columns 16-190 further show a story template row number column 16-08. Both the events in production set of columns 16-188 and the events in archive set of columns 16-190 further show an event display date column 16-16. Both the events in production set of columns 16-188 and the events in archive set of columns 16-190 further show an event display title column 16-12. The events in archive set of columns further shows a plurality of notes 16-32. One skilled in the art would understand the applicant's design is not the exclusive embodiment.

In the exemplary embodiment, the plurality of events in production set of columns 16-188, represents event records 16-04 in a plurality of states of development within the content preparation module 10, but prior to entry of content elements for any exemplary event 16-04 into an archive database by means of the event creation module 40.

In the exemplary embodiment, the plurality of events in archive set of columns 16-190, represents event records 16-04 for which content elements have been entered into an archive database by means of the event creation module 40. Such event records 16-04 may continue to be in a plurality of states of development within the content preparation module 10, as noted by their status 12-32, within the story template module 12. However, the key differentiator in this exemplary practice of the event publication summary module 16, is whether or not the event record module 66-04, exists within an exemplary database 4 for consumption within the event display module 66, following its upload to a database 4 by a back-end user BEU using the event creation module 40.

As shown in FIG. 30, within the plurality of events in production set of columns 16-188, are exemplary columns for data elements pertaining to events in development within the story template module 12, of the content preparation module 10.

As shown within the plurality of events in archive set of columns 16-190, are exemplary columns for data elements pertaining to events in a sufficient state of readiness to have been loaded into an exemplary instance of an archive, by use of the event creation module 40, and further corresponding to a recorded state of development within the story template module 12 of the content preparation module 10.

As shown in FIG. 30, the story template row number 16-08 shows the corresponding value of 12-08 in FIG. 27. In the exemplary embodiment, the story template row number 16-08 is a column. One skilled in the art would understand the applicant's design is not the exclusive embodiment.

As shown in FIG. 30, the event display date 16-16 shows the corresponding value of 12-16 in FIG. 27. In the exemplary embodiment, the event display date 16-16 is a column. One skilled in the art would understand the applicant's design is not the exclusive embodiment.

As shown in FIG. 30, the event display title 16-12 shows the corresponding value of 12-12 in FIG. 27. In the exemplary embodiment, the event display title 16-12 is a column. One skilled in the art would understand the applicant's design is not the exclusive embodiment.

In the exemplary embodiment of the timeline builder system, upon entering the event record module 66-04 into an exemplary instance of an archive, via the event creation module 40, the back-end user BEU would cut and paste the data elements, from the corresponding row 16-04A-16-04E, from columns on the left of the blank vertical column 16-186 within the plurality of events in production set of columns 16-188, and paste the data values into the columns on the right of the blank vertical column 16-186 within the plurality of events in archive set of columns 16-190.

Further within an exemplary embodiment, the back-end user BEU might add information on the exemplary row 16-04A in FIG. 30, in the plurality of notes column 16-32, indicating further actions or data elements needed for the event record 16-04. Lastly, within the exemplary embodiment of the spreadsheet S4, tabs 16-34, appear horizontally across the bottom of FIG. 30, shown as 16-34A through 16-34F. Accordingly, the spreadsheet S4 associated with each tab 16-34 can be used to gather, organize and review event data for different narrative storylines within an exemplary project instance. For the purposes of the example of FIG. 30, tab 16-34D is selected and displayed.

Referring now to FIG. 31, an exemplary tab 16-34A shows an exemplary tally of event quantities, detailed by one row per tab 16-34B through 16-34F, with totals of the corresponding row values shown both for the plurality of events in production 16-192 by tab 16-34, and a total of all events in production 16-194, and a plurality of events in archive 16-196 by tab 16-34, and a total of all events in archive, 16-198. Such exemplary tallies, 16-192, 16-194, 16-196 and 16-198, respectively, aid project planning and workflow control by exemplary back-end users BEU and may be modified as needed for any exemplary project.

As shown, when used in conjunction with the story template module 12, and the media log module, 14, the event publication summary module 16, each as modules of the content preparation module 10, allows the back-end users BEU to maintain unified control of event development and publication within an instance of the invention.

In the exemplary embodiment, the back-end users BEU could utilize the plurality of events in production set of columns 16-190, in conjunction with exemplary tabs 16-34, to draft title ideas and approximate dates, as part of developing draft narratives, in advance of populating the story template module 12 with the content components 12-10 through 12-50.

As the development of exemplary content proceeds, the back-end user BEU could transition into managing the flow of event development work-in-progress in an exemplary manner while keeping track of the quantities of event records. One skilled in the art would understand the applicant's design is not the exclusive embodiment.

Figure 32:
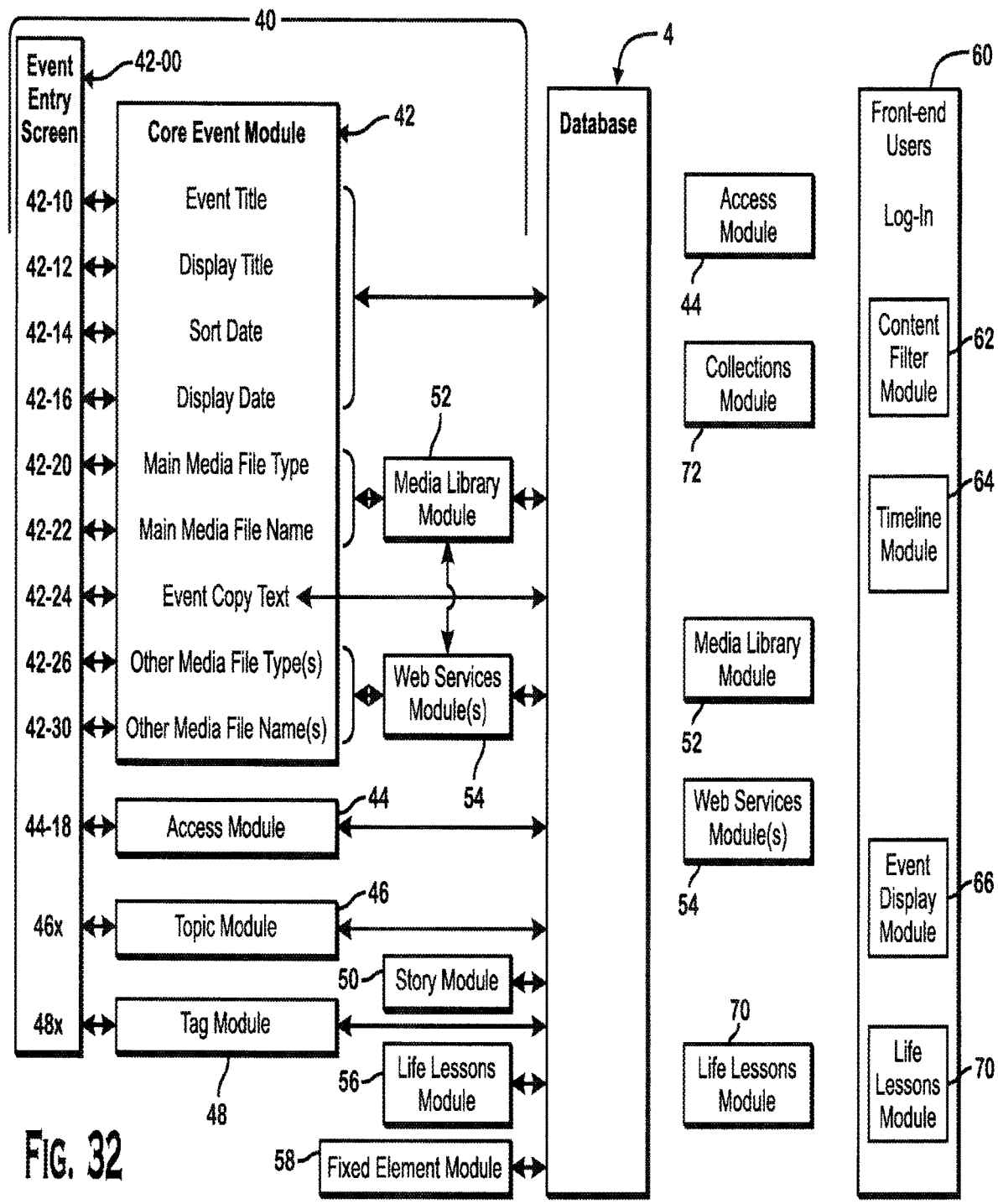
FIG. 32 is a schematic diagram of a back-end user environment of a timeline builder system according to the invention.

In FIG. 32, a schematic diagram is shown of the event creation module 40 in which the back-end users BEU create and edit data for event records of the event records module 66-04 for subsequent consumption by the front-end users FEU within the event display module 66.

As previously stated, the event creation module 40 consists of a core event module 42 and a plurality of sub-modules 42-10 through 42-30, which are further illustrated in FIG. 32. The back-end user BEU enters and edits data and file content for an event in an event entry screen 42-00 of the core event module 42.

In the exemplary embodiment, the event entry screen 42-00 contains a plurality of fields associated with the sub-modules 42-10 through 42-30. The plurality of fields includes a field 42-10 which permits the entering and editing of event titles within the core event module 42. The plurality of fields includes a field 42-12 which permits the entering and editing of display titles, a.k.a short headlines, within the core event module 42. The plurality of fields includes a field 42-14 which permits the entering and editing of sort dates within the core event module 42. The plurality of fields includes a field 42-16 which permits the entering and editing of display dates within the core event module 42. The plurality of fields includes a field 42-20 which permits the entering and editing of main media file types within the core event module 42. The plurality of fields includes a field 42-24 which permits the entering and editing of main media file names within the core event module 42. The plurality of fields includes a field 42-24 which permits the entering and editing of event copy text within the core event module 42. The plurality of fields includes a field 42-26 which permits the entering and editing of other media file types within the core event module 42. The plurality of fields includes a field 42-30 which permits the entering and editing of other media file names within the core event module 42. One skilled in the art would understand the applicant's design is not the exclusive embodiment.

The event creation module 40 further includes an access module 44 that includes a field 44-18. The field 44-18 permits the entering and editing of user permission levels from a drop-down list within the access module 44.

The event creation module 40 further includes a topic module 46 that includes a field. The field permits the entering and editing event of topics within the topic module 46. Multiple topics 46x may be entered for an exemplary event record module 66-04. A minimum of one topic of the topic module 46 is required for each exemplary event record module 66-04.

The event creation module 40 further includes a tag module 48 that includes a field. The field permits the entering and editing of event tags within the tag module 48. Multiple tags 48x may be entered for an exemplary event record module 66-04. Tags 48x are optional and not required for any exemplary event record module 66-04. One skilled in art would understand the applicant's design is not the exclusive embodiment.

Figure 33A:
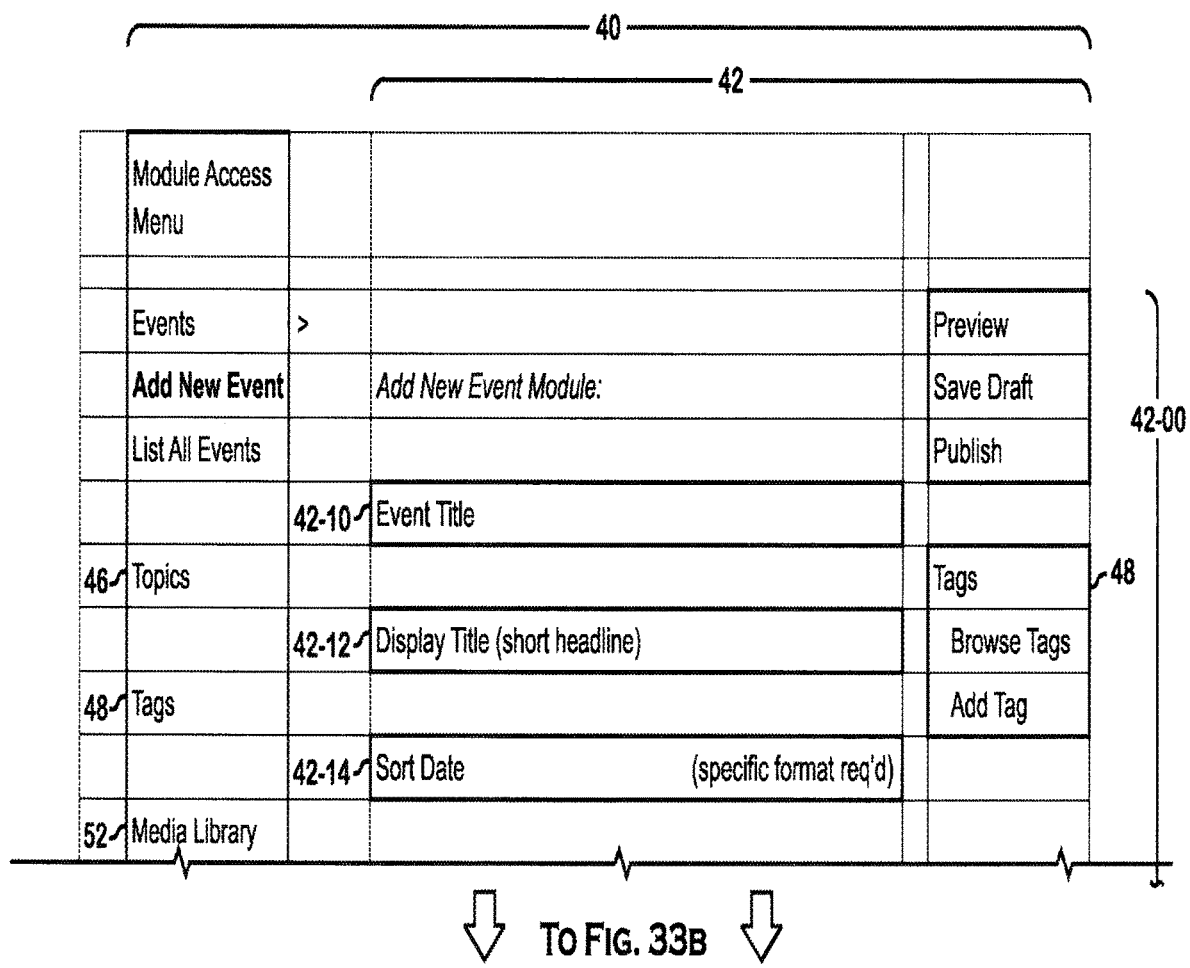
FIG. 33A is a schematic diagram of an exemplary event entry screen of the timeline builder system according to the invention.

Referring now to FIG. 33A and FIG. 33B, an exemplary event entry screen 42-00, within the core event module 42 of the event creation module 40 is shown, demonstrating a means by which data elements from the story template module 12 and the media log module 14 of the content preparation module 10 may be entered into an exemplary database 4 for subsequent display of an event record module 66-04 within the event display module 66 of the narrative display module 60, along with the corresponding exemplary displays within the content filter module 62 and timeline module 64 of the narrative display module 60.

As noted in reference to FIG. 4, a two digit number to the right of a hyphen,"-yy" indicates a data element, such as display date xx-16, that flows identically between modules as indicated by a two digit number to left each hyphen "xx-" in the exemplary module numbering scheme "xx-yy". One skilled in the art will recognize that the applicant's design is not the exclusive embodiment.

The core event module 42, the access module 44, the topic module 46, and the tag module 48 include direct access, via respective utilities apart from the event entry screen 42-00, through which the back-end users BEU can enter and edit respective data per module within the event creation module 40.

Returning to FIG. 32, the event creation module 40, contains modules which enable the back-end users BEU to create and edit data for event records of the event record module 66-04 for which the back-end users BEU access the modules independently of the event entry screen, 42-00.

As shown, the story module 50 provides an optional grouping of event records of the event records module 66-04 and to maintain the identities of such sets within an exemplary instance of a database 4, whereby the back-end user BEU may designate a story of the plurality of stories 62-50 of the event records module 66-04, to present as grouping with its own content filter 62-02, for selection within the content filter module 62 even though the constituent event records of the plurality of stories 62-50, may be associated with dissimilar Topics 62-46, and/or Tags, 62-48.

As shown, the media library module 52 permits the entering and editing of media files, specifically: individual images, galleries of multiple images, document, and audio files, and storing such files within an exemplary instance of a database 4.

As shown, the web services module 54 permits invoking access to a plurality of web services, which serve a plurality of functions related to rendering, and in some cases, hosting by third parties, for a plurality of content file types and related functionality. In the exemplary embodiment, the web services module 54 is maintained programmatically by system administrators and is not edited by the back-end users BEU.

The back-end life lessons module 56, permits back-end users to present audio or video content media content for consumption by front-end users that is not accessed by using an exemplary site's content filter module 62 and the timeline module 64. Exemplary uses of this feature might include content that is not specific to a particular content category 62-04 and/or that is not specific to a particular time or timeframe within timeline module 64. Further exemplary instances might include content that is relevant to a plurality of content categories 62-04 and/or that is relevant to a plurality of times or timeframes within timeline module 64.

As shown, the fixed element module 58 provides functionality that enables the back-end users BEU to switch between the back-end and front-end functions of an individual exemplary site. Additionally, the fixed element module 58 provides shortcuts for the back-end users BEU to navigate quickly among exemplary back-end modules, and to move from one exemplary site to another exemplary site in situations when the back-end user BEU possesses the required user privileges for multiple sites, each as exemplary instances of the invention.

An exemplary database 4, serves as a repository for all content files entered via an event entry screen 42-00, and the modules 42 through 58 described above, within the event creation module 40. Further to the descriptions of modules 42 through 58, in the exemplary embodiment, certain fields in module 42, 42-10 through 42-24, as well as access module 44 are restricted to single value entries within the event creation module 40. One skilled in the art will understand that the applicant's design is not the exclusive embodiment.

Returning now to FIG. 33A, field 42-14, Sort Date, must be entered in a specific format, which then allows an absolute chronological sequence to be established among the entire plurality of event records in an exemplary instance of an archive database 4. In the present embodiment, such absolute chronological sequence underlies the module interactivity, as previously described in FIG. 6, FIG. 7 and FIG. 8.

Field 42-20, Main Media File Type, presents a drop-down list of content file types that are acceptable for display within the main media frame 66-102 in FIG. 11. In the exemplary embodiment, individual images, galleries of multiple images and video files are acceptable file types for display in the main media frame 66-102.

Field 42-22, Main Media File Name, requires a unique identifier so that a specific content file may be reported from an exemplary database, 4, for display in the main media frame 66-102 in FIG. 11.

Field 42-24, Content Copy Text, may be composed by an exemplary back-end user within the event entry screen, 42-00, or may be copied and pasted from any other source. In the exemplary embodiment, in order to optimize throughput, exemplary back-end users are encouraged to compose and edit copy using content copy 12-24 within the story template module 12, then subsequently to copy and paste text from the story template module 12 into the event entry screen 42-00. Event copy is subsequently displayed in an exemplary copy frame 66-24 in FIG. 11.

Field 42-26, Other Media File Type, presents a drop-down list of content file types that are acceptable for display within other media modals 66-112 in FIGS. 12 and 66-114 in FIG. 13. In the present embodiment, other media display title 42-28 is entered after other media file type 42-26 in a manner that varies according to the other media file type 42-26 selected. Other media display title 42-28 is shown as 66-108 along with the corresponding other media file icon 66-110 within the other media title frame 66-106 within the event display module 66 of the narrative display module 60 (as shown in FIG. 11) according to the other media file type 42-26 selected in the core event module 42 of the event creation module 40. In the present embodiment, individual images, galleries of multiple images, documents, audio, video, HTML and download file are acceptable media file types within other media file type 42-26.

Field 42-30, Other Media File Name, requires a unique identifier so that a specific content file may be reported from an exemplary database, 4, for display within the other media modal 66-112 or 66-114. Such exemplary databases, 4, may be hosted by third parties and invoked using a plurality of web services within the web services module 54 thereby rendering an exemplary content file using the functionality of a corresponding web service.

In the exemplary embodiment, access module 44, permits the front-end user FEU to have access privileges to content based on an exemplary hierarchy of permission levels, which are assigned per user or user group by exemplary back-end users. BEU decisions regarding FEU access per event record module 66-04 are documented as data element 12-18 in story template module 12 within the content preparation module 10, and entered into an exemplary database 4 as data element within the event entry screen 42-00 of the event creation module 40. The access module 44 provides a filter at the level of individual event records of the event records module 66-04 of the narrative display module 60 that either allows or prevents the reporting of exemplary individual event summaries 64-04 within the timeline module 64.

For an exemplary front-end user FEU with insufficient access permission for the event record of the event records module 66-04 the associated event summary 64-04 will not appear in an exemplary timeline display set 64-02 regardless of the exemplary front-end user's selections within the content filter module 62, thus making the exemplary event record module 66-04 unavailable for display within the event display module 66 for the exemplary front-end user without sufficient access permission.

In the exemplary embodiment, the topic module 46 are required data elements for the event record of the event record module 66-04 which in conjunction with the sort dates 66-14, underlie the topic module 46 interactivity, as previously described in FIG. 6, FIG. 7 and FIG. 8. Topic of the topics module 46 are determined in the present embodiment by back-end users and input of the multiple topics 46x within the event entry screen 42-00 and are means by which front-end user selections of individual content filters 62-04, cause sets of event summaries 64-02, to be reported from an exemplary database 4 for display within the timeline module 64.

In the exemplary embodiment, the tag module 48 are optional data elements for an exemplary event record of the event records module 66-04, which in conjunction with sort dates 66-14, underlie the tag module 48 interactivity, as previously described in FIG. 6, FIG. 7 and FIG. 8. Tags of the tag module 48 are determined in the present embodiment by back-end users BEU and input of the multiple tags 48x within the event entry screen 42-00 and are a means by which front-end user selections of individual content filters 62-04, cause sets of event summaries 64-02, to be reported from an exemplary database 4 for display within the timeline module 64.

In the exemplary embodiment, the story module 50 are optional data elements for an exemplary event record of the event records module 66-04, which in conjunction with exemplary sort dates 66-14, underlie the story module 50 interactivity, as previously described in FIG. 6, FIG. 7 and FIG. 8. Stories of the story module 50, determined in the present embodiment by the back-end users and input directly into the story module 50, permit the front-end user selections of individual content filters 62-04, and cause a set of event summaries 64-02, to be reported from an exemplary database 4, for display within the timeline module 64.

In an exemplary embodiment, the story module 50 provides back-end users BEU the means to create an individual story content filter name 62-04, and to select individual event records of the event record module 66-04, from among all event records in an exemplary instance of an archive which will be identified within the database 4, as constituent events of the exemplary story set 50-04. The exemplary story set name will be presented within the content filter module 62 as an option for front-end user selection under stories 62-50 (see FIG. 9). If selected, the constituent set of event summaries 64-02, of the event records of the event records module 66-04, will display in the timeline module 64, subject to the user permission level for the exemplary front-end user, per event record of the event records module 66-04, as recorded in the access module 44.

In an exemplary embodiment, media library module 52 are components of narrative presentation deployed by exemplary back-end users BEU to enhance the experience of exemplary front-end users FEU. Exemplary media files that may be housed in an exemplary media library, within an exemplary database 4, include individual images, galleries of multiple images, documents and audio files.

In the exemplary embodiment, exemplary back-end users BEU may also choose to access each of these exemplary media file types through a utility that provides a direct means of access, within the event creation module 40 apart from the event creation screen 42-00. Exemplary media files within an exemplary media library module 52, when selected by an exemplary front-end user FEU, will be rendered using a plurality of associated web services, appropriate to the exemplary media file type, via the web services module 54.

For exemplary individual images, exemplary back-end users BEU may include caption text as part of an individual image record, in which case, an exemplary associated caption will display under the exemplary associated image whenever it is displayed. Captions may be determined by BEU within the story template module 12 and media log module 14 of the content preparation module 10 and entered upon image upload to an exemplary database 4 using the media library module 52. If an individual image is deployed within a main media frame 66-102, an associated caption is displayed in a main media caption frame 66-104. If an individual image is deployed as another media link 66-108, an associated caption is displayed within another media modal 66-112, as shown in the exemplary embodiment of the other media modal in FIG. 12. Also, galleries of multiple images convey captions per image. One skilled in the art would understand the applicant's design is not the exclusive embodiment.

In the exemplary embodiment, web services modules 54 are managed in the web services module 54, and are associated with exemplary media file names 42-22 and 42-30, based on exemplary back-end user designations of exemplary media file types 42-20 and 42-26, respectively when exemplary back-end users BEU designate exemplary media files of the media library module 52, for use within an event record via the core event module 42. For exemplary individual images, galleries of images, document file types, the exemplary web services associated per file type in a main media frame 66-102 and other media modal 66-112 provide exemplary front-end users FEU with exemplary functionality such as zoom, pan, scroll, etc., as shown in FIG. 12.

For exemplary audio media files, the exemplary web services associated with the exemplary file type provide user controls appropriate for the exemplary file type across the bottom of an exemplary display within the narrative display module 60, as shown in FIG. 13.

For exemplary media file types such as video, HTML and downloads, the exemplary web services associated per file type in a main media frame 66-102 or other media modal 66-112 provide exemplary front-end users FEU with exemplary functionality such as access to files hosted by a plurality of third parties plus appropriate front-end user FEU controls for the exemplary associated file types.

In the exemplary embodiment, the back-end life lessons module 56 provides back-end users BEU to create an individual life lesson module 56, to assign it a title 70-122 for display within the front end life lessons display module 70-120, and to select exemplary media files from the media library module 52, and/or web services module 54, from among all media files in an exemplary instance of an archive, which will identified within the database, 4, as constituent media files of the exemplary life lesson set 70-02 available for consumption within the front-end life lessons display module 70-120 (see FIG. 15).

The life lesson name of the life lesson 72-122, will be presented within the exemplary list of life lessons 70-02, as an option for front-end user selection, within the front-end life lesson module 70-120. If selected, the exemplary media file will be presented for consumption within the associated media player frame 70-124 along with its associated text description 70-126. One skilled in the art would understand the applicant's design is not the exclusive embodiment.

Figure 34:
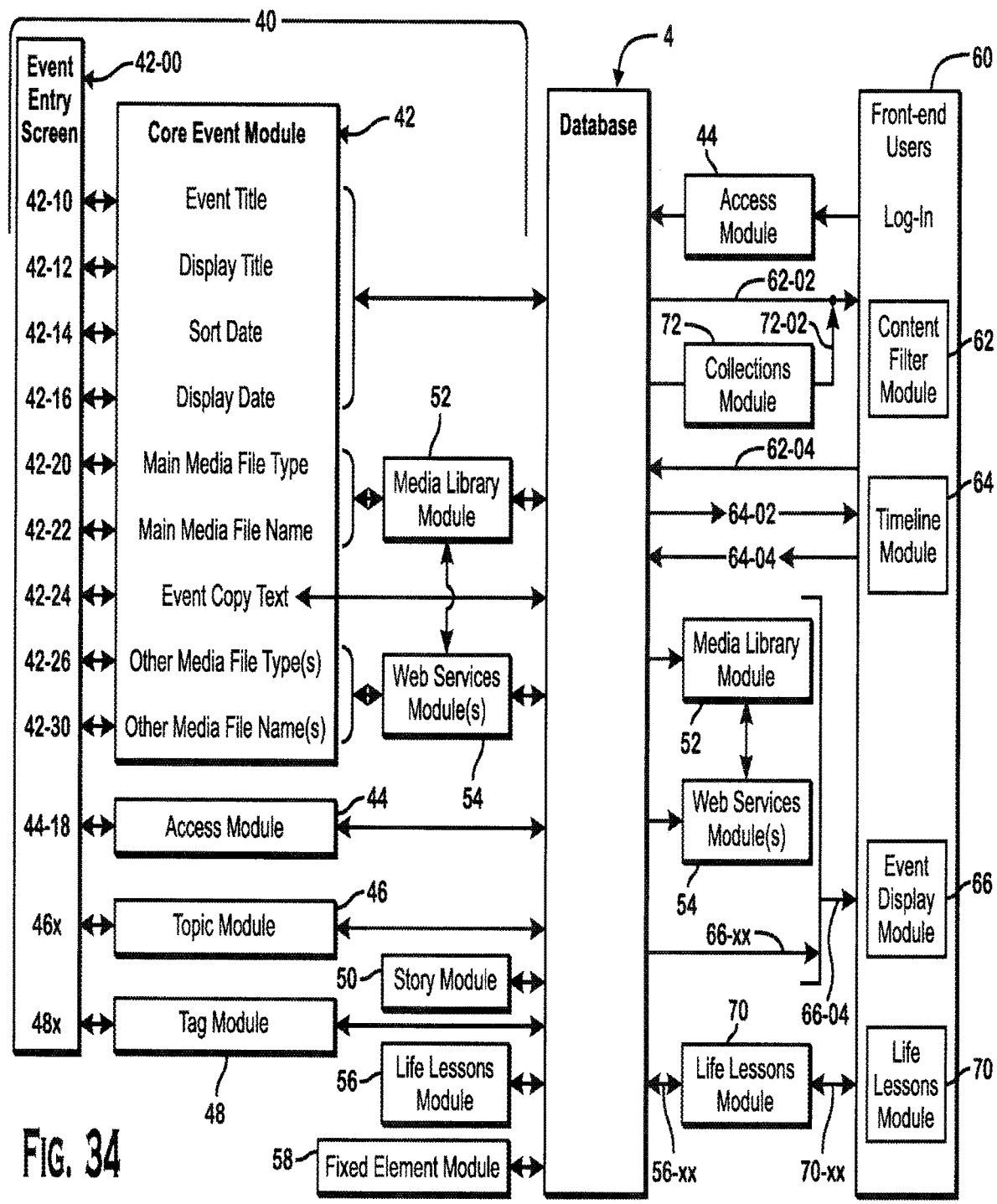
FIG. 34 is a schematic diagram of the interactivity of a back-end users BEU and a front-end users FEU.

As shown in the exemplary embodiment, the interactivity of back-end users BEU and front-end users FEU is shown in FIG. 34. In an exemplary embodiment, FIG. 34, builds on FIG. 32, as a schematic representation of interaction of the back-end event creation module 40 with the front-end narrative display module 60.

As shown in the vertical column on the right side of FIG. 34, and proceeding from the top of the column stepwise toward the bottom of the column, upon logging into the system, exemplary front-end users FEU are validated for their permitted level of system access by operation of the access module 44. Accordingly, all data returned from an exemplary database 4, will be only data that an exemplary front-end user FEU is permitted to access within the narrative display module 60. As previously described, FEU first utilizes the content filter module 62, to examine an exemplary set of content filters 62-02, including a set of collection titles 62-04A, 62-04B each representing a collection set 72-02 (if collections have been created by and/or shared with the exemplary FEU) cumulatively all presented within an exemplary set of content filters 62-02.

Exemplary front-end users FEU choose among individual content filter options, each 62-04 within the content filter set 62-02, by clicking toggle switches into the "on" position for each selected individual content filter 62-04, which reports each chosen option of one or more content filters 62-04 to an exemplary database 4.

A set of event summaries 64-02 that corresponds to the selected content filters 62-04 is reported from the database, 4, to the timeline module 64, which displays the reported event summary records, each 64-04, in chronological order, according to the exemplary sort date 64-16, associated with each event record of the event record module 66-04.

The individual event summaries 64-04, reported within the timeline module 64, will only be those for which the front-end user FEU has sufficient permission, according to the required permission level recorded within the access module 44 for each exemplary event record.

Exemplary front-end users FEU utilize the timeline module 64 to examine the reported event summaries each 64-04 by viewing event summary display titles 64-12 and display dates 64-16 which have been entered from the back-end as 42-12 and 42-16, respectively.

Exemplary front-end users FEU choose among the exemplary options presented as a set 64-02 by clicking an exemplary individual event summary 64-04 which reports the option chosen to the exemplary database 4.

The selected exemplary event record of the event records module 66-04, is reported from the database, 4, to the event display module 66 which renders all of the content associated with the selected event record module 66-04 that has been entered into the database 4 by exemplary back-end users BEU via the exemplary event creation module 40 and its exemplary component modules, as depicted in FIG. 34.

Exemplary front-end users FEU utilize the front-end life lessons module 70, to examine exemplary life lesson names, each 70-122 of the life lesson module 70 and to select among exemplary options by clicking a name of the life lesson 70-122 which reports the option chosen to the exemplary database, 4.

The media file associated with the selected life lesson 70-02 which has been entered by the back-end user via a back-end life lesson module 56, is reported from the database, 4, for rendering within the front-end life lessons module 70-120 along with exemplary event summaries, 64-02, that are associated with the life lesson 70-122 displayed in a version of the timeline module 64, that is contained within the front-end life lesson module 70-120.

FIG. 32 and FIG. 34 illustrate an exemplary embodiment of the interactivity of the event creation module 40 and the narrative display module 60. One skilled in the art will understand that the applicants design is not the exclusive embodiment.

Figure 35:
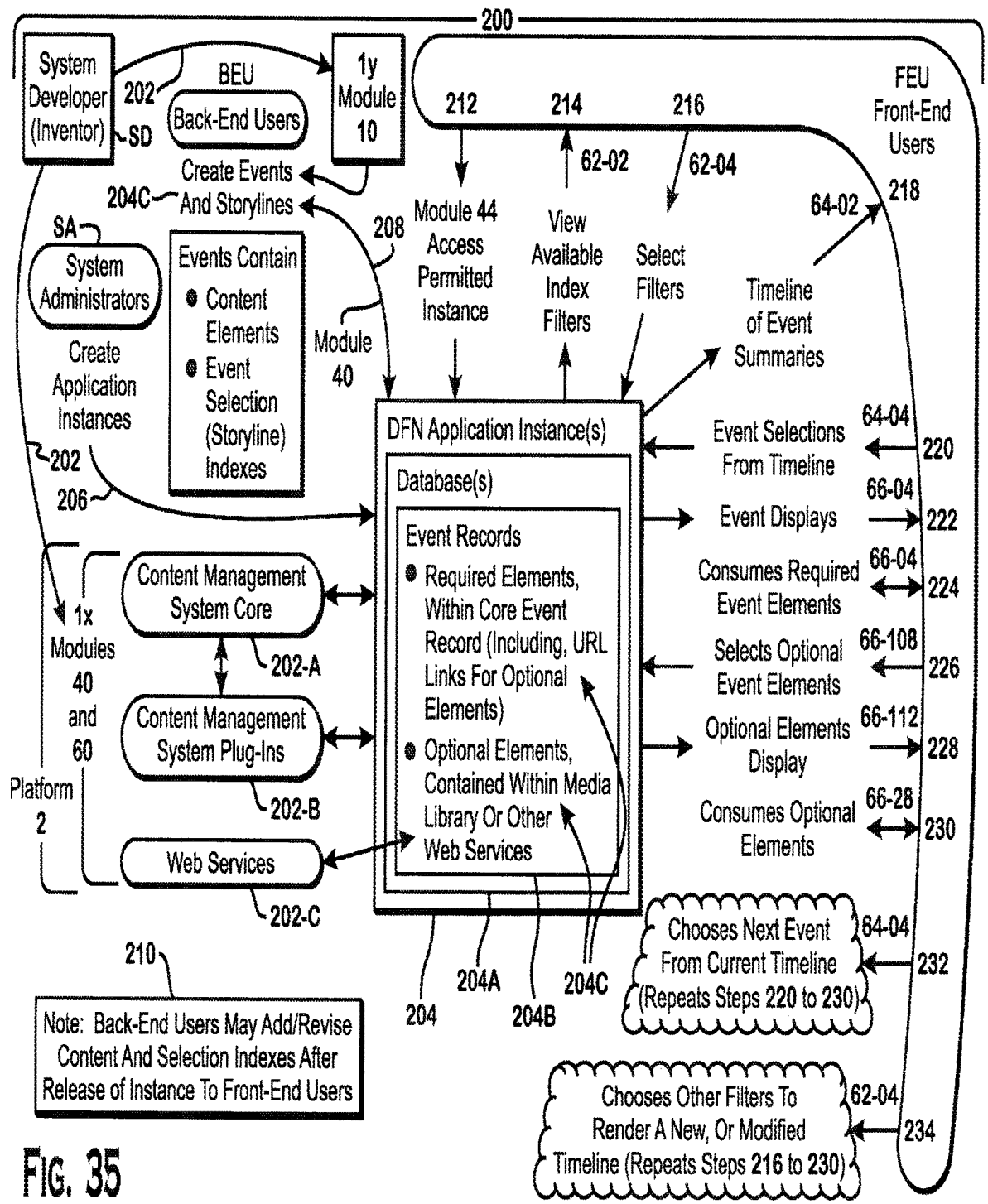
FIG. 35 is a schematic diagram of a schematic representation of the interactivity of all modules of the timeline builder system according to the invention.

As shown, FIG. 35 is a schematic representation of the interactivity of all modules in the present embodiment.

In the exemplary embodiment, FIG. 35 is a schematic representation of an exemplary content management system 200 describing the interactivity between exemplary system modules and individuals including system developers SD, system administrators SA, back-end users BEU and front-end users FEU. Proceeding from the top left of FIG. 35, in step 202 system developer SD creates a unique timeline management system that is composed of systems 1X and 1Y. Content management configuration 1X resides within a content management platform 2 (see FIG. 1). In the present embodiment 1X is more fully detailed and described as event creation module 40 and narrative display module 60. Also in step 202 system developer SD creates a custom set of tools and methods 1Y, as unique configurations within commercially available spreadsheet applications to facilitate the creation of content and the management of the content creation process for the back-end user BEU to utilize the content management configuration 1X (see FIG. 1). In the present embodiment 1Y is more fully detailed and described as content preparation module 10. As shown in FIG. 35 content management configuration 1X (modules 40 and 60) consists of a content management system core 202-A, a set of content management system plug-ins 202-B and a set of web services 202-C. Beyond initial system development SD activities include the ongoing improvement, updates and maintenance of the content management configuration 1X.

As shown, the content management system core 202-A, the set of content management system plug-ins 202-B, and the set of web services 202-C interact in an exemplary manner that provides exemplary instances of the content management application 204 of the timeline builder system.

In the exemplary embodiment, each exemplary instances of the content management application 204 may include a plurality of databases 204A. Further within each database 204A, may be located at a plurality of event records 204B each containing a plurality of data elements 204C.

In step 206 of the exemplary embodiment, FIG. 35 is a schematic representation of an exemplary content management system instances of the content management application 204 under management by a plurality of system administrators SA who provide instances of the content management application 204 to the plurality of back-end users BEU and front-end users FEU.

In step 208 the exemplary embodiment, FIG. 35 is a schematic representation of the content management system instance of the content management application 204 as used by the plurality of back-end users BEU who use content preparation module 10 to develop event records 204B comprised of data elements 204C, and who then use event creation module 40 to enter event records 204B and associated data elements 204C into the instance of the content management application 204 and its exemplary databases 204A. As noted in step 210 (lower left corner of FIG. 35), exemplary back-end users BEU may continue to add and revise content, as well as add and revise content filters (selection indexes), after the release of an exemplary content management instance of the content management application 204 to the front-end users FEU. One skilled in the art would understand the applicant's design is not the exclusive embodiment.

In steps 212 through 234 of the exemplary embodiment, FIG. 35 is a schematic representation of the content management system instance of the content management application 204, and its exemplary databases 204A, as used by a plurality of front-end users FEU, who consume event records 204B and associated data elements 204C, from an exemplary instance of the content management application 204, for which they have been granted permission to access.

As shown in FIG. 35, a plurality of steps is described for a flow of front-end steps to practice the timeline builder system. In step 212 an exemplary front-end user FEU first accesses a permitted instance of the content management application 204 by logging into the system with user credentials provided by an exemplary back-end user BEU. As part of the log-in process the FEU's system access level is determined within the access module 44 based on the FEU's user credentials as established by a BEU within an exemplary database 204A. All subsequent interactions between the FEU and the database 204A are constrained by the FEU's permitted level of access as determined by the access module 44.

In step 214, the application instance of the content management application 204 and database 204A report to the FEU's exemplary device the narrative display module 60 which includes the content filter module 62 and an exemplary initial set of content filters 62-02 as established by the BEU for review and selection by the FEU. The front-end user FEU views the available set of content filters 62-02 to determine one or more individual category filters 62-04 to select for display in the timeline module 64.

In step 216, the front-end user FEU selects one or more individual content filters 62-04 from the displayed set of content filters 62-02 by clicking the respective toggle switches into the "on" position for each individual content filter 62-04 chosen. The content filter module 62 reports the FEU selections to the database 204A.

In step 218, the application instance of the content management application 204 and database 204A report to the FEU's exemplary device the set of event summaries 64-02 that reflects the FEU's choice or choices of individual content filters 62-04 from the content filter module 62 for display of the chosen set of event summaries 64-02 within the timeline module 64 of the narrative display module 60. The front-end user FEU views the available set event summaries 64-02 to determine an individual event summary 64-04 to select for display of the associated event record module 66-04 in the event display module 66.

In step 220, the front-end user FEU selects an individual event summary 64-04 from the set of event summaries 64-02 displayed in the timeline module 64 by clicking on the individual event summary 64-04 chosen to select for display of the associated event record module 66-04 in the event display module 66. Only one individual event summary 64-04 may be chosen at one time for display of the associated event record module 66-04 in the event display module 66. The timeline module 64 reports the FEU selected event summary 64-04 to the database 204A.

In step 222, the application instance of the content management application 204 and database 204A report to the FEU's exemplary device the event record module 66-04 that reflects the FEU's choice of an individual event summary 64-04 from the timeline module 64 for display of the chosen event record module 66-04 within the event display module 66 of the narrative display module 60.

In step 224, the front-end user FEU views and consumes required content elements of the chosen event record module 66-04. In the present embodiment, the required content elements for an exemplary event record module 66-04 include a main media file 66-102, a full event title 66-10, a display date 66-16, and event copy 66-24 (See FIG. 11). Each required data element of an event record module 66-04 is reported from the database 204A for display within the event display module 66 of the narrative display module 60. The front-end user FEU also views, and determines whether to consume, optional content elements of the chosen event record module 66-04. In the present embodiment, optional content elements for an exemplary event record module 66-04 include image captions of the caption frame 66-104, tags of the event records tag module 66-48 and other media files 66-30, which are displayed in other media modals 66-112. If other media files are included within an exemplary event record module 66-04, their availability will be indicated by the presence of another media titles frame 66-106 which will contain an other media title 66-108 and an other media file type icon 66-110 for each other media file 66-30 within the event display module 66 of the narrative display module 60.

In step 226, the front-end user FEU chooses to consume an optional content element, specifically an other media file 66-30, of the exemplary event record module 66-04 by clicking within the other media titles frame 66-106 on an other media title 66-108 chosen by the FEU. Only one other media file title 66-108 may be chosen at one time for display of the chosen associated other media file 66-30 in an associated modal 66-112. The event display module 66 reports the FEU selected other media title 66-108 of the event records module 66-04 to the database 204A.

In step 228, the application instance of the content management application 204 and database 204A and web services module 54 report to the FEU's exemplary device the other media modal 66-112 or 66-114 that reflects the FEU's choice of an other media file title 66-108, according to its other media file type 66-26, in order to render the selected other media file 66-30 within the event display module 66 of the narrative display module 60.

In step 230, the front-end user FEU views and/or listens to the selected other media file 66-30 within the appropriate modal 66-112 or 66-114 according to the appropriate web service within the web services module 54 for the other media file type 66-26 in the event display module 66 of the narrative display module 60.

In step 232, the front-end user FEU repeats steps 220 through 230 and starts with selecting a different individual event summary 64-04 from the current set of event summaries 64-02 displayed in the timeline module 64 by clicking on the individual event summary 64-04 chosen to select for subsequent display of the associated event record module 66-04 in the event display module 66. The timeline module 64 reports the FEU selected event summary 64-04 to the database 204A, as in step 220. The subsequent steps 222, 224, 226, 228 and 230 follow accordingly.

In step 234, the front-end user FEU repeats steps 216 through 230 and starts with selecting a different individual content filter 62-04 from the set of content filters 62-02 displayed in the content filter module 62 by clicking into the "on" position the toggle switch associated with the individual content filter 62-04 chosen to select for display the associated set of event summaries 64-02 in the timeline module 64. The content filter module 62 reports the FEU selected content filter 62-04 to the database 204A, as in step 216. The subsequent steps 218, 220, 222, 224, 226, 228 and 230 follow accordingly.

As noted with regard to step 210, at any time during the front-end users FEU usage of an exemplary instance of the content management application 204 by means of steps 212 through 234, inclusive, exemplary back-end users BEU may continue to add and revise content, as well as add and revise content filters (selection indexes) following the release of an exemplary instance of the content management application 204 to front-end users FEU. One skilled in the art would understand the applicant's design is not the exclusive embodiment.

It should be noted that various changes and modifications to the embodiments described herein will be apparent to those skilled in the art. Such changes and modifications may be made without departing from the spirit and scope of the present invention and without diminishing its intended advantages. For example, various embodiments of the systems and methods may be provided based on various combinations of the features and functions from the subject matter provided herein.

What is claimed is:

1. A timeline builder system comprises:
   a processor;
   a computing device;
   a content management configuration;
   a content preparation module, the content management configuration and the content preparation module are housed as applications within a plurality of application servers;
   the content preparation module includes:
   a story template module;
   a media log module; and
   an event publication summary module, a back-end user creates a visual, audio and textual content for a front-end user, and further creates thematic taxonomies by which front-end users navigate and experience both the back-end users content and the relationships embodied in the back-end users content presentation configurations, the front-end user is prevented from accessing a back-end content creation and content organization functionality of the back-end user, the visual audio and textual content is displayed on the computing device; a defined space which includes content categories grouped within a content filter module for stories, topics, tags and collections, a second defined space which contains a list of event summaries within a timeline module each shown chronologically or in another time-based temporal sequence by display dates and display titles that are associated with an event set of content categories selected by the front-end user, a third defined space which contains an event record of an event display module including a plurality of constituent components of the event record associated with an event summary selected for display by the front-end user from the timeline module.

2. The timeline builder system of claim 1, wherein the timeline builder system further comprises an event creation module.

3. The timeline builder system of claim 2, wherein the event creation module is only accessible by the back-end user.

4. The timeline builder system of claim 3, wherein the event creation module includes an access module that permits the back-end user to set permission levels per an event.

5. The timeline builder system of claim 4, wherein the event creation module further includes a topic module that permits the back-end user to create hierarchical taxonomies of categories of content.

6. The timeline builder system of claim 5, wherein the event creation module further includes a tag module that permits the back-end user to create non-hierarchical taxonomies of categories that provide a foundation to the front-end user to navigate, select and explore the content.

7. The timeline builder system of claim 6, wherein the event creation module further includes a story module that permits the back-end user to create custom sets of content.

8. The timeline builder system of claim 7, wherein the event creation module further includes a media library module.

9. The timeline builder system of claim 8, wherein the event creation module further includes a life lesson module.

10. The timeline builder system of claim 9, wherein a life lessons module permits the back-end user to create custom sets of media file content that are accessed by the front-end user.

11. The timeline builder system of claim 10, wherein the event creation module further includes a fixed element module.

12. The timeline builder system of claim 11, wherein the fixed element module permits the back-end user to switch a back-end user function and a front-end user function.

13. The timeline builder system of claim 12, wherein the timeline builder system further includes a narrative display module.

14. The timeline builder system of claim 13, wherein the narrative display module includes a content filter module.

15. The timeline builder system of claim 14, wherein the content filter module controls the content selected for subsequent display in a timeline module.

16. The timeline builder system of claim 15, wherein the narrative display module includes the timeline module.

17. The timeline builder system of claim 16, wherein the timeline module displays a plurality of event summaries in a chronological order or other time-based temporal sequence.

18. The timeline builder system of claim 17, wherein the narrative display module further includes an event display module coupled to the timeline module and displaying a plurality of event records.

19. The timeline builder system of claim 18, wherein a first front-end user of the timeline builder system can create and share a custom set of event records with a second front-end user.

20. The timeline builder system of claim 1, wherein front-end users (consumers of content) assemble sets of events that interest the front-end user by using parameters established by the back-end user (creators of content).

21. The timeline builder system of claim 1, wherein the front-end user utilizes a content filter module to examine an exemplary set of content filters, including a set of collection titles each representing a front-end user defined collection set cumulatively presented within an exemplary set of content filters.

22. The timeline builder system of claim 21, wherein the front-end user chooses among individual content filter options, a set of event summaries that corresponds to the selected content filters and displays a reported event summary records, in chronological order or other time-based temporal sequence, according to an exemplary sort date associated with each event record, an individual event summaries reported will only be those for which the front-end user has sufficient permission given by a content creating back-end user.

\* \* \* \* \*